(12) United States Patent
Zhang

(10) Patent No.: US 11,960,987 B2
(45) Date of Patent: *Apr. 16, 2024

(54) DISCRETE THREE-DIMENSIONAL PROCESSOR

(71) Applicant: Guobiao Zhang, Corvallis, OR (US)

(72) Inventor: Guobiao Zhang, Corvallis, OR (US)

(73) Assignees: HangZhou HaiCun Information Technology Co., Ltd., ZheJiang (CN); Guobiao Zhang, Corvallis, OR (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/096,013

(22) Filed: Jan. 12, 2023

(65) Prior Publication Data

US 2023/0147647 A1    May 11, 2023

Related U.S. Application Data

(60) Division of application No. 17/467,436, filed on Sep. 6, 2021, now Pat. No. 11,734,550, which is a
(Continued)

(30) Foreign Application Priority Data

| Dec. 10, 2018 | (CN) | 201811506212.1 |
| Dec. 11, 2018 | (CN) | 201811508130.0 |
| Dec. 12, 2018 | (CN) | 201811520357.7 |
| Dec. 13, 2018 | (CN) | 201811527885.5 |
| Dec. 13, 2018 | (CN) | 201811527911.4 |
| Dec. 14, 2018 | (CN) | 201811528014.5 |
| Dec. 15, 2018 | (CN) | 201811546476.X |
| Dec. 15, 2018 | (CN) | 201811546592.1 |
| Jan. 2, 2019  | (CN) | 201910002944.5 |
| Jan. 13, 2019 | (CN) | 201910029523.1 |

(51) Int. Cl.
*G06N 3/063* (2023.01)
*G06F 9/30* (2018.01)
(Continued)

(52) U.S. Cl.
CPC .......... *G06N 3/063* (2013.01); *G06F 9/3001* (2013.01); *G06F 13/4004* (2013.01); *G06F 15/803* (2013.01); *G06F 18/21* (2023.01); *G06F 21/561* (2013.01); *G10L 15/183* (2013.01); *G10L 15/22* (2013.01); *H01L 25/0657* (2013.01);
(Continued)

(58) Field of Classification Search
None
See application file for complete search history.

(56) References Cited

U.S. PATENT DOCUMENTS

| 4,870,302 A | 9/1989 | Freeman |
| 5,046,038 A | 9/1991 | Briggs et al. |

(Continued)

*Primary Examiner* — Steven G Snyder

(57) ABSTRACT

A discrete three-dimensional (3-D) processor a plurality of storage-processing units (SPU's), each of which comprises a non-memory circuit and more than one 3-D memory (3D-M) array. The preferred 3-D processor further comprises communicatively coupled first and second dice. The first die comprises the 3D-M arrays and the in-die peripheral-circuit components thereof; whereas, the second die comprises the non-memory circuits and off-die peripheral-circuit components of the 3D-M arrays.

18 Claims, 24 Drawing Sheets

Related U.S. Application Data continuation-in-part of application No. 16/249,021, filed on Jan. 16, 2019, now Pat. No. 11,527,523.

(51) Int. Cl.

| | | |
|---|---|---|
| *G06F 13/40* | (2006.01) | |
| *G06F 15/80* | (2006.01) | |
| *G06F 18/21* | (2023.01) | |
| *G06F 21/56* | (2013.01) | |
| *G10L 15/183* | (2013.01) | |
| *G10L 15/22* | (2006.01) | |
| *H01L 25/065* | (2023.01) | |
| *H01L 25/18* | (2023.01) | |

(52) U.S. Cl.
CPC ........ *H01L 25/18* (2013.01); *G06F 2221/034* (2013.01); *H01L 2224/08145* (2013.01); *H01L 2225/06503* (2013.01); *H01L 2225/06506* (2013.01); *H01L 2225/06513* (2013.01); *H01L 2225/06524* (2013.01); *H01L 2225/06541* (2013.01)

(56) References Cited

U.S. PATENT DOCUMENTS

| | | | |
|---|---|---|---|
| 5,060,182 A | 10/1991 | Briggs et al. | |
| 5,604,499 A | 2/1997 | Miyagoshi et al. | |
| 5,835,396 A | 11/1998 | Zhang | |
| 5,901,274 A | 5/1999 | Oh | |
| 5,954,787 A | 9/1999 | Eun | |
| 6,034,882 A | 3/2000 | Johnson et al. | |
| 6,067,536 A | 5/2000 | Maruyama et al. | |
| 6,181,355 B1 | 1/2001 | Brethour et al. | |
| 6,199,057 B1 | 3/2001 | Tawel | |
| 6,263,470 B1 | 7/2001 | Hung et al. | |
| 6,351,406 B1 | 2/2002 | Johnson et al. | |
| 6,717,222 B2 | 4/2004 | Zhang | |
| 6,861,715 B2 | 3/2005 | Zhang | |
| 7,028,247 B2 | 4/2006 | Lee | |
| 7,158,220 B2 | 1/2007 | Zhang | |
| 7,188,369 B2 | 3/2007 | Ho et al. | |
| 7,206,410 B2 | 4/2007 | Bertoni et al. | |
| 7,366,748 B1 | 4/2008 | Tang et al. | |
| 7,450,414 B2 | 11/2008 | Scheuerlein | |
| 7,468,667 B2 | 12/2008 | Moffett | |
| 7,472,149 B2 | 12/2008 | Endo | |
| 7,512,647 B2 | 3/2009 | Wilson et al. | |
| 7,523,500 B1 | 4/2009 | Szor et al. | |
| 7,574,468 B1 | 4/2009 | Rayala | |
| 7,539,927 B2 | 5/2009 | Lee et al. | |
| 7,634,524 B2 | 12/2009 | Okutani et al. | |
| 7,716,051 B2 | 5/2010 | Dow et al. | |
| 7,831,606 B2 | 11/2010 | Pandya | |
| 7,839,854 B2 | 11/2010 | Alexander | |
| 7,853,689 B2 | 12/2010 | Enderby | |
| 7,854,008 B1 | 12/2010 | Huang et al. | |
| 7,962,543 B2 | 6/2011 | Schulte et al. | |
| 8,203,564 B2 | 6/2012 | Jiao et al. | |
| 8,281,395 B2 | 10/2012 | Powlowski | |
| 8,327,446 B2 | 12/2012 | Liang et al. | |
| 8,365,287 B2 | 1/2013 | Yoo | |
| 8,392,989 B2 | 3/2013 | Upadhyay | |
| 8,487,948 B2 | 7/2013 | Kai et al. | |
| 8,640,237 B2 | 1/2014 | Haeffele et al. | |
| 8,916,938 B2 | 12/2014 | Zhang | |
| 8,921,991 B2 | 12/2014 | Zhang | |
| 9,015,452 B2 | 4/2015 | Dasgupta | |
| 9,024,425 B2 | 5/2015 | Zhang | |
| 9,093,129 B2 | 7/2015 | Zhang | |
| 9,093,153 B2 | 7/2015 | Zhang | |
| 9,117,493 B2 | 8/2015 | Zhang | |
| 9,123,393 B2 | 9/2015 | Zhang | |
| 9,153,230 B2 | 10/2015 | Maaninen | |
| 9,207,910 B2 | 12/2015 | Azadet et al. | |
| 9,225,501 B2 | 12/2015 | Azadet | |
| 9,299,390 B2 | 3/2016 | Zhang | |
| 9,305,604 B2 | 4/2016 | Zhang | |
| 9,305,605 B2 | 4/2016 | Zhang | |
| 9,396,764 B2 | 7/2016 | Zhang | |
| 9,465,580 B2 | 10/2016 | Pineiro et al. | |
| 9,508,395 B2 | 11/2016 | Zhang | |
| 9,558,842 B2 | 1/2017 | Zhang | |
| 9,559,082 B2 | 1/2017 | Zhang | |
| 9,606,796 B2 | 3/2017 | Lee et al. | |
| 9,666,300 B2 | 5/2017 | Zhang | |
| 10,879,260 B2 * | 12/2020 | Uryu | H10B 41/41 |
| 11,211,370 B2 * | 12/2021 | Kim | H01L 25/18 |
| 11,335,671 B2 * | 5/2022 | Chibvongodze | H10B 41/50 |
| 11,424,207 B1 * | 8/2022 | Shao | H10B 43/27 |
| 2004/0044710 A1 | 3/2004 | Harrison et al. | |
| 2006/0106905 A1 | 5/2006 | Chren, Jr. | |
| 2006/0242710 A1 | 10/2006 | Alexander | |
| 2009/0044273 A1 | 2/2009 | Zhou et al. | |
| 2014/0067889 A1 | 3/2014 | Mortensen | |
| 2023/0038812 A1 * | 2/2023 | Zhang | G10L 15/183 |
| 2023/0041616 A1 * | 2/2023 | Zhang | G06F 18/21 |

* cited by examiner

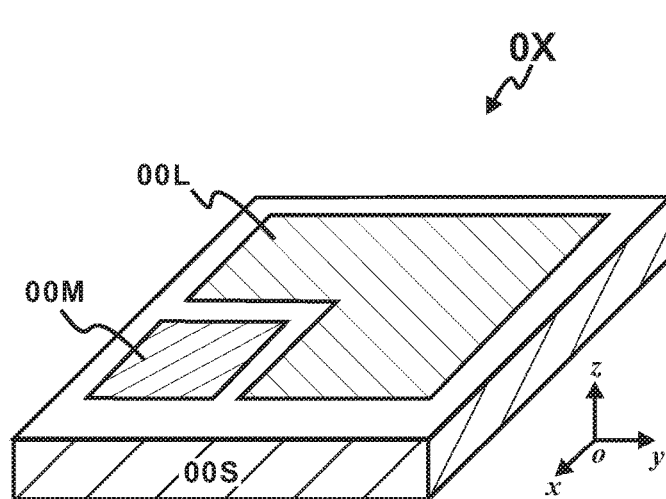
| FUNC | LUT SIZE | Taylor Series |
|---|---|---|
| CBRT | 24 kbit | 6 |
| EXP | 2 kbit | 5 |
| LN | 24 kbit | 6 |
| SIN | 6 kbit | 9 |
| COS | 6 kbit | 9 |
| TAN | 0 | 15 |
| ATAN | 0 | 22 |
Fig. 1AA (Prior Art)
Fig. 1AB (Prior Art)
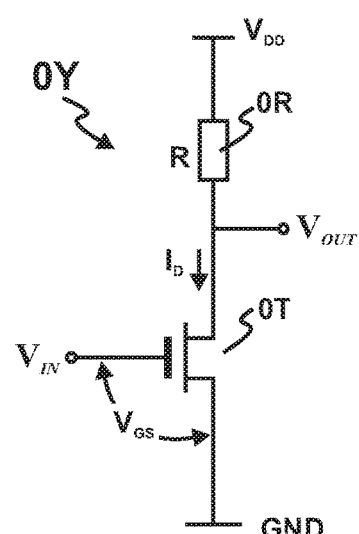
| # of ops. \ Model Name | MOS3 | BSIM3 V3.2 | BSIM4 V3.0 | PSP |
|---|---|---|---|---|
| Addition | 46 | 283 | 222 | 1345 |
| Multiplication | 82 | 634 | 286 | 2319 |
| Division | 20 | 122 | 85 | 247 |
| Square Root | 4 | 9 | 16 | 30 |
| Exponential | 3 | 8 | 24 | 19 |
| Logarithmic | 0 | 1 | 19 | 10 |
Fig. 1BA (Prior Art)
Fig. 1BB (Prior Art)

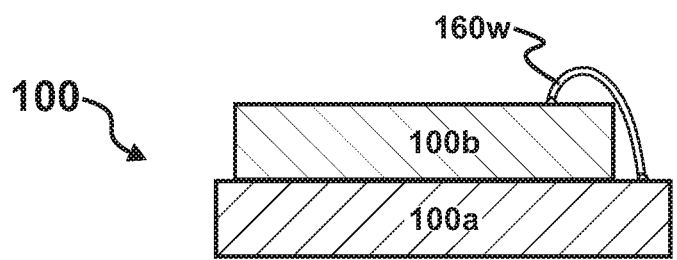 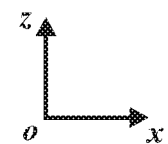
Fig. 3A
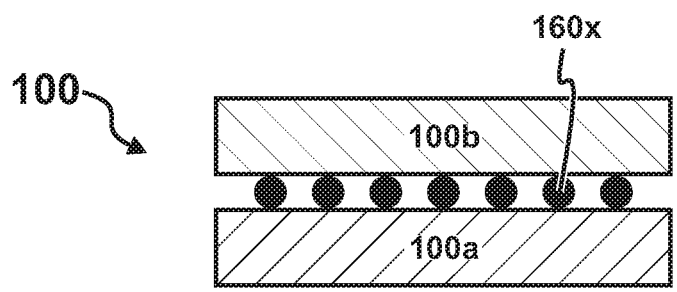 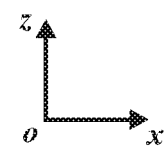
Fig. 3B
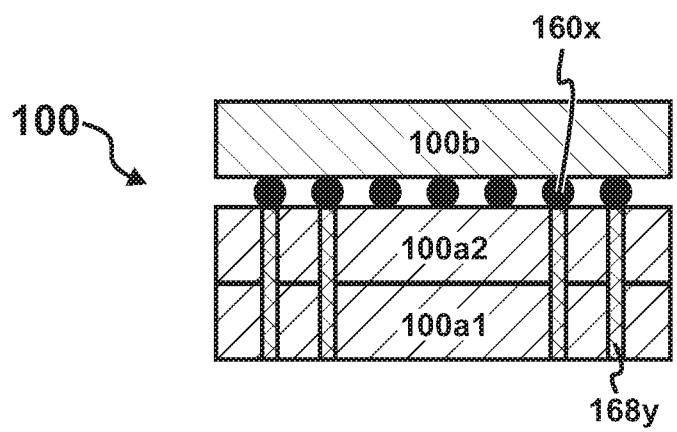 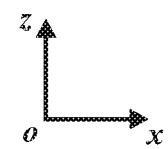
Fig. 3C
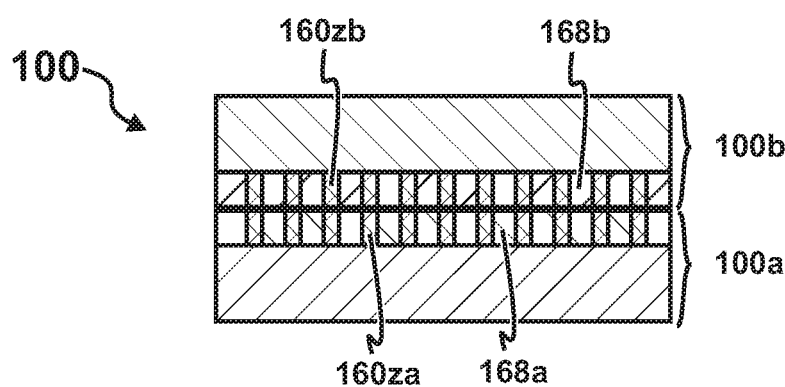 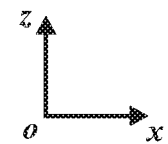
Fig. 3D $Y(32b)=D1(32b)+D2(32b)*R(16b)$

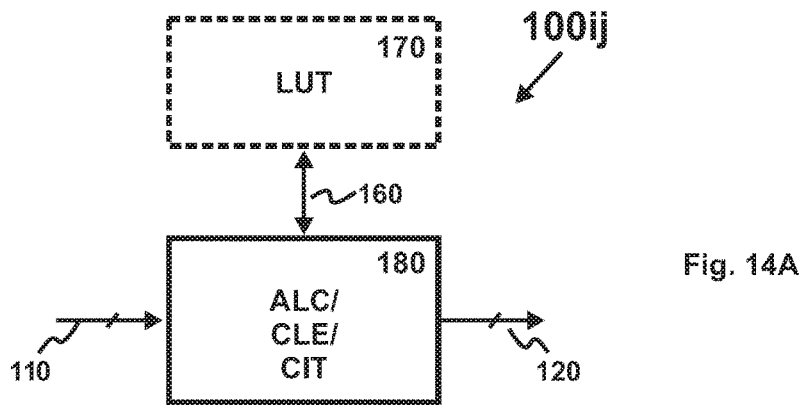
Fig. 14A
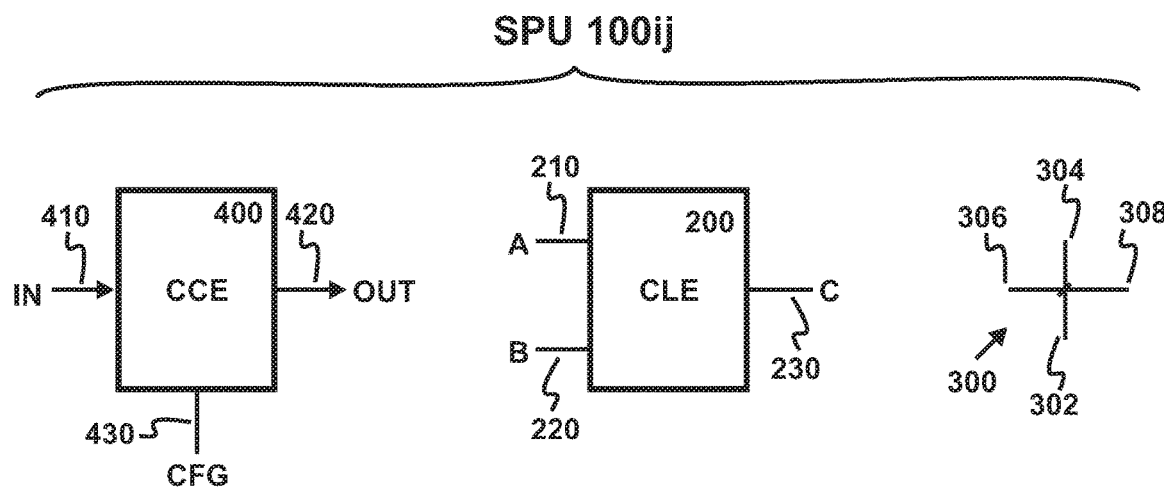
Fig. 14B
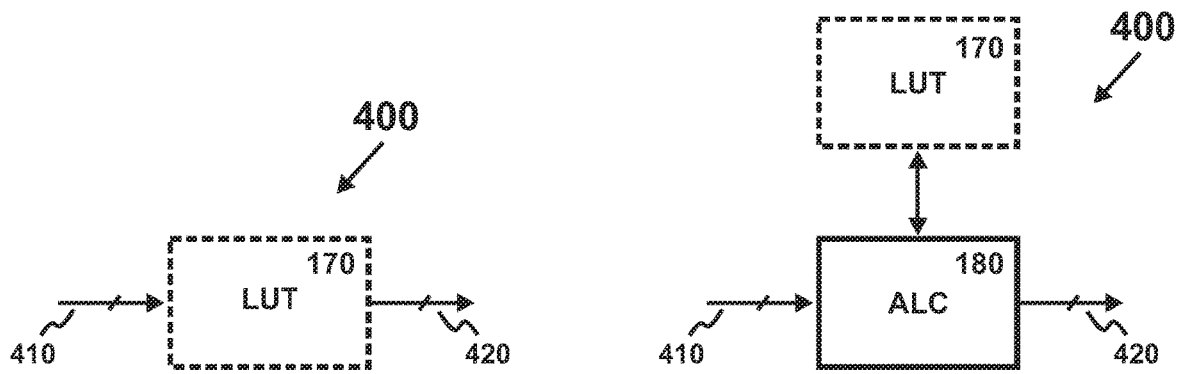
Fig. 15A
Fig. 15B $C = A, \overline{A},$ A shift by n bits, AND(A,B), OR(A,B), NAND(A,B), NOR(A,B), XOR(A,B), A+B, or A-B ...

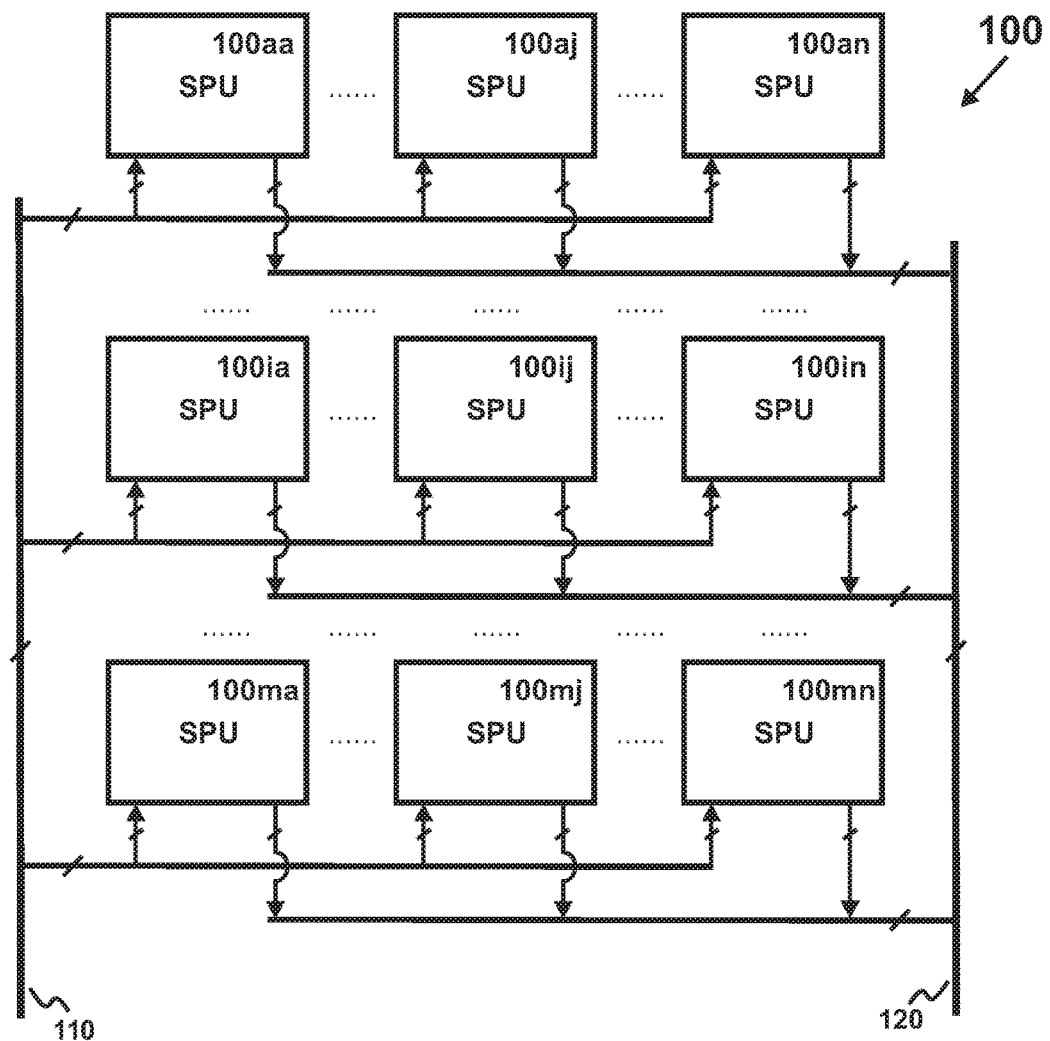
Fig. 22
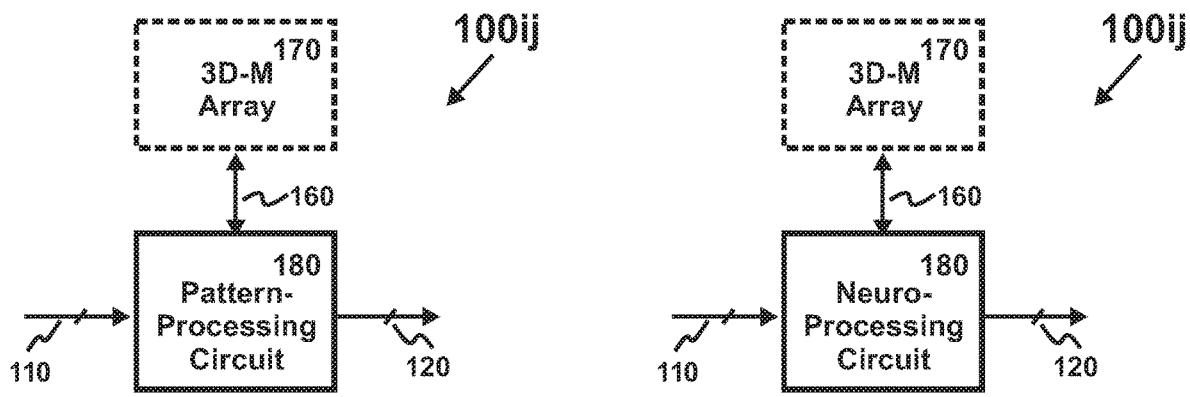
Fig. 23
Fig. 24

DISCRETE THREE-DIMENSIONAL PROCESSOR

CROSS-REFERENCE TO RELATED APPLICATIONS

This application is a division of U.S. patent application Ser. No. 17/467,436, filed Sep. 6, 2021, which is a continuation-in-part of U.S. patent application Ser. No. 16/249,021, filed Jan. 16, 2019, which claims priorities from the following Chinese patent applications:

1) Chinese Patent Application No. 201811506212.1, filed Dec. 10, 2018;
2) Chinese Patent Application No. 201811508130.0, filed Dec. 11, 2018;
3) Chinese Patent Application No. 201811520357.7, filed Dec. 12, 2018;
4) Chinese Patent Application No. 201811527885.5, filed Dec. 13, 2018;
5) Chinese Patent Application No. 201811527911.4, filed Dec. 13, 2018;
6) Chinese Patent Application No. 201811528014.5, filed Dec. 14, 2018;
7) Chinese Patent Application No. 201811546476.X, filed Dec. 15, 2018;
8) Chinese Patent Application No. 201811546592.1, filed Dec. 15, 2018;
9) Chinese Patent Application No. 201910002944.5, filed Jan. 2, 2019;
10) Chinese Patent Application No. 201910029523.1, filed Jan. 13, 2019, in the State Intellectual Property Office of the People's Republic of China (CN), the disclosures of which are incorporated herein by references in their entireties.

BACKGROUND

1. Technical Field of the Invention

The present invention relates to the field of integrated circuit, and more particularly to a processor.

2. Prior Art

Processors (including CPU, GPU, FPGA, and others) are extensively used in mathematical computation, computer simulation, configurable gate array, pattern processing and neural network. A conventional processor is based on two-dimensional (2-D) integration, i.e. its processing circuit (e.g. arithmetic logic unit, control unit) and memory circuit (internal memory, including RAM for cache and ROM for look-up table) are disposed on a same plane, i.e. the top surface of a semiconductor substrate. Because the arithmetic logic operations are its primary function, the processor die contains limited amount of internal memory.

The conventional computer is based on the von Neumann architecture, where processor and memory are physically separated. Most memory takes the form of external memory (e.g. main memory, secondary memory). When it requests a large amount of data, a processor fetches the data from an external memory. Because the processor and the external memory are distant and the system bus between them has a relatively narrow width, data transfer between them has a limited bandwidth. As the amount of data increases, the conventional processor and its associated von Neumann architecture become inefficient.

The following paragraphs will provide an overview of the fields of applications of the conventional processors and their limitations.

[A] Mathematical Computing

One important application of processors is mathematical computing, including computing of mathematical functions and mathematical models. For mathematical computing, the conventional processors use logic-based computation (LBC), which carries out computation primarily with processing circuits (generally known as arithmetic logic unit, or ALU). In fact, the arithmetic operations that can be directly implemented by the ALU consist of addition, subtraction and multiplication. These arithmetic operations are collectively referred to as basic arithmetic operations. The ALU's are suitable for arithmetic functions, but not for non-arithmetic functions. For a processor to compute mathematical functions, an arithmetic function is a mathematical function which can be represented by a combination of its basic arithmetic operations, whereas a non-arithmetic function is a mathematical function which cannot be represented by a combination of its basic arithmetic operations. Exemplary non-arithmetic functions include transcendental functions and special functions. Because it includes more operations than the arithmetic operations provided by the ALU's, a non-arithmetic function cannot be implemented by the ALU's alone. The hardware implementation of the non-arithmetic functions has been a major challenge.

For the conventional processors, only few basic functions (i.e. single-variable non-arithmetic functions, e.g. basic algebraic functions and basic transcendental functions) are implemented by hardware and they are referred to as built-in functions. These built-in functions are realized by a combination of processing circuits and look-up tables (LUT). In prior art, there are many ways to implement built-in functions. For example, U.S. Pat. No. 5,954,787 issued to Eun on Sep. 21, 1999 taught a method for generating SIN/COS functions using LUT's; U.S. Pat. No. 9,207,910 issued to Azadet et al. on Dec. 8, 2015 taught a method for calculating a power function using LUT's.

Realization of built-in functions is further illustrated in FIG. 1AA. A conventional processor 0X generally comprises a processing circuit 00L and a memory circuit 00M. The processing circuit 00L comprises an ALU for performing arithmetic operations, while the memory circuit 00M stores an LUT for the built-in function. To obtain a desired precision, the built-in function is approximated to a polynomial of a sufficiently high order. The LUT 00M stores the coefficients of the polynomial; and the ALU 00L calculates the polynomial. Because the ALU 00L and the LUT 00M are formed side-by-side on a semiconductor substrate 0, this type of horizontal integration is referred to as two-dimensional (2-D) integration.

Computation has been developed along the directions of computational density and computational complexity. The computational density is a figure of merit for parallel computation and it refers to the computational power (e.g. the number of floating-point operations per second) per die area. The computational complexity is a figure of merit for scientific computation and it refers to the total number of built-in functions supported by a processor. The 2-D integration severely limits computational density and computational complexity.

For the 2-D integration, the LUT 00M would increase the die size of the conventional processor 0X and lower its computational density. This has an adverse effect on parallel computation. Moreover, as the primary component of the conventional processor 0X, the ALU 00L occupies most die area. As a result, the LUT 00M is left with a small die area which can only accommodate few built-in functions. FIG. 1AB lists all built-in transcendental functions supported by an Intel IA-64 processor (referring to Harrison et al. "The Computation of Transcendental Functions on the IA-64 Architecture", Intel Technical journal, Q4 1999, hereinafter Harrison). The IA-64 processor supports just a total of seven built-in functions. This small set of built-in functions makes mathematical computing difficult, because most mathematical functions need to be decomposed into a combination of built-in functions. The conventional processor 0X is slow and inefficient for most mathematical computing.

[B] Computer Simulation

Another important application of processors is computer simulation, which involves computing of mathematical models. As a natural extension of mathematical computing, computer simulation is built upon the small set of built-in functions (about ten types) provided by the conventional processor. The framework of the conventional computer simulation comprises three layers: a foundation layer, a function layer and a modeling layer. The foundation layer includes built-in functions that can be directly implemented by hardware. The function layer includes mathematical functions that cannot be directly implemented by hardware. The modeling layer includes mathematical models, which are the mathematical descriptions of the behaviors (e.g. input-output characteristics) of a system component.

The mathematical functions in the function layer and the mathematical models in the modeling layer are implemented by software. As mentioned before, the function layer involves one software-decomposition step. On the other hand, the modeling layer involves two software-decomposition steps: the mathematical models are decomposed into combinations of mathematical functions; before the mathematical functions are decomposed into combinations of built-in functions. Because the mathematical models involve more software-decomposition steps, their implementations are even slower and more inefficient than the mathematical functions.

To illustrate how computationally intensive a mathematical model could be, FIGS. 1BA-1BB disclose a simple example—the simulation of an amplifier circuit 0Y. The amplifier circuit 0Y comprises a transistor 0T and a resistor 0R (FIG. 1BA). All transistor models (e.g. MOS3, BSIM3 V3.2, BSIM4 V3.0, PSP of FIG. 1BB) model the transistor behaviors based on the small set of built-in functions provided by the conventional processor 0X. Due to the limited choice of the built-in functions, calculating even a single current-voltage (I-V) point for the transistor 0T requires a large amount of computation (FIG. 1BB). As an example, the BSIM4 V3.0 transistor model needs 222 additions, 286 multiplications, 85 divisions, 16 square-root operations, 24 exponential operations, and 19 logarithmic operations.

The ALU 00L in the conventional processor 0X can only realize arithmetic models per se. Typical mathematical models are non-arithmetic models. For a processor to compute mathematical models, an arithmetic model is a mathematical model which can be represented by a combination of its basic arithmetic operations, whereas a non-arithmetic model is a mathematical model which cannot be represented by a combination of its basic arithmetic operations. Because it includes more operations than the arithmetic operations provided by the ALU 00L, a non-arithmetic model cannot be implemented by the ALU alone. Computation of non-arithmetic models by the conventional processor 0X is extremely slow and inefficient.

[C] Configurable Gate Array

A third application of processors is configurable gate array. A configurable gate array is a semi-custom integrated circuit designed to be configured by a customer after manufacturing. It is also referred to as field-programmable gate array (FPGA), complex programmable logic device (CPLD), or other names. U.S. Pat. No. 4,870,302 issued to Freeman on Sep. 26, 1989 (hereinafter referred to as Freeman) discloses a configurable gate array. It contains an array of configurable logic elements (CLE's, also known as configurable logic blocks) and a hierarchy of configurable interconnects (CIT's, also known as programmable interconnects) that allow the CLE's to be wired together per customer's desire. Each CLE in the array is in itself capable of realizing any one of a plurality of logic functions (e.g. shift, logic NOT, logic AND, logic OR, logic NOR, logic NAND, logic XOR, arithmetic addition "+", arithmetic subtraction "−", etc.) depending upon a first configuration signal. On the other hand, each CIT can selectively couple or de-couple interconnect lines depending upon a second configuration signal.

In a configurable gate array, the arithmetic operations (i.e. arithmetic addition and arithmetic subtraction) provided by the CLE are also collectively referred to as basic arithmetic operations. They are fewer than those provided by the conventional processor (i.e. addition, subtraction and multiplication). As used hereinafter, basic arithmetic operations could refer to either those provided by the configurable gate array, or those provided by the conventional processor, depending on the context.

The configurable gate array can customize logic functions and arithmetic functions, but not non-arithmetic functions. In the configurable gate array, an arithmetic function is a mathematical function which can be represented by a combination of its basic arithmetic operations; whereas, a non-arithmetic function is a mathematical function which cannot be represented by a combination of its basic arithmetic operations. Because the non-arithmetic functions include more operations than basic arithmetic operations, they cannot be directly implemented by the CLE's alone. It was generally believed that customization of non-arithmetic functions is impossible.

[D] Pattern Processing

A fourth application of processors is pattern processing. Pattern processing includes pattern matching and pattern recognition, which are the acts of searching a target pattern (i.e. the pattern to be searched) for the presence of the constituents or variants of a search pattern (i.e. the pattern used for searching). The match usually has to be "exact" for pattern matching, whereas it could be "likely to a certain degree" for pattern recognition. As used hereinafter, search patterns and target patterns are collectively referred to as patterns; pattern database refers to a database containing related patterns. Pattern database includes search-pattern database (also known as search-pattern library) and target-pattern database.

Pattern processing has broad applications. Typical pattern processing includes code matching, string matching, speech recognition and image recognition. Code matching is widely used in information security. Its operations include searching a virus in a network packet or a computer file; or, checking if a network packet or a computer file conforms to a set of rules. String matching, also known as keyword search, is widely used in big-data analytics. Its operations include regular-expression matching. Speech recognition identifies from the audio data the nearest acoustic/language model in an acoustic/language model library. Image recognition identifies from the image data the nearest image model in an image model library.

The pattern database has become large: the search-pattern library (including related search patterns, e.g. a virus library, a keyword library, an acoustic/language model library, an image model library) is already big; while the target-pattern database (including related target patterns, e.g. computer files on a whole disk drive, a big-data database, an audio archive, an image archive) is even bigger. The conventional processor and its associated von Neumann architecture have great difficulties to perform fast pattern processing on large pattern databases.

[E] Neural Network

A fifth application of processors is neural network. Neural network is a powerful tool for artificial intelligence (AI). An exemplary neural network is shown in FIG. 1C. It includes an input layer 32, a hidden layer 34 and an output layer 36. The input layer 32 comprises i neurons 33, whose input data $x_1, \ldots x_i$ form an input vector 30x. The output layer 36 comprises k neurons 37, whose output data $y_1, y_2, \ldots y_k$ form an output vector 30y. The hidden layer 34 is between the input layer 32 and the output layer 36. It comprises j neurons 35, each of which is coupled with a first neuron in the input layer 32 as well as a second neuron in the output layer 36. The couplings between neurons are represented by synaptic weights $w_{ij}$ and $w_{jk}$.

A machine-learning supercomputer comprising a plurality of accelerator dice 60 is disclosed in prior art (referring to Chen et al. "DaDianNao: A Machine-Learning Supercomputer", IEEE/ACM International Symposium on Microarchitecture, 5(1), pp. 609-622, 2014). Each accelerator die 60 comprises an array of sixteen tiles 50, which are connected through a fat tree (FIG. 1DA). Each tile 50 comprises a neuro-processing unit (NPU) 30 and four eDRAM banks 40 (FIG. 1DB). The NPU 30 performs neural processing. It comprises 256+32 16-bit multipliers as well as 256+32 16-bit adders. The eDRAM 40 stores the synaptic weights. It has a storage capacity of 2 MB.

The accelerator 60 has several drawbacks. First of all, because the eDRAM 40 is a volatile memory, the synaptic weights need to be loaded into the eDRAM 40 before operations. This takes time. Secondly, each accelerator die 60 contains 32 MB eDRAM. This number is still quite small for many neural networks. Thirdly, the accelerator 60 adopts an asymmetric architecture where the tile area is heavily biased towards storage rather than computation. Inside each tile, eDRAM 40 occupies nearly 80% of the area, whereas the NPU 30 only occupies less than 10%. As a result, the computational density is limited.

With the advent of three-dimensional memory (3D-M), the above difficulties (mentioned in applications [A]-[E]) are alleviated. For a 3D-M, its memory cells are disposed in a three-dimensional (3-D) space, i.e. stacked along a direction perpendicular to the top surface of the substrate. U.S. Pat. No. 6,861,715 B2 issued to Zhang on Mar. 1, 2005 discloses an integrated 3-D processor, where a processing circuit is monolithically integrated underneath the 3D-M arrays. The integrated 3-D processor is, by itself, a single 3-D processor die.

The integrated 3-D processor can be applied to above fields of applications. U.S. patent application Ser. No. 15/487,366, filed Apr. 13, 2017, discloses an integrated 3-D processor for computing mathematical functions and mathematical models; U.S. Pat. No. 9,838,021, issued Dec. 5, 2017, discloses an integrated 3-D processor as a configurable computing array; U.S. patent application Ser. No. 15/452,728, filed Mar. 3, 2017, discloses an integrated 3-D processor as a pattern processor; U.S. patent application Ser. No. 15/464,347, filed Mar. 21, 2017, discloses an integrated 3-D processor as a neuro-processor. The integrated 3-D processor brings about significant advantages in these fields.

FIGS. 1EA-1EB disclose an integrated 3-D processor die 80. It comprises at least a 3D-M array 77 and a processing circuit 78 integrated therewith. The 3D-M array 77 stores data, while the processing circuit 78 processes at least a portion of the data stored in the 3D-M array 77. On the 3-D processor die 80, the die area occupied by the 3D-M arrays 77 is an array region 70, whereas the die area outside the 3D-M arrays 77 is a non-array region 71 (FIG. 1EA). The array region 70 comprises a substrate circuit 0K and a 3D-M array 77 stacked thereon (FIG. 1EB). The substrate circuit 0K includes transistors 0t and substrate interconnects 0i. The transistors 0t are formed in a semiconductor substrate 0 and communicatively coupled by the substrate interconnects 0i. The substrate interconnects 0i include two interconnect layers 0m1-0m2, each of which comprises a plurality of interconnects 0m on a same physical plane. The 3D-M arrays 77 include four address-line layers 0a1-0a4. Each address-line layer (e.g. 0a1) comprises a plurality of address lines (e.g. 1a) on a same physical plane. The address-line layers 0a1-0a4 form two memory levels 16A, 16B, with the memory level 16A stacked on the substrate circuit 0K and the memory level 16B stacked on the memory level 16A. Memory cells (e.g. 7aa) are disposed at the intersections between two address lines (e.g. 1a, 2a). The memory levels 16A, 16B are communicatively coupled with the substrate circuit 0K through contact vias 1av, 3av.

The non-array region 71 also contains a portion of substrate circuit 0K (FIG. 1EB). Without the 3D-M array 77, the non-array region 71 comprises substantially fewer back-end-of-line (BEOL) layers than the array region 70. As used hereinafter, a BEOL layer is an independent conductive layer (not counting via) in the BEOL. In FIG. 1EB, the array region 70 contains six BEOL layers, including two interconnect layers 0m1-0m2 of the substrate circuit 0K, and four address-line layers 0a1-0a4 of the 3D-M array 77, while the non-array region 71 contains only two BEOL layers, including the two interconnect layers 0m1-0m2 of the substrate circuit 0K. Because it contains neither memory cells nor interconnects, the space 72 above the substrate circuit 0K is, in fact, wasted.

The array region 70 contains a plurality of 3D-M arrays 77 and the associated local peripheral circuit 75 and processing circuit 78 (FIG. 1EA). The local peripheral circuit 75 and the processing circuit 78 are disposed on the substrate 0 and located near the footprint of the 3D-M array 77. Because they are vertically stacked above the substrate 0 (not formed on the substrate 0), the 3D-M arrays 77 are drawn by dashed lines. On the other hand, the non-array region 71 contains at least a global peripheral circuit 73 of the 3D-M arrays 77. They are disposed on the substrate 0 and located outside the footprints of all 3D-M arrays 77. The local peripheral circuit 75 and global peripheral circuit 73 are collectively referred to peripheral circuits 79.

In the 3-D processor die 80, the non-array region 71 occupies a large die area. At present, the non-array region 71 occupies 20%-30% of the total die area. As the storage capacity increases, the number will soon reach 50%. Hence, the integrated 3-D processor 80 has a low array efficiency. As used hereinafter, the array efficiency is the ratio of the total footprints of the 3D-M arrays 77 on the substrate 0 and the total die area.

The prevailing belief in integrated circuits is that integration will lower the cost and improve performance. Accordingly, monolithic integration, which integrates all circuit components into a single die, is generally preferred. Monolithic integration is advantageous to two-dimensional (2-D) circuits, but not so to three-dimensional (3-D) circuits, more particularly when the 3-D circuits (e.g. 3D-M arrays) are mixed with the 2-D circuits. As used hereinafter, a 2-D circuit is a circuit whose active elements (e.g. transistors, memory cells) are disposed on a 2-D plane (e.g. on a top surface of a semiconductor substrate); whereas, a 3-D circuit is a circuit whose active elements (e.g. transistors, memory cells) are disposed in a 3-D space (i.e. stacked along a direction perpendicular to a top surface of a semiconductor substrate).

Monolithic integration, when applied to the integration of the 3-D circuits and 2-D circuits, has several drawbacks. First of all, because their manufacturing processes are not compatible, integration will force the processing circuit 78 and the peripheral circuit 79 to use the expensive manufacturing process for the 3D-M arrays 77. Adding the fact that its array efficiency is lower, the overall cost of the integrated 3-D processor die 80 becomes higher.

To make things worse, because the 3D-M arrays 77 have stringent requirements on manufacturing, the BEOL process of the integrated 3-D processor die 80 is generally optimized for the 3D-M arrays 77, at the price of the performance of the processing circuit 78 and the peripheral circuit 79. For the integrated 3-D processor 80, the processing circuit 78 and the peripheral circuit 79 can only contain a small number of the interconnect layers (as few as two); or, use slower high-temperature interconnect materials (which support the high-temperature manufacturing process for the 3D-M arrays 77, e.g. tungsten). As a result, the overall performance of the integrated 3-D processor die 80 suffers.

Finally, with monolithic integration, the die area occupied by the local processing circuit 78 is limited by the footprint of the 3D-M array 77. As a result, the local processing circuit 78 has limited functionalities. Furthermore, because monolithic integration fixedly integrates the 3D-M arrays 77 with the processing circuit 78, the integrated 3-D processor 80 can only perform fixed functions. To perform another function, the whole 3-D processor 80 needs to be re-designed and re-manufactured, which are time-consuming and expensive.

OBJECTS AND ADVANTAGES

It is a principle object of the present invention to provide a 3-D processor with a lower overall cost.

It is a further object of the present invention to provide a 3-D processor with a better overall performance.

It is a further object of the present invention to provide a 3-D processor with more processing power and more flexible functionalities.

It is a further object of the present invention to provide a 3-D processor with more computational density.

It is a further object of the present invention to provide a 3-D processor with more computational complexity.

It is a further object of the present invention to improve the speed and efficiency of mathematical computing.

It is a further object of the present invention to improve the speed and efficiency of computer simulation.

It is a further object of the present invention to customize non-arithmetic functions.

It is a further object of the present invention to realize re-configurable computing.

It is a further object of the present invention to improve the speed and efficiency of pattern processing on large pattern databases.

It is a further object of the present invention to enhance information security.

It is a further object of the present invention to improve the speed and efficiency of big-data analytics.

It is a further object of the present invention to improve the speed and efficiency of speech recognition, as well as enable audio search in an audio archive.

It is a further object of the present invention to improve the speed and efficiency of image recognition, as well as enable video search in a video archive.

It is a further object of the present invention to improve the speed and efficiency of neural processing.

In accordance with these and other objects of the present invention, the present invention discloses a discrete 3-D processor.

SUMMARY OF THE INVENTION

The present invention follows a design paradigm distinct from any conventional processor: de-integrate the 2-D and 3-D circuits. To be more specific, the 2-D circuits and the 3-D circuits are partitioned into different dice as much as possible so that they can be optimized separately. Accordingly, the present invention discloses a discrete 3-D processor, comprising: a plurality of storage-processing units (SPU's), each of said SPU's comprising at least a three-dimensional memory (3D-M) array and a processing circuit; first and second dice, wherein said first die comprises said 3D-M array, said second die comprises at least a portion of said processing circuit and an off-die peripheral-circuit component of said 3D-M array, said first die does not comprise said off-die peripheral-circuit component, said first and second dice are separate dice communicatively coupled by a plurality of inter-die connections. Simply put, the first die is a memory die with multiple functional physical levels, whereas the second die is a processing die with a single functional physical level.

Different from the integrated 3-D processor where all peripheral-circuit components are located in the same die as the 3D-M arrays, at least one peripheral-circuit component of the 3D-M arrays is not located in the first die, but located in the second die. Accordingly, this peripheral-circuit component located in the second die is referred to as an off-die peripheral-circuit component. During design, the discrete 3-D processor is partitioned in such a way that the second die comprises as many off-die peripheral-circuit components as possible. Apparently, this partitioning scheme improves the array efficiency of the first die. It should be noted that, although it comprises the 3D-M arrays, the first die per se is not a functional memory die because of the missing peripheral-circuit components. Its performance cannot meet the industrial standards of the memory product of the same type.

Designed and manufactured separately, the first and second dice have substantially different BEOL structures. Because the BEOL structures of the second die could be independently optimized, the off-die peripheral-circuit components and the processing circuits could have a lower cost and a better performance than their counterparts in the integrated 3-D processor. In the following paragraphs, the discrete 3-D processor is compared with the integrated 3-D processor in several aspects.

First of all, because it does not include at least a portion of the peripheral circuits and processing circuits, the first die has a better array efficiency. In addition, as a 2-D circuit, the second die comprises substantially fewer BEOL layers than the integrated 3-D processor and can be made with the conventional manufacturing process. Because the wafer cost is roughly proportional to the number of BEOL layers, the second die would have a much lower wafer cost than the integrated 3-D processor. Hence, the total die cost of the discrete 3-D processor (which includes first and second dice) is lower than that of the integrated 3-D processor (which includes a single die). Even with the extra bonding cost, the discrete 3-D processor still has a lower overall cost than the integrated 3-D processor for a given storage capacity.

Secondly, because they can be independently optimized, the off-die peripheral-circuit components and the processing circuits of the discrete 3-D processor have a better performance than their counterparts in the integrated 3-D processor. In one preferred embodiment, the number of the interconnect layers (e.g. four, eight, or even more) in the second die is more than that of the substrate circuits (e.g. two) of the integrated 3-D processor die (or, the first die). In another preferred embodiment, the second die comprises high-speed interconnect materials (e.g. copper), not the high-temperature interconnect materials (e.g. tungsten) used in the integrated 3-D processor (or, the first die), which are generally slower. In other words, the interconnect materials in the second die have a lower resistivity than the interconnect materials in the first die. As a result, the discrete 3-D processor has a better overall performance than the integrated 3-D processor.

Lastly, in the integrated 3-D processor, the processing circuit is smaller and has less processing power, because it is disposed in a single die (e.g. within the footprint of the 3D-M array on the substrate). In comparison, in the discrete 3-D processor, the processing circuit is larger and has more processing power, because it can be disposed in two dice (e.g. a portion of the processing circuit is disposed in the first die; and, another portion of the processing circuit is disposed in the second die). In addition, designed and manufactured separately, the second die enjoys more flexibility in design and manufacturing. By combining the same first die with different second dice, different functionalities can be realized for different applications. Better yet, these different functionalities can be implemented in a relatively short time and under a relatively small budget. As a result, the discrete 3-D processor has more processing power and more flexible functionalities than the integrated 3-D processor.

The following paragraphs provide an overview of the applications of the preferred discrete 3-D processor.

[A] Mathematical Computing

When applied to the mathematical computing, the preferred discrete 3-D processor computes non-arithmetic functions. It uses memory-based computation (MBC), which carries out computation primarily with the LUT stored in the 3D-M arrays (i.e. 3DM-LUT). Compared with the conventional logic-based computation (LBC), the 3DM-LUT used by the MBC has a much larger capacity than the conventional LUT. For example, a single 3D-XPoint die has a storage capacity of 128 Gb, far larger than any conventional LUT (tens of kb). It can be used to store tens of thousands of non-arithmetic functions, including various types of transcendental functions and special functions. Although arithmetic operations are still performed for most MBC's, using a larger 3DM-LUT as a starting point, the MBC only needs to calculate a polynomial to a smaller order. For the MBC, the fraction of computation done by the memory circuit is significantly more than the processing circuit.

Accordingly, the present invention discloses a discrete 3-D processor for computing at least a non-arithmetic function, comprising: a plurality of storage-processing units (SPU's), each of said SPU's comprising at least a three-dimensional memory (3D-M) array and an arithmetic logic circuit (ALC), wherein said 3D-M array stores at least a portion of a look-up table (LUT) for said non-arithmetic function, said ALC performs arithmetic operations on selected data from said LUT; first and second dice, wherein said first die comprises said 3D-M array, said second die comprises at least a portion of said ALC and an off-die peripheral-circuit component of said 3D-M array, said first die does not comprise said off-die peripheral-circuit component, said first and second dice are separate dice communicatively coupled by a plurality of inter-die connections; wherein said non-arithmetic function includes more operations than the arithmetic operations provided by said ALC.

[B] Computer Simulation

When applied to the computer simulation, the preferred discrete 3-D processor computes non-arithmetic models. It still uses the MBC. The MBC brings about significant performance improvement for computer simulation. With significantly more built-in functions (from about ten types to tens of thousands), the prevailing framework of computer simulation (including the foundation, function and modeling layers) is flattened. The hardware-implemented functions, which were only available to the foundation layer, now become available to the function and modeling layers. Not only mathematical functions in the function layer can be directly realized by hardware, but also mathematical models in the modeling layer. In the function layer, mathematical functions can be computed by a function-by-LUT method, i.e. the function values are calculated by reading the 3DM-LUT plus polynomial interpolation. In the modeling layer, mathematical models can be computed by a model-by-LUT method, i.e. the input-output characteristics of a system component are calculated by reading the 3DM-LUT plus polynomial interpolation. Rapid and efficient computation through 3DM-LUT would lead to a paradigm shift for computer simulation.

Accordingly, the present invention discloses a discrete 3-D processor for computing at least a non-arithmetic model, comprising: a plurality of storage-processing units (SPU's), each of said SPU's comprising at least a three-dimensional memory (3D-M) array and an arithmetic logic circuit (ALC), wherein said 3D-M array stores at least a portion of a look-up table (LUT) for said non-arithmetic model, said ALC performs arithmetic operations on selected data from said LUT; first and second dice, wherein said first die comprises said 3D-M array, said second die comprises at least a portion of said ALC and an off-die peripheral-circuit component of said 3D-M array, said first die does not comprise said off-die peripheral-circuit component, said first and second dice are separate dice communicatively coupled by a plurality of inter-die connections; wherein said non-arithmetic model includes more operations than the arithmetic operations provided by said ALC.

[C] Configurable Computing Array

When applied to configurable gate array, the preferred discrete 3-D processor is a discrete 3-D configurable computing array. It can not only customize logic functions and arithmetic functions, but also customize non-arithmetic functions. Accordingly, the present invention discloses a discrete 3-D configurable computing array for customizing at least a non-arithmetic function, comprising: an array of configurable logic elements (CLE's) and/or configurable interconnects (CIT's); an array of configurable computing elements (CCE's) comprising at least a three-dimensional memory (3D-M) array for storing at least a portion of a look-up table (LUT) of said non-arithmetic function; first and second dice, wherein said first die comprises said 3D-M array, said second die comprises at least a portion of said array of CLE's/CIT's and an off-die peripheral-circuit component of said 3D-M array, said first die does not comprise said off-die peripheral-circuit component, said first and second dice are separate dice communicatively coupled by a plurality of inter-die connections; whereby said non-arithmetic function is customized by programming said array of CLE's/CIT's and said array of CCE's; wherein said non-arithmetic function includes more operations than the arithmetic operations provided by said CLE.

The usage cycle of the CCE comprises two stages: a configuration stage and a computation stage. At the configuration stage, the LUT for a non-arithmetic function is loaded into the 3D-M array. At the computation stage, the values of the non-arithmetic function are read out from the LUT. For an electrically re-programmable 3D-M, different non-arithmetic functions can be realized by loading the LUT's of different non-arithmetic functions into the 3D-M array at different usage cycles. Hence, re-configurable computing can be realized.

[D] Pattern Processing

When applied to pattern processing, the preferred discrete 3-D processor is a discrete 3-D pattern processor. Its basic functionality is pattern processing. More importantly, the patterns it processes are stored locally. Because the pattern-storage circuit is close to the pattern-processing circuit, it takes a short time to read new patterns. In addition, the preferred 3-D pattern processor comprises tens of thousands of storage-processing units (SPU's). During pattern processing, the input data are sent to all SPU's and processed simultaneously, thus achieving massive parallelism. The preferred 3-D pattern processor can realize fast and efficient pattern processing for large pattern databases.

Accordingly, the present invention discloses a discrete 3-D pattern processor, comprising: an input for transferring a first portion of a first pattern; a plurality of storage-processing units (SPU's) communicatively coupled with said input, each of said SPU's comprising at least a three-dimensional memory (3D-M) array and a pattern-processing circuit, wherein said 3D-M array stores at least a second portion of a second pattern, said pattern-processing circuit performs pattern processing for said first and second patterns; first and second dice, wherein said first die comprises said 3D-M array, said second die comprises at least a portion of said pattern-processing circuit and an off-die peripheral-circuit component of said 3D-M array, said first die does not comprise said off-die peripheral-circuit component, said first and second dice are separate dice communicatively coupled by a plurality of inter-die connections.

[E] Neural Processing

When applied to neural network, the preferred discrete 3-D processor is a discrete 3-D neuro-processor. Its basic functionality is neural processing. More importantly, the synaptic weights required for neural processing are stored locally. Because the memory storing the synaptic weights is close to the neuro-processing circuit, it takes a short time to read synaptic weights. In addition, the preferred 3-D neuro-processor comprises tens of thousands of storage-processing units (SPU's). During neural processing, the input data are sent to all SPU's and processed simultaneously, thus achieving massive parallelism. The preferred 3-D neural process can realize fast and efficient neural processing.

Accordingly, the present invention discloses a discrete 3-D neuro-processor, comprising: a plurality of storage-processing units (SPU's), each of said SPU's comprising at least a three-dimensional memory (3D-M) array and a neuro-processing circuit, wherein said 3D-M array stores at least a synaptic weight, said neuro-processing circuit performs neural processing with said synaptic weight; first and second dice, wherein said first die comprises said 3D-M array, said second die comprises at least a portion of said neuro-processing circuit and an off-die peripheral-circuit component of said 3D-M array, said first die does not comprise said off-die peripheral-circuit component, said first and second dice are separate dice communicatively coupled by a plurality of inter-die connections.

BRIEF DESCRIPTION OF THE DRAWINGS

FIG. 1AA is a schematic view of a conventional processor (prior art); FIG. 1AB lists all transcendental functions supported by an Intel IA-64 processor (prior art); FIG. 1BA is a circuit block diagram of an amplifier circuit; FIG. 1BB lists number of operations to calculate a current-voltage (I-V) point for various transistor models (prior art); FIG. 1DB shows a tile architecture of the accelerator of FIG. 1DA (prior art); FIG. 1EB is its cross-sectional view;

FIGS. 3A-3D are cross-sectional views of two dice in four preferred discrete 3-D processors;

FIG. 14A is a circuit block diagram of a configurable block used in a preferred 3-D configurable computing array; FIG. 14B lists the functional blocks in the configurable block;

FIGS. 15A-15B are circuit block diagrams of two preferred configurable computing elements (CCE's);

FIG. 22 is a circuit block diagram of a preferred discrete 3-D parallel processor;

FIG. 23 is a circuit block diagram of a SPU in a preferred discrete 3-D pattern processor;

FIG. 24 is a circuit block diagram of a SPU in a preferred discrete 3-D neuro-processor;

Figure 1C:
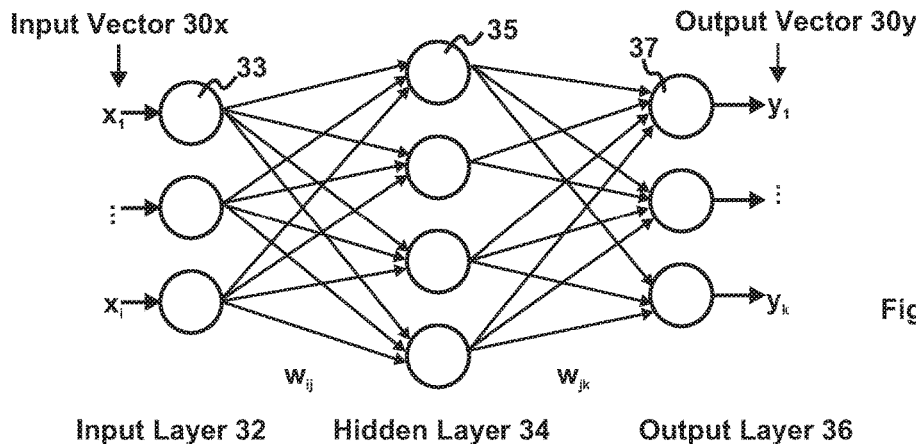
FIG. 1C is a schematic view of a neural network.
Figure 1D:
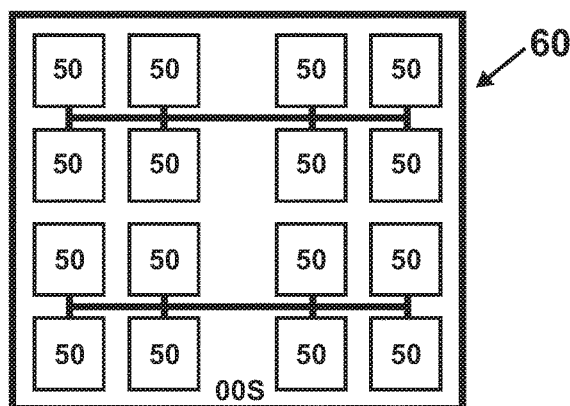
FIG. 1DA shows the tile organization of an accelerator used in a machine-learning supercomputer (prior art)
Figure 1D:
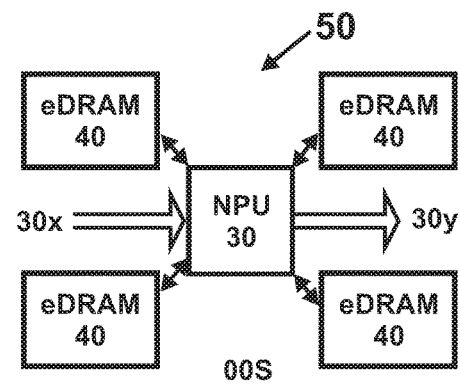

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

As used hereinafter, the symbol "/" means the relationship of "and" or "or". The phrase "memory" is used in its broadest sense to mean any semiconductor device, which can store information for short term or long term. The phrase "memory array (e.g. 3D-M array)" is used in its broadest sense to mean a collection of all memory cells sharing at least an address line. The phrase "(data) processing" is used in its broadest sense to mean modification of information in any manner detectable by an external user or a host; whereas, "peripheral circuit (of the 3D-M array)" does not modify information stored herein from the perspective of an external user or a host. The phrase "on a substrate" is used in its broadest sense to mean that all active elements (e.g. transistors, memory cells) or portions thereof are located in the substrate, even though the interconnects coupling these active elements are located above the substrate. The phrase "above a substrate" is used in its broadest sense to mean that all active elements (e.g. transistors, memory cells) are located above the substrate, not in the substrate. The phrase "communicatively coupled" is used in its broadest sense to mean any coupling whereby electrical signals may be passed from one element to another element. The phrase "look-up table (LUT) (including 3DM-LUT)" could refer to either the data in the LUT, or the memory circuit storing the LUT (i.e. the LUT memory); the present invention does not differentiate them. The phrase "pattern" could refer to either pattern per se, or the data related to a pattern; the present invention does not differentiate them.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Figure 2A:
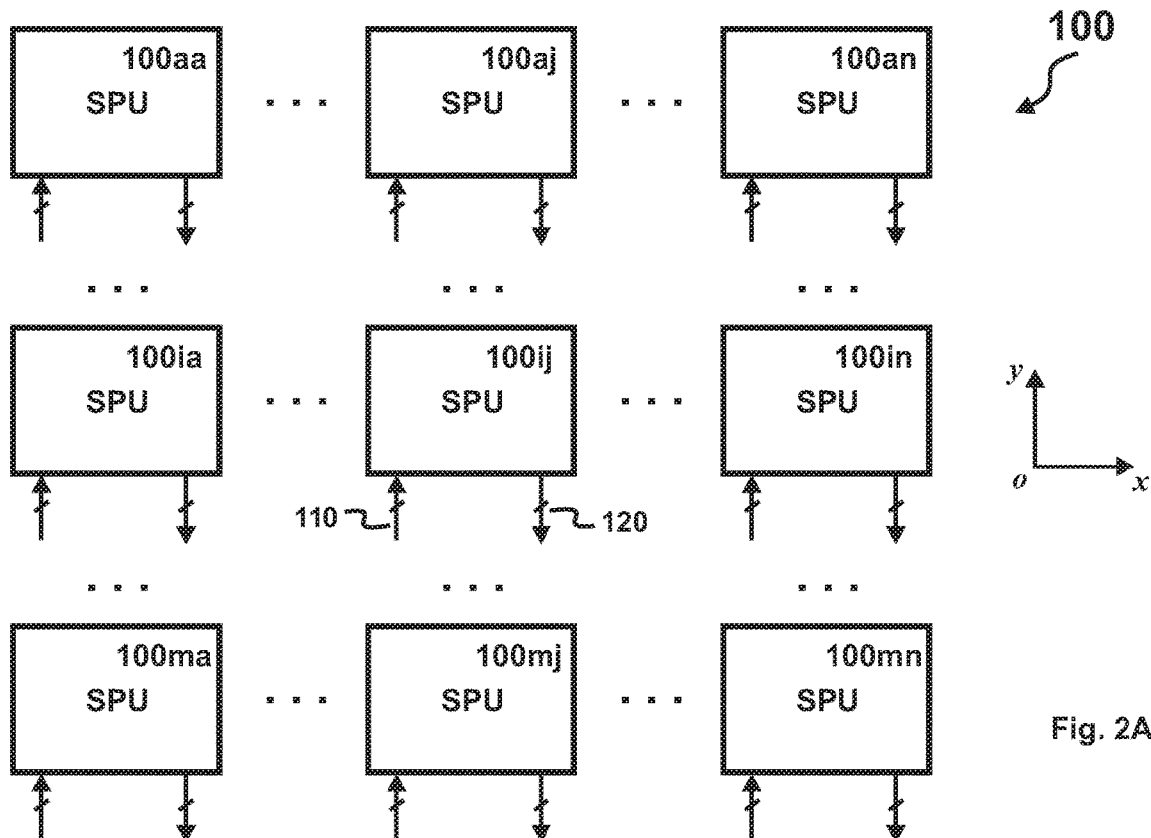
FIG. 2A is a circuit block diagram of a preferred discrete 3-D processor.
Figure 2B:
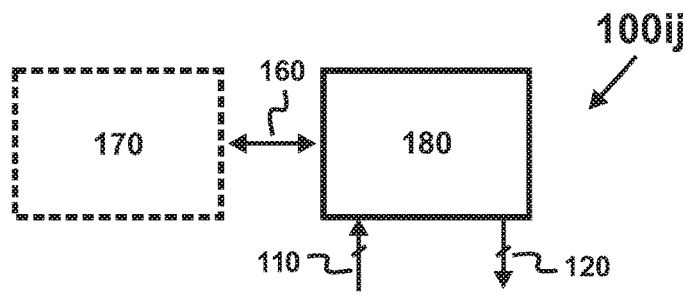
FIG. 2B is a circuit block diagram of a preferred storage-processing unit (SPU)
Figure 2C:
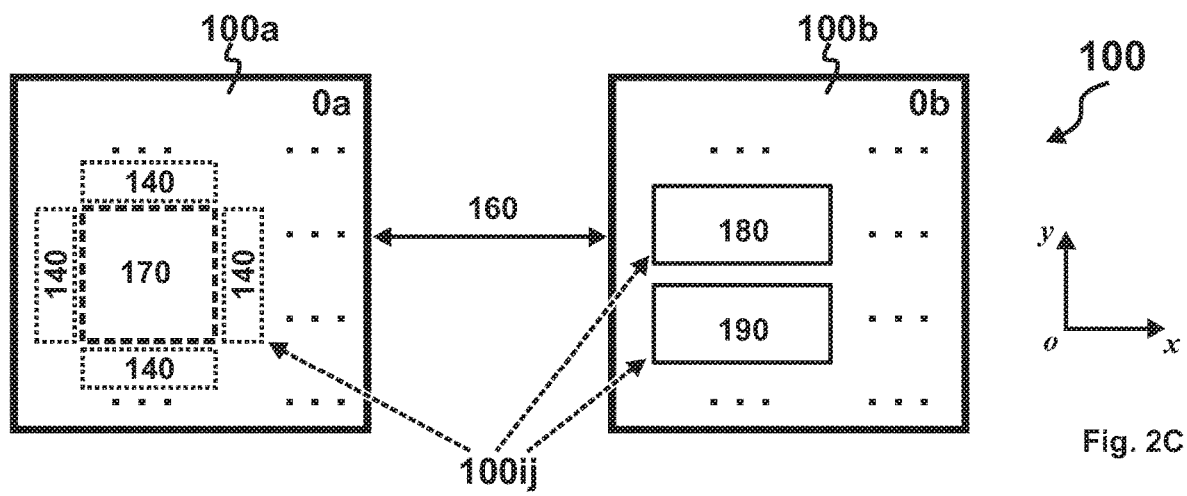
FIG. 2C is a circuit layout view of two dice in the preferred discrete 3-D processor.

Referring now to FIGS. 2A-2C, an overview of a preferred discrete 3-D processor 100 is disclosed. FIG. 2A is its circuit block diagram. The preferred discrete 3-D processor 100 not only processes data, but also stores data. More importantly, most data it processes are stored locally and in close proximity. The preferred discrete 3-D processor 100 comprises an array with m rows and n columns (m×n) of storage-processing units (SPU's) $100aa$-$100mn$. Using the SPU $100ij$ as an example, it has an input 110 and an output 120. In general, the preferred discrete 3-D processor 100 comprises thousands to tens of thousands of SPU's $100aa$-$100mn$ and therefore, it supports massive parallelism.

FIG. 2B is a circuit block diagram of a preferred SPU $100ij$. The SPU $100ij$ comprises a memory circuit 170 and a processing circuit 180, which are communicatively coupled by inter-die connections 160 (referring to FIGS. 3A-3D). The memory circuit 170 comprises at least a 3D-M array. The 3D-M array 170 stores data, whereas the processing circuit 180 processes at least a portion of these data. Because the 3D-M array 170 is disposed on a different die than the processing circuit 180 (referring to FIG. 2C), the 3D-M array 170 is drawn by dashed lines.

FIG. 2C shows a preferred implementation of the preferred discrete 3-D processor 100. It comprises a first die (also known as a memory die) $100a$ and a second die (also known as a processing die) $100b$. The first die $100a$ is built on a first semiconductor substrate $0a$. Its circuits are 3-D circuits, including the 3D-M array 170 and a first peripheral-circuit component 140 thereof. The first peripheral-circuit component 140 includes at least a local peripheral-circuit component of the 3D-M array 170, e.g. local decoders such as a row decoder and/or a column decoder. Located on the same die as the 3D-M array 170, the first peripheral-circuit component 140 is referred to as in-die peripheral-circuit component. Since they are disposed at different physical levels (i.e. the 3D-M array 170 is above the first substrate $0a$, whereas the in-die peripheral-circuit component 140 is on the first substrate $0a$, referring to FIGS. 4A-4D), the 3D-M array 170 and the in-die peripheral-circuit component 140 are drawn by dashed and dotted lines, respectively. The projection of the 3D-M array 170 on the first substrate $0a$ is substantially surrounded by the in-die peripheral-circuit component 140. To reduce the size of the first die $100a$, at least a portion of the in-die peripheral-circuit component 140 may be folded underneath the 3D-M array 170. Just for reason of clarity, the in-die peripheral-circuit component 140 is drawn outside the projection of the 3D-M array 170 on the first substrate $0a$. Not shown in this figure, the 3D-M array 170 and the in-die peripheral-circuit component 140 are communicatively coupled by intra-die connections 150 (referring to FIGS. 4A-4D). On the other hand, the second die $100b$ is built on a second semiconductor substrate $0b$. Its circuits are 2-D circuits, e.g. a processing circuit 180 and a second peripheral-circuit component 190 of the 3D-M array 170. The second peripheral-circuit component 190 could comprise a global and/or local peripheral-circuit component of the 3D-M array 170 (referring to FIGS. 6BA-6BB). Located on a different die than the 3D-M array 170, the second peripheral-circuit component 190 is referred to as an off-die peripheral-circuit component. Note that some processing circuit may also be disposed in the first die $100a$. In the preferred discrete 3-D processor 100, the first and second dice $100a$, $100b$ are communicatively coupled by the inter-die connections 160 (referring to FIGS. 3A-3D).

The preferred discrete 3-D processor 100 is partitioned in such a way that the second die $100b$ comprises as many off-die peripheral-circuit components 190 as possible. A peripheral-circuit component of a 3D-M array 170 is an essential circuit without which the memory die $100a$ cannot perform even the basic memory functions (for example, its performance cannot meet the industrial standards of the memory product of the same type). Typical peripheral-circuit component could be an address decoder, a sense amplifier, a programming circuit, a read-voltage generator, a write-voltage generator, a data buffer, or a portion thereof.

The read/write-voltage generator converts an external power supply into a read/write voltage of the 3D-M array 170, which generally has a different value than the external power supply. The read/write-voltage generator preferably uses a DC-to-DC converter. It could be a step-up circuit, whose output voltage is higher than the input voltage, or a step-down circuit, whose output voltage is lower than the input voltage. Examples of the step-up circuits include a charge-pump circuit and a boost converter, and examples of the step-down circuits include a low dropout circuit and a buck converter.

Referring now to FIGS. 3A-3D, four preferred discrete 3-D processors 100 are shown with focus on the implementations of inter-die connections 160. In FIG. 3A, the first and second dice 100a, 100b are vertically stacked, i.e. stacked along the direction perpendicular to the dice 100a, 100b. Both the first and second dice 100a, 100b face upward (i.e. along the +z direction). They are communicatively coupled by the bond wires 160w, which realize the inter-die connections 160.

In FIG. 3B, the first and second dice 100a, 100b are placed face-to-face, i.e. the first die 100a faces upward (i.e. along the +z direction), while the second die is flipped so that it faces downward (i.e. along the −z direction). They are communicatively coupled by the micro-bumps 160x, which realize the inter-die connections 160. In this preferred embodiment, the first and second dice 100a, 100b have same die sizes. All edges of the first and second dice 100a, 100b are vertically aligned. For example, the left edge of the first die 100a is vertically aligned with the left edge of the second die 100b; and, the right edge of the first die 100a is vertically aligned with the right edge of the second die 100b. This is due to the fact that the preferred discrete 3-D processor 100 is diced from bonded wafers (which bond, e.g. a first wafer and a second wafer, with the first wafer comprising the first die 100a and the second wafer comprising the second dice 100b).

The preferred embodiment of FIG. 3C comprises two memory dice 100a1, 100a2 and a processing die 100b. To avoid confusion, the dice 100a1, 100a2 are referred to as memory dice instead of first dice; and, the die 100b is referred to as the processing die instead of the second die. Each of the memory dice 100a1, 100a2 comprises a plurality of 3D-M arrays 170. The memory dice 100a1, 100a2 are vertically stacked and communicatively coupled by the through-silicon vias (TSV's) 160y. The stack of the memory dice 100a1, 100a2 is communicatively coupled with the processing die 100b through the micro-bumps 160x. The TSV's 160y and the micro-bumps 160x realize the inter-die connections 160. In this preferred embodiment, the processing circuits 180 on the processing die 100b process data from both memory dice 100a1, 100a2. Similar to FIG. 3B, the processing and memory dice 100b, 100a1, 100a2 could have same die sizes; and, all edges of these dice 100b, 100a1, 100a2 could be vertically aligned.

In FIG. 3D, a first dielectric layer 168a is deposited on top of the first die 100a and first vias 160za are etched in the first dielectric layer 168a. Then a second dielectric layer 168b is deposited on top of the second die 100b and second vias 160zb are etching in the second dielectric layer 168b. After flipping the second die 100b and aligning the first and second vias 160za, 160zb, the first and second dice 100a, 100b are bonded. Finally, the first and second dice 100a, 100b are communicatively coupled by the contacted first and second vias 160za, 160zb, which realizes the inter-die connections 160. Because they can be made with the standard manufacturing process, the first and second vias 160za, 160zb are small and numerous. As a result, the inter-die connections 160 have a large bandwidth. In this preferred embodiment, the first and second vias 160za, 160zb are collectively referred to as vertical interconnect accesses (VIA's). Similar to FIG. 3B, the dice 100a, 100b could have same die sizes; and, all edges of the dice 100a, 100b could be vertically aligned.

In the above embodiments, the memory circuit 170 and the processing circuit 180 are close (compared with the conventional von Neumann architecture). In addition, for the embodiments of FIGS. 3B-3D, more particularly for the embodiments of FIGS. 3C-3D, the inter-die connections (e.g. TSV's, or VIA's) 160 are numerous. They can realize a large bandwidth between the memory circuit 170 and the processing circuit 180. Adding massive parallelism (FIG. 2A), the preferred discrete 3-D processor 100 can achieve great performance.

Referring now to FIGS. 4A-4D, four preferred first dice 100a comprising 3D-M arrays 170 are shown. Each of the 3D-M arrays 170 uses monolithic integration per se, i.e. the memory cells are vertically stacked without any semiconductor substrate therebetween.

Based on its physical structure, the 3D-M can be categorized into horizontal 3D-M (3D-$M_H$) and vertical 3D-M (3D-$M_V$). In a 3D-$M_H$, all address lines are horizontal. The memory cells form a plurality of horizontal memory levels which are vertically stacked above each other. A well-known 3D-$M_H$ is 3D-XPoint. In a 3D-$M_V$, at least one set of the address lines are vertical. The memory cells form a plurality of vertical memory strings which are placed side-by-side on/above the substrate. A well-known 3D-$M_V$ is 3D-NAND. In general, the 3D-$M_H$ (e.g. 3D-XPoint) is faster, while the 3D-$M_V$ (e.g. 3D-NAND) is denser.

3D-M can be further categorized into 3D-RAM (random access memory) and 3D-ROM (read-only memory). The 3D-RAM provides random data access and can be used as cache. Examples of 3D-RAM include 3D-SRAM, 3D-DRAM, 3D-RRAM, 3D-MRAM, 3D-FeRAM, and others. The 3D-ROM can store data for long term. It is a non-volatile memory (NVM) and may be electrically writable. Examples of 3D-ROM include 3D-MPROM, 3D-OTP, 3D-MPT, 3D-EPROM, 3D-EEPROM, 3D-flash, 3D-NOR, 3D-NAND, 3D-XPoint, and others.

Based on the programming methods, the 3D-M can be categorized into 3-D writable memory (3D-W) and 3-D printed memory (3D-P). The 3D-W cells are electrically programmable. Based on the number of programmings allowed, the 3D-W can be further categorized into three-dimensional one-time-programmable memory (3D-OTP) and three-dimensional multiple-time-programmable memory (3D-MTP, including re-programmable). Common 3D-MTP includes 3D-XPoint and 3D-NAND. Other 3D-MTP's include memristor, resistive random-access memory (RRAM or ReRAM), phase-change memory (PCM), programmable metallization cell (PMC) memory, conductive-bridging random-access memory (CBRAM), and the like.

For the 3D-P, data are recorded into the 3D-P cells using a printing method during manufacturing. These data are fixedly recorded and cannot be changed after manufacturing. The printing methods include photo-lithography, nano-imprint, e-beam lithography, DUV lithography, and laser-programming, etc. An exemplary 3D-P is three-dimensional mask-programmed read-only memory (3D-MPROM), whose data are recorded by photo-lithography. Because a 3D-P cell does not require electrical programming and can be biased at a larger voltage during read than the 3D-W cell, the 3D-P is faster.

Figure 4A:
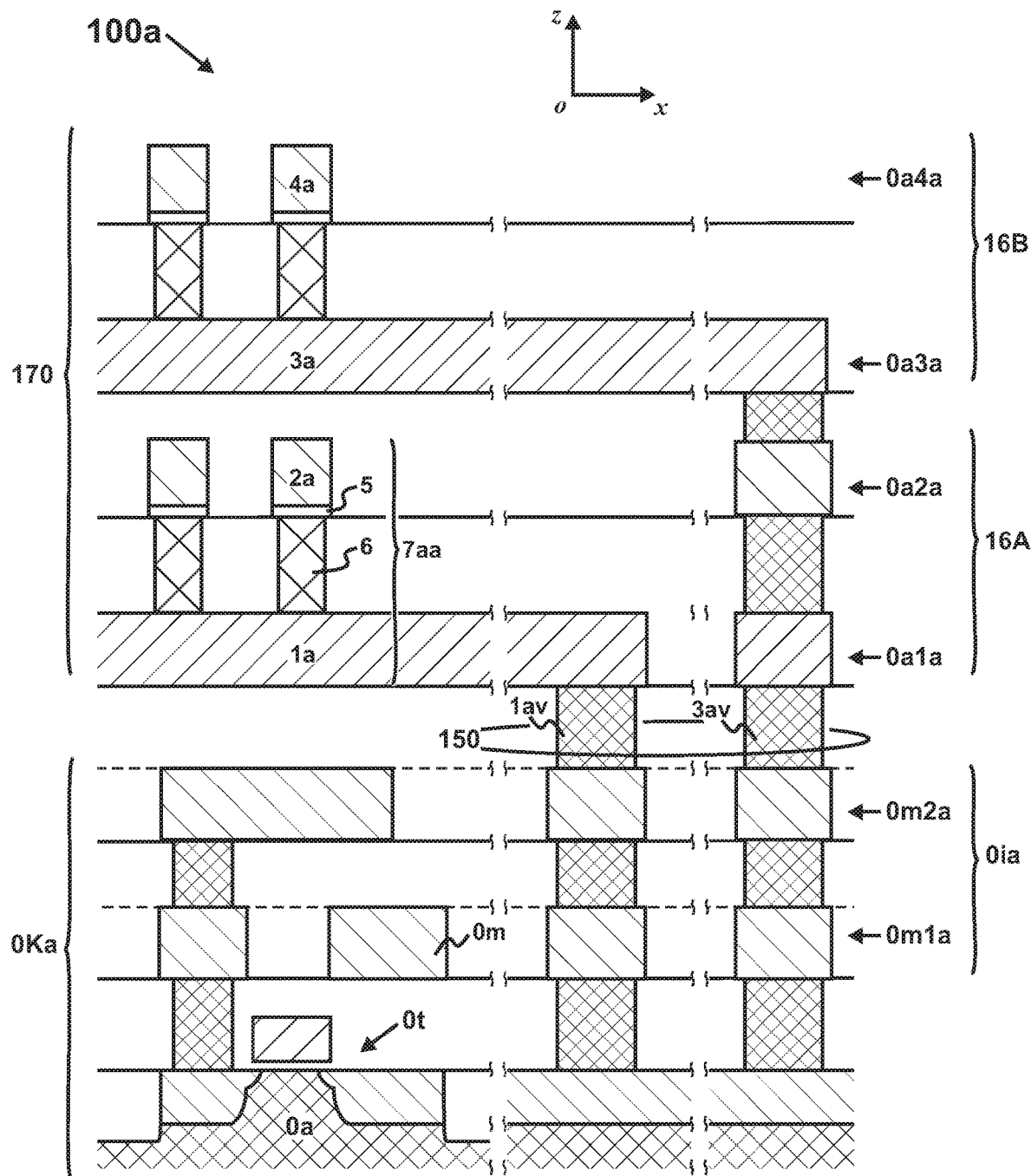
FIGS. 4A-4D are cross-sectional views of four preferred first dice.
Figure 4B:
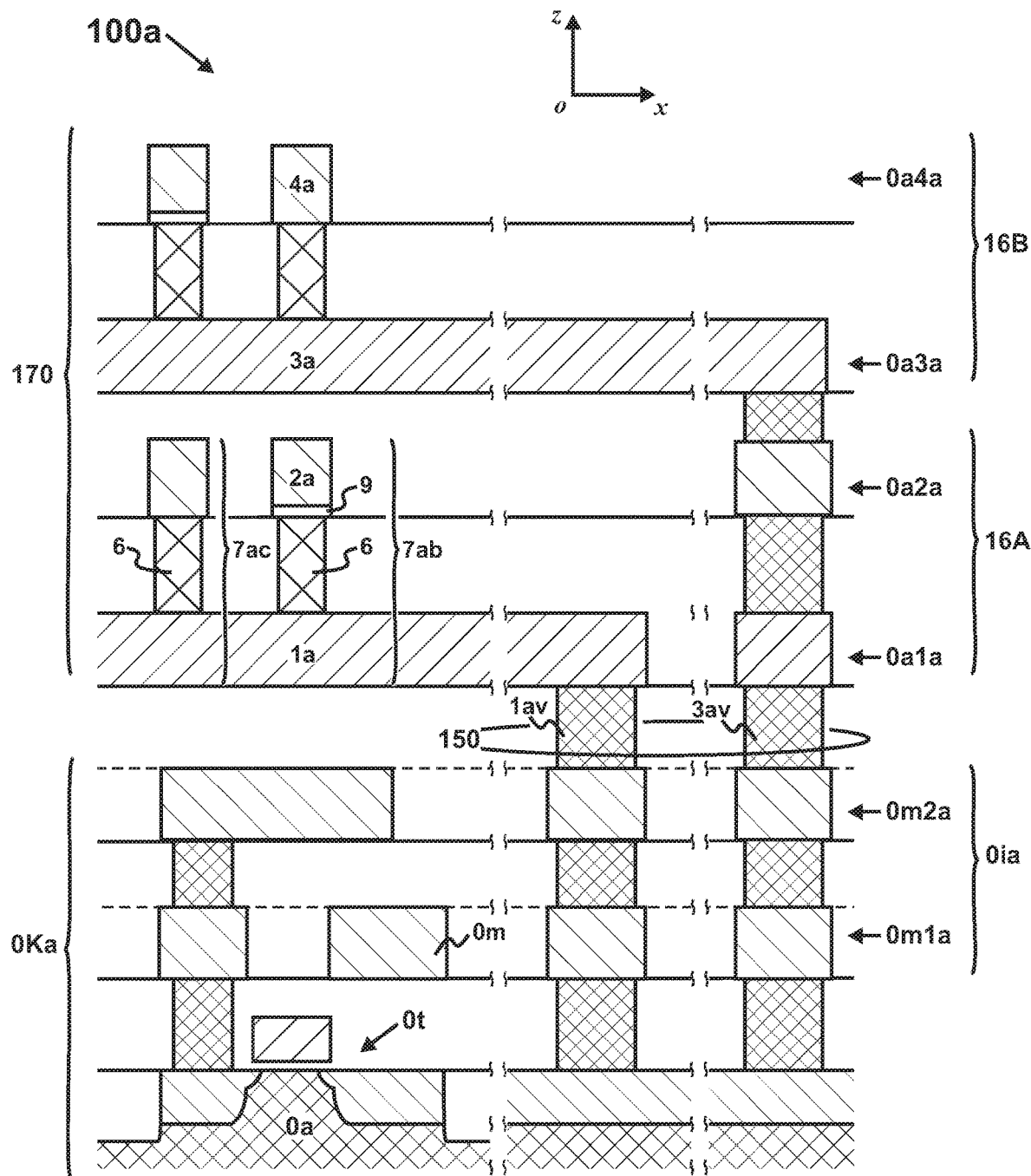

In FIGS. 4A-4B, the first die 100a comprises a substrate circuit 0Ka and a plurality of 3D-$M_H$ arrays 170 vertically stacked thereon. The substrate circuit 0Ka could include in-die peripheral-circuit components 140 (e.g. local decoders) of the 3D-$M_H$ arrays 170. It comprises transistors 0t and substrate interconnects 0ia. The transistors 0t are disposed on a first semiconductor substrate 0a and communicatively coupled by the substrate interconnects 0ia. The substrate interconnects 0ia include two interconnect layers 0m1a-0m2a, each of which comprises a plurality of interconnects 0m on a same physical plane. The 3D-$M_H$ array 170 includes four address-line layers 0a1a-0a4a. Each address-line layer (e.g. 0a1a) comprises a plurality of address lines (e.g. 1a) on a same physical plane. These address-line layers 0a1a-0a4a form two memory levels 16A, 16B, with the memory level 16A stacked on the substrate circuit 0Ka and the memory level 16B stacked on the memory level 16A. Memory cells (e.g. 7aa) are disposed at the intersections between two address lines (e.g. 1a, 2a). The memory levels 16A, 16B are communicatively coupled with the substrate circuit 0Ka through contact vias 1av, 3av. These contact vias 1av, 3av collectively form intra-die connections 150. The contact vias 1av, 3av comprise a plurality of vias, each of which penetrates through a dielectric level and communicatively couples the vias above and below. In these figures, the substrate circuit 0Ka comprises at least a portion of the in-die peripheral-circuit components of the 3D-$M_H$ arrays 170. In some embodiments, the substrate circuit 0Ka may further include a portion of the processing circuit. Note that the intra-die connections 150 of FIGS. 4A-4B are substantially different from the inter-die connections 160 of FIGS. 3A-3D. The intra-die connections 150 are disposed within a die. They are just regular vias whose size/spacing/pitch range from nanometers to sub-micrometers. The inter-die connections 160 are disposed between different dice. They include bond wires, TSV's or microbumps, whose size/spacing/pitch range from micrometers to hundreds of micrometers. These size/spacing/pitch differences can result in different design methodologies. The 3D-M array 170 can be directly (i.e. without decoders) coupled with the in-die peripheral-circuit components 140 through the intra-die connections 150. On the other hand, the 3D-M array 170 cannot be directly coupled with the off-die peripheral-circuit components 190 through the inter-die connections 160. To be more specific, the 3D-M array 170 needs decoders before it can be coupled with the off-die peripheral-circuit components 190 through the inter-die connections 160.

The 3D-$M_H$ arrays 170 in FIG. 4A are 3D-W arrays. Its memory cell 7aa comprises a programmable layer 5 and a diode layer 6. The programmable layer 5 could be an antifuse layer (which can be programmed once and used for the 3D-OTP) or a resistive RAM (RRAM) layer (which can be re-programmed and used for the 3D-MTP). The diode is broadly interpreted as any device whose resistance at the read voltage is substantially lower than those when the applied voltage has a magnitude smaller than or polarity opposite to that of the read voltage. In other literatures, diode in the 3D-M is also referred to as selector, selecting device, or other names. The diode could be a semiconductor diode (e.g. p-i-n silicon diode), OTS (Ovonic threshold switching) diode, or a metal-oxide (e.g. $TiO_2$) diode.

The 3D-$M_H$ arrays 170 in FIG. 4B are 3D-P arrays. It has at least two types of memory cells: a high-resistance memory cell 7ab, and a low-resistance memory cell 7ac. The low-resistance memory cell 7ac comprises a diode layer 6, which is similar to that in the 3D-W; whereas, the high-resistance memory cell 7ab comprises at least a high-resistance layer 9, which could simply be a layer of insulating dielectric (e.g. silicon oxide, or silicon nitride). It can be physically removed at the location of the low-resistance memory cell 7ac during manufacturing.

Figure 4C:
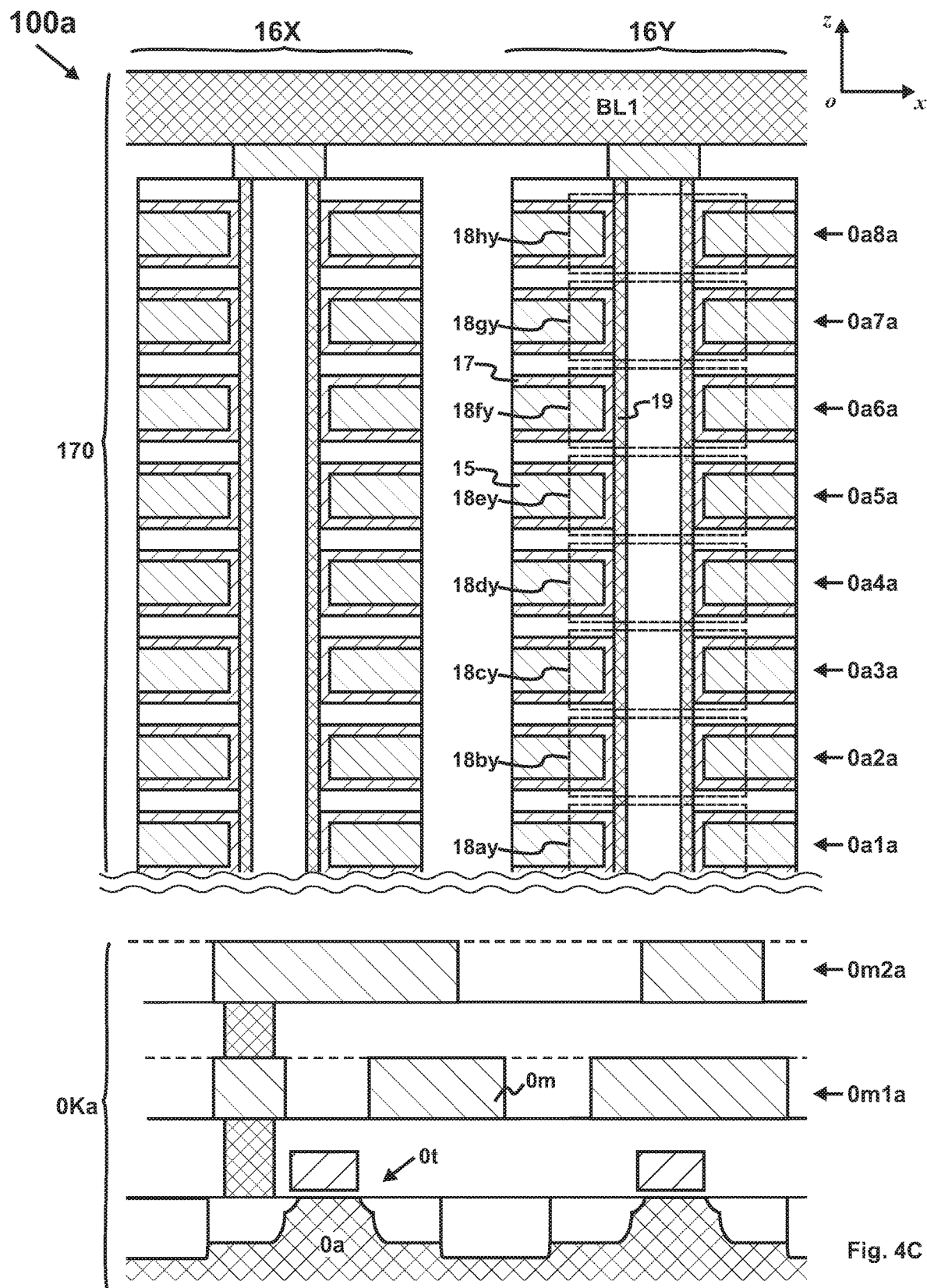
Figure 4D:
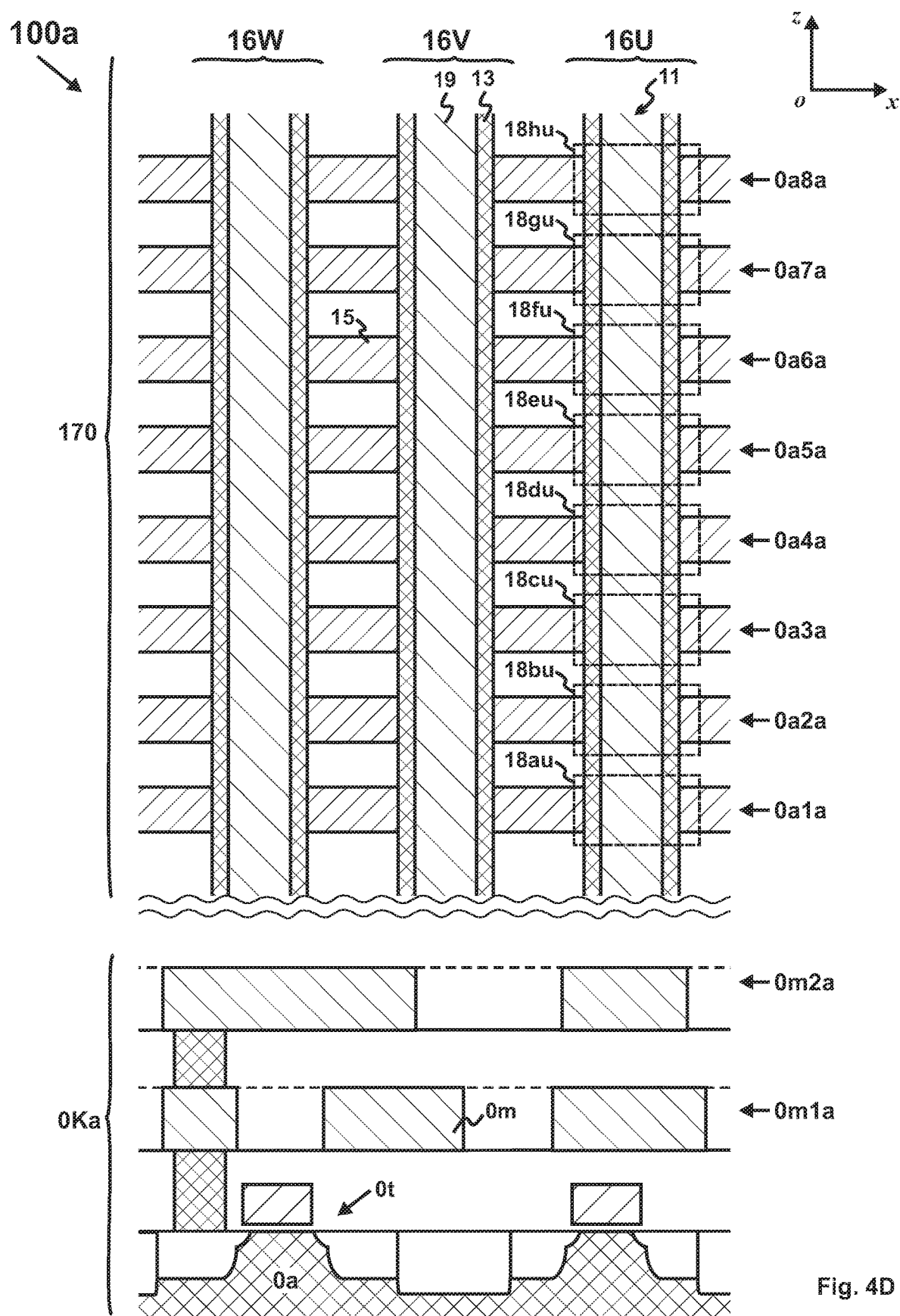

In FIGS. 4C-4D, the first die 100a comprises a substrate circuit 0Ka and a plurality of 3D-$M_V$ arrays 170 vertically stacked thereon. The substrate circuit 0Ka could include in-die peripheral-circuit components 140 (e.g. local decoders) of the 3D-$M_V$ arrays 170. The 3D-$M_V$ array 170 comprises a plurality of vertically stacked horizontal address-line layers 0a1a-0a8a. Each horizontal address-line layer (e.g. 0a5a) comprises a plurality of horizontal address lines (e.g. 15) on a same physical plane. The 3D-$M_V$ array 170 also comprises a set of vertical address lines, which are perpendicular to the surface of the substrate 0a. In some embodiments of the 3D-$M_V$, at least a portion of the decoders are formed on the vertical address lines. For reason of simplicity, the intra-die connections 150 between the 3D-$M_V$ arrays 170 and the substrate circuit 0Ka are not drawn.

The preferred 3D-$M_V$ array 170 in FIG. 4C is based on vertical transistors or transistor-like devices. It comprises a plurality of vertical memory strings 16X, 16Y placed side-by-side. Each memory string (e.g. 16Y) comprises a plurality of vertically stacked memory cells (e.g. 18ay-18hy). Each memory cell (e.g. 18fy) comprises a vertical transistor, which includes a gate (acts as a horizontal address line) 15, a storage layer 17, and a vertical channel (acts as a vertical address line) 19. The storage layer 17 could comprise oxide-nitride-oxide layers, oxide-poly silicon-oxide layers, or the like. This preferred 3D-$M_V$ array 170 is a 3D-NAND and its manufacturing details are well known to those skilled in the art.

The preferred 3D-$M_V$ array 170 in FIG. 4D is based on vertical diodes or diode-like devices. In this preferred embodiment, the 3D-$M_V$ array comprises a plurality of vertical memory strings 16U-16W placed side-by-side. Each memory string (e.g. 16U) comprises a plurality of vertically stacked memory cells (e.g. 18au-18hu). The 3D-$M_V$ array 170 comprises a plurality of horizontal address lines (word lines) 15 which are vertically stacked above each other. After etching through the horizontal address lines 15 to form a plurality of vertical memory wells 11, the sidewalls of the memory wells 11 are covered with a programmable layer 13. The memory wells 11 are then filled with a conductive materials to form vertical address lines (bit lines) 19. The conductive materials could comprise metallic materials or doped semiconductor materials. The memory cells 18au-18hu are formed at the intersections of the word lines 15 and the bit line 19. The programmable layer 13 could be one-time-programmable (OTP, e.g. an antifuse layer) or multiple-time-programmable (MTP, e.g. an RRAM layer).

To minimize interference between memory cells, a diode is preferably formed between the word line 15 and the bit line 19. In a first embodiment, this diode is the programmable layer 13 per se, which could have an electrical characteristic of a diode. In a second embodiment, this diode is formed by depositing an extra diode layer on the sidewall of the memory well (not shown in this figure). In a third embodiment, this diode is formed naturally between the word line 15 and the bit line 19, i.e. to form a built-in junction (e.g. P-N junction, or Schottky junction). More details on the built-in diode are disclosed in U.S. patent application Ser. No. 16/137,512, filed on Sep. 20, 2018.

Figure 5:
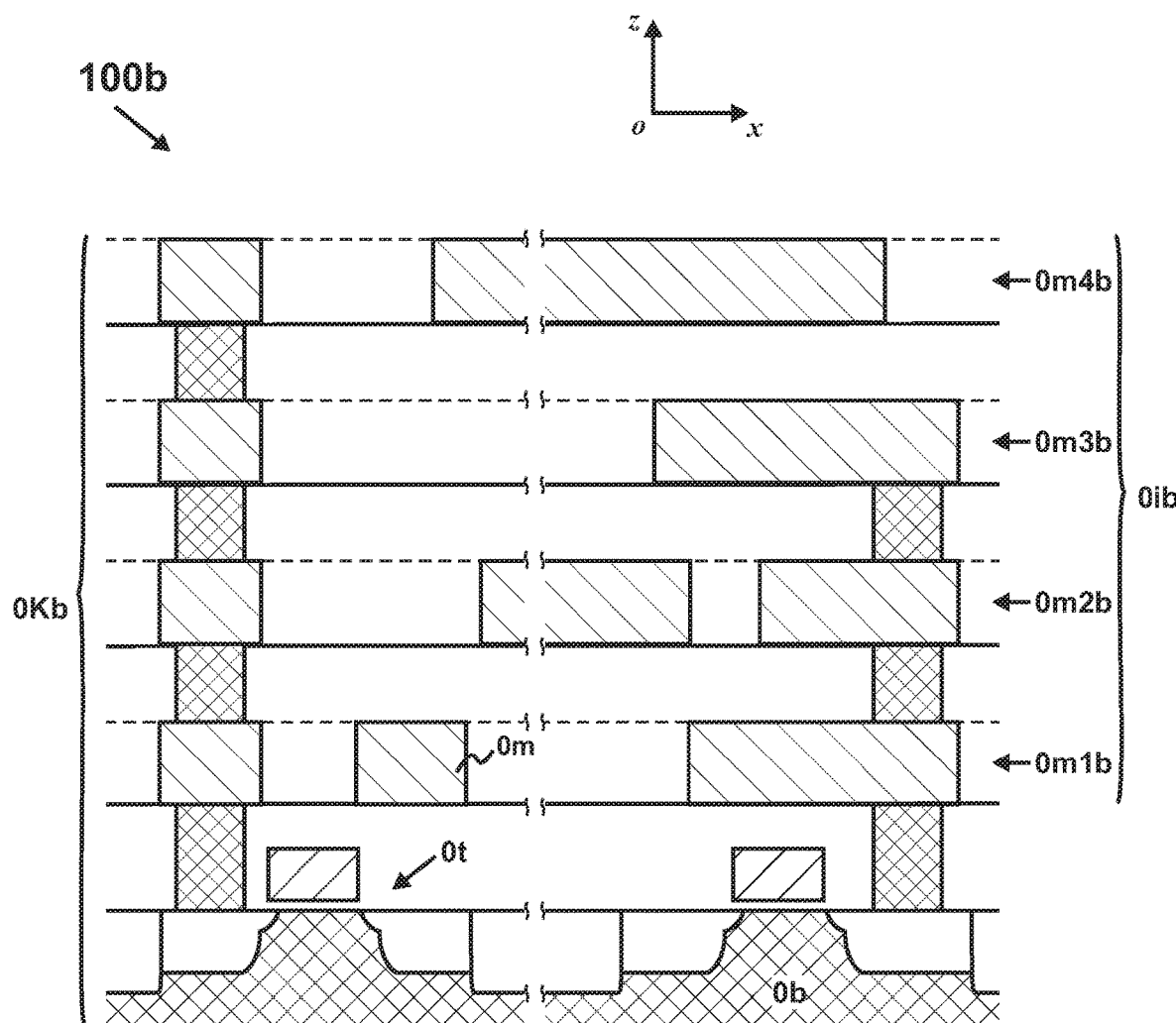
FIG. 5 is a cross-sectional view of a preferred second die.

Referring now to FIG. 5, a preferred second die 100b is disclosed. It is a conventional 2-D circuit 0Kb comprising transistors 0t and interconnects 0ib. The transistors 0t are formed on a second semiconductor substrate 0b and communicatively coupled by the interconnects 0ib. In this embodiment, the interconnects 0ib comprises four interconnect layers 0m1b-0m4b. Each interconnect layer (e.g. 0m1b) comprises a plurality of interconnects (e.g. 0m) on a same physical plane.

Comparing the first die 100a (FIGS. 4A-4D) and the second die 100b (FIG. 5), the number of the BEOL layers in the first die 100a is more than that in the second die 100b. For example, the first die 100a in FIGS. 4A-4B comprises six BEOL layers (0m1a-0m2a, 0a1a-0a4a), while the first die 100a in FIGS. 4C-4D comprises ten BEOL layers (0m1a-0m2a, 0a1a-0a8a), both of which are larger than the four BEOL layers (0m1b-0m4b) of the second die 100b in FIG. 5. Even the number of the address-line layers in the first die 100a is larger than or equal to the number of BEOL layers (i.e. interconnect layers) of the second die 100b. More particularly, for the 3D-M$_V$ arrays 170, the number of the address-line layers (roughly equal to the number of memory cells on each memory string, is approaching one hundred and increasing) is substantially larger than (e.g. at least twice as much as) the number of interconnects 0ib (e.g. four) in the second die 100b.

On the other hand, because the second die 100b is designed and manufactured independently, the number of the interconnect layers in its interconnects 0ib is larger than the number of the interconnect layers in the substrate circuit 0Ka of the first die 100a. For example, the second die 100b of FIG. 5 comprises four interconnect layers (0m1b-0m4b), larger than the two interconnect layers (0m1a-0m2a) of the first die 100a in FIGS. 4A-4D. As a result, the circuit layout in the second die 100b is much easier than the first die 100a (or, the integrated 3-D processor 80). Moreover, the second die 100b may comprise high-speed interconnect materials (e.g. copper), while the substrate circuit 0ia of the first die 100a (or, the integrated 3-D processor 80) could only use high-temperature interconnect materials (e.g. tungsten), which generally are slower. In other words, the materials used in the interconnects 0ib of the second die 100b have a lower resistivity than the materials used in the interconnects 0ia of the first die 100a.

Figure 6B:
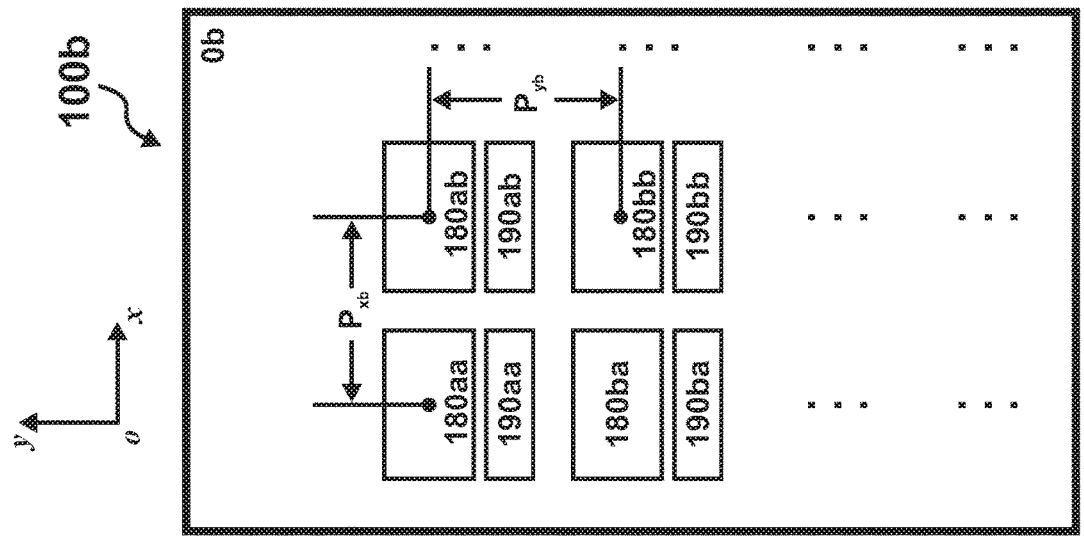
FIGS. 6BA-6BB are circuit layout views of two preferred second dice.
Figure 6B:
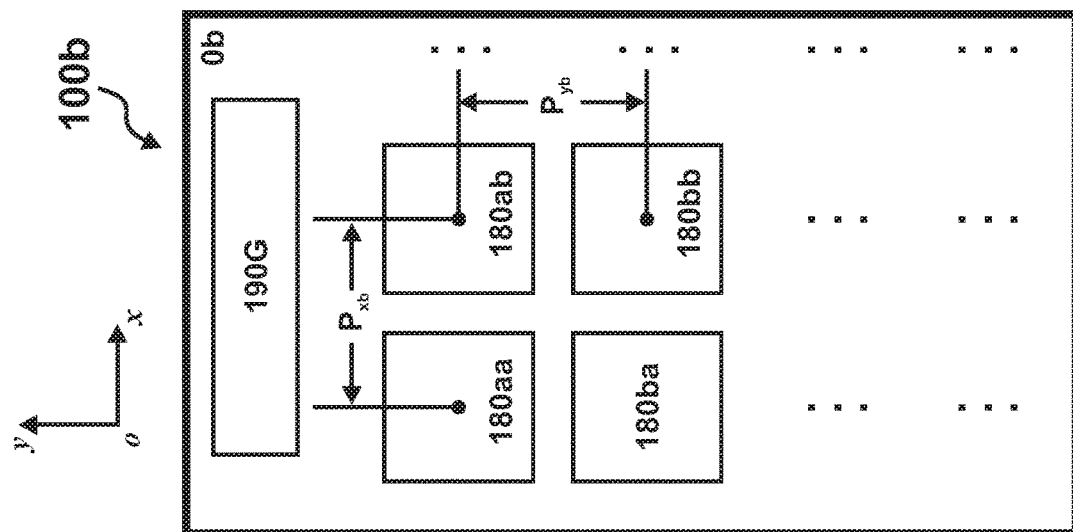
Figure 6A:
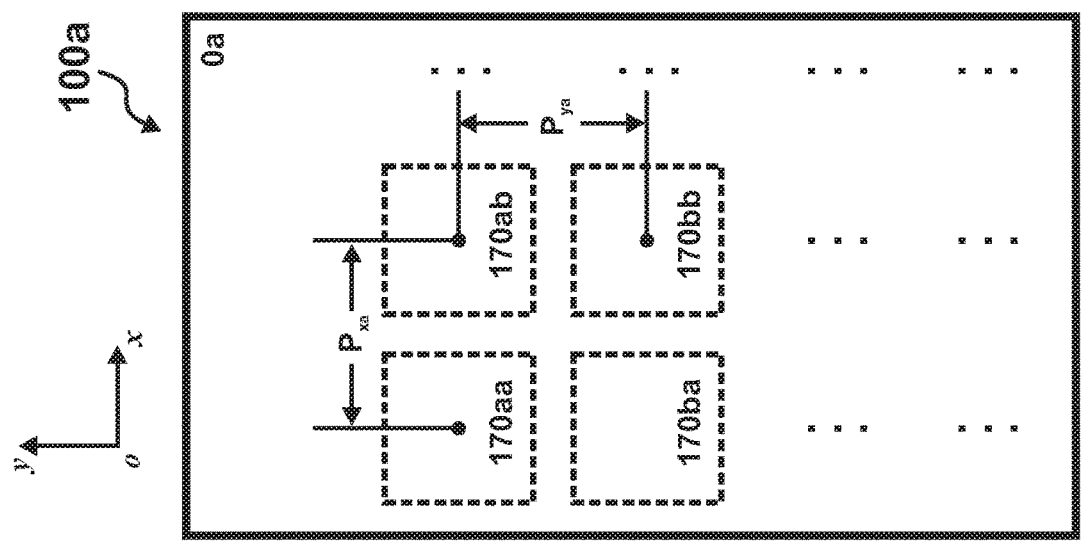
FIG. 6A is a circuit layout view of a preferred first die.

Referring now to FIGS. 6A-6BB, a preferred first die 100a and two preferred second dice 100b are shown. These figures disclose more details than FIG. 2C. The preferred embodiment in these figures corresponds to that in FIG. 7A and FIG. 8A. To those skilled in the art, these layout designs can be easily extended to those in FIG. 7B and FIG. 8B, as well as FIG. 7C And FIG. 8C.

In FIG. 6A, the preferred first die 100a comprises a plurality of 3D-M arrays 170aa-170bb . . . . For reason of simplicity, the in-die peripheral-circuit components 140 of the 3D-M arrays 170 are not shown in this figure. The pitches $P_{xa}$, $P_{ya}$ of the 3D-M arrays are the x- or y-distances between the centers of adjacent 3D-M arrays along the x- and y-directions. In FIG. 6BA, a preferred second die 100b comprises a plurality of processing circuits 180aa-180mn and an off-die global peripheral-circuit component 190G. The off-die global peripheral-circuit component 190G is located outside the projections of the 3D-M arrays 170aa-170bb . . . on the second substrate 0b. The pitches $P_{xb}$, $P_{yb}$ of the processing circuits are the x- or y-distances between the centers of adjacent processing circuits along the x- and y-directions. The preferred 3-D processor 100 in FIG. 6A and FIG. 6BA adopts an "all-matching" design, i.e. each 3D-M array (e.g. 170bb) is vertically aligned and communicatively coupled with a single processing circuit (e.g. 180bb); and, each processing circuit (e.g. 180bb) is vertically aligned and communicatively coupled with at least one 3D-M array (e.g. 170bb). Note that each processing circuit (e.g. 180ij) can be vertically aligned and communicatively coupled with multiple 3D-M arrays (e.g. 170ijA-170ijD, 170ijW-170ijZ) (referring to FIGS. 8B-8C).

In FIG. 6BB, another preferred second die 100b further comprises a plurality of off-die local peripheral-circuit components 190aa-190bb . . . . Apparently, the preferred 3-D processor 100 in FIG. 6A and FIG. 6BB may also adopt the "all-matching" design. Besides the matching requirements specified in the previous paragraph, each off-die local peripheral-circuit component (e.g. 190bb) is vertically aligned and communicatively coupled with a 3D-M array (e.g. 170bb). The preferred embodiment of FIG. 6BB may also comprise a global peripheral-circuit component 190G (not shown here). As used hereinafter, the off-die local peripheral-circuit components 190aa-190bb . . . and the off-die global peripheral-circuit component 190G are collectively referred to as off-die peripheral-circuit components 190.

In the preferred embodiments of FIGS. 6A-6BB, the local peripheral-circuit component generally includes at least a portion of an address decoder, a sense amplifier, or a programming circuit. It performs at least a portion of decoding and read/write operations. The global peripheral-circuit component 190G generally includes at least a portion of a read-voltage generator, a write-voltage generator, or a data buffer. There are many other ways to partition the local and global peripheral-circuit components.

Figure 7A:
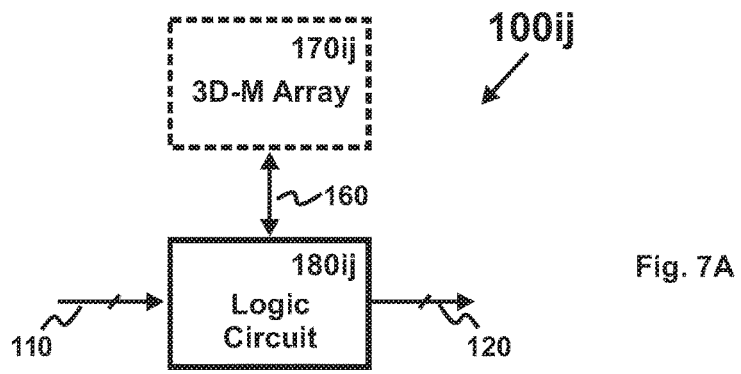
FIGS. 7A-7C are circuit block diagrams of three preferred SPU's.
Figure 7B:
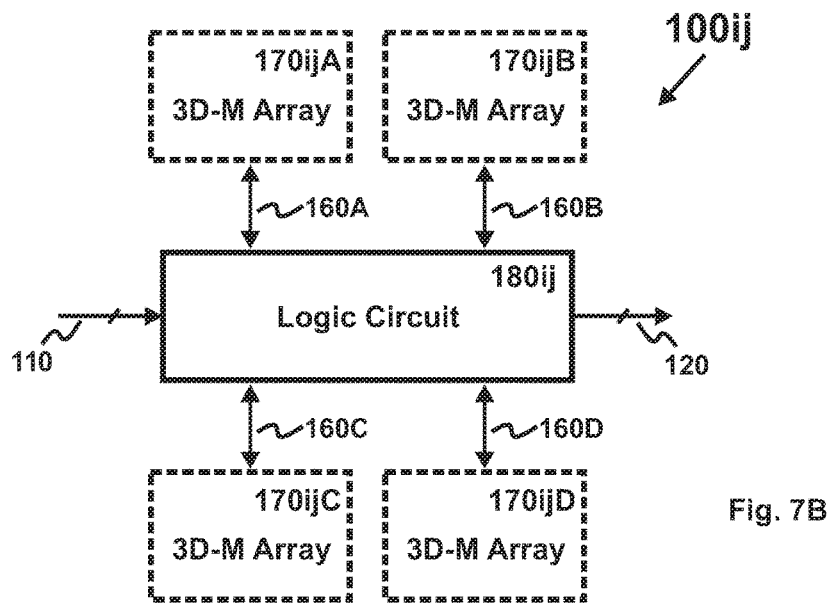
Figure 7C:
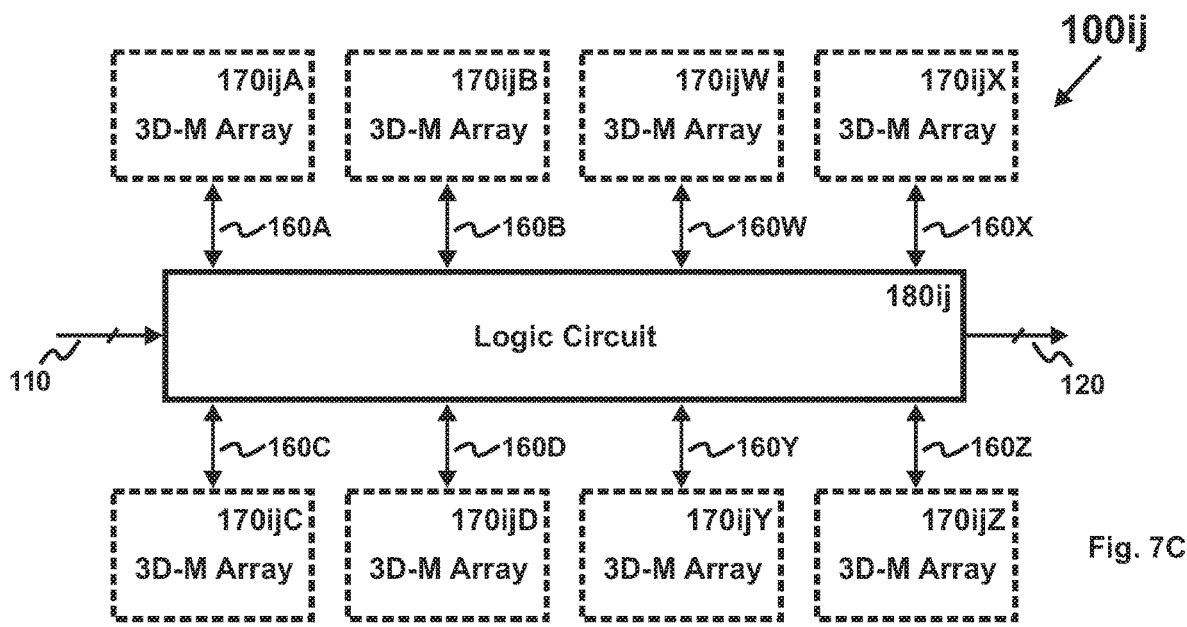
Figure 8A:
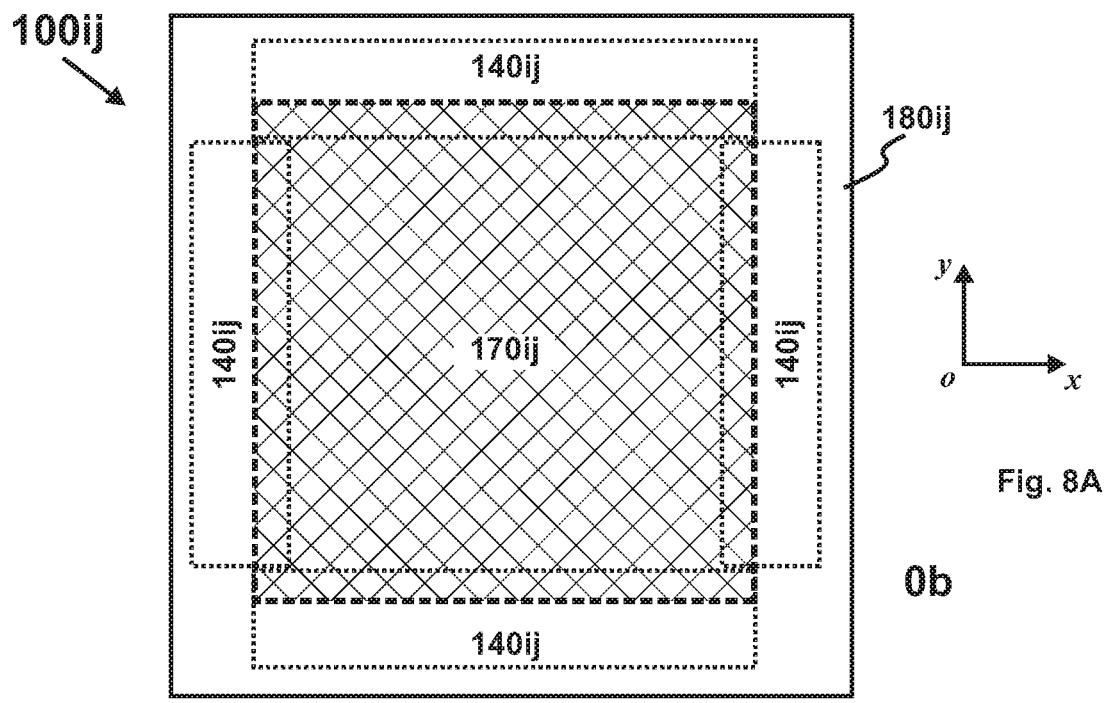
FIGS. 8A-8C are circuit layout views of three preferred SPU's showing the projections of the 3D-M arrays and their in-die peripheral-circuit components on the second dice.
Figure 8B:
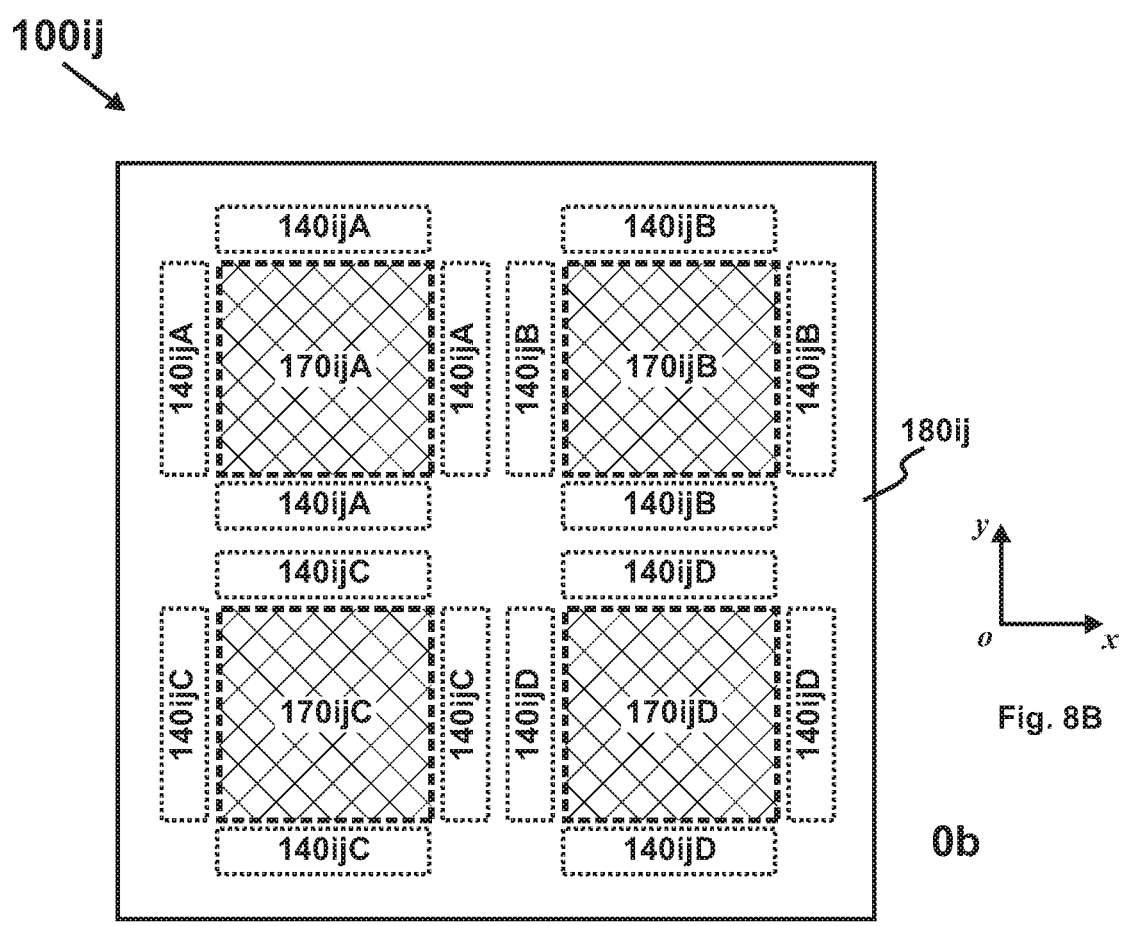
Figure 8C:
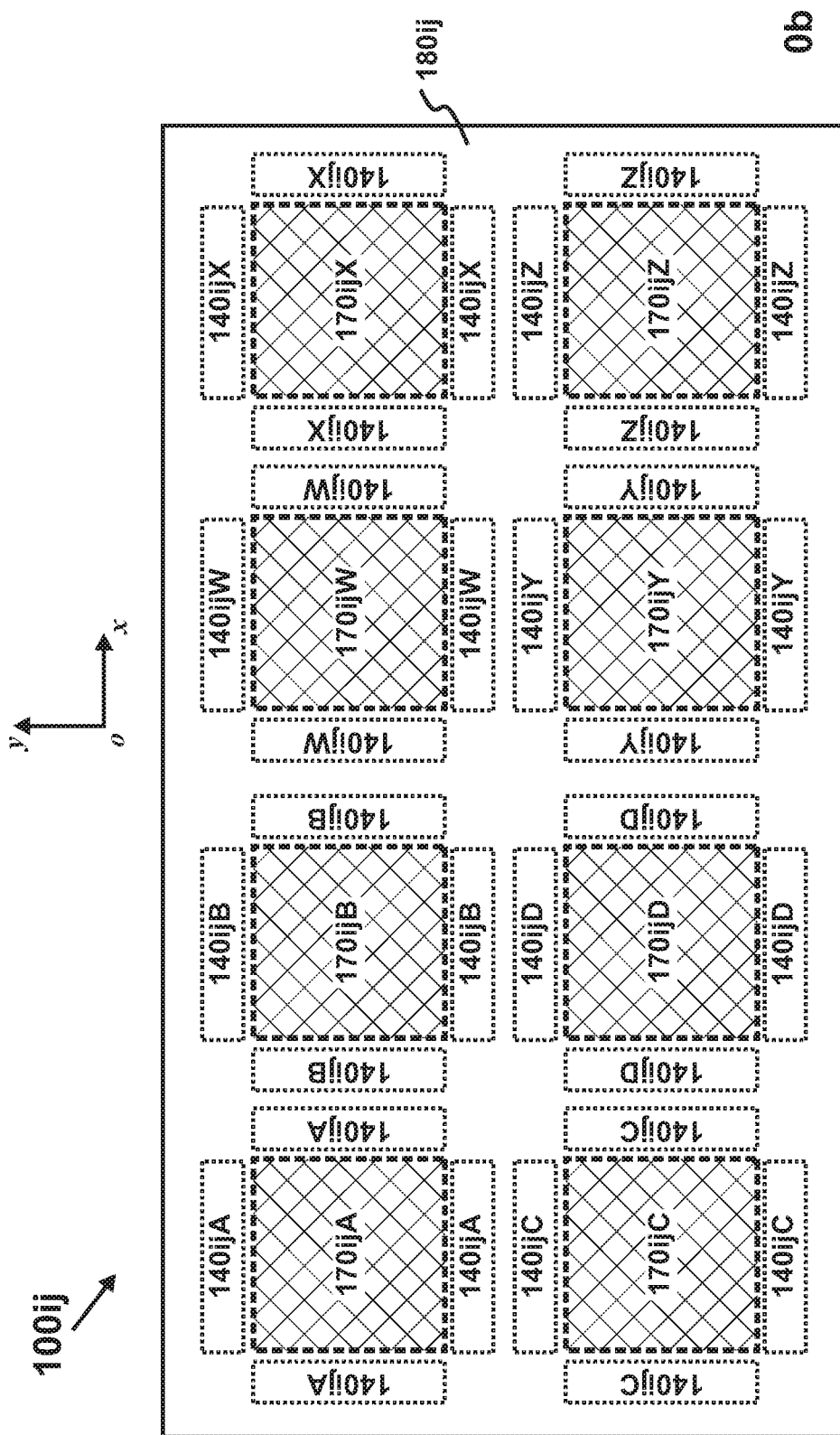

Referring now to FIGS. 7A-8C, three preferred SPU 100ij are shown. FIGS. 7A-7C are their circuit block diagrams (for reason of simplicity, the in-die and off-die peripheral-circuit components 140ij, 190ij are not shown in FIGS. 7A-7C) and FIGS. 8A-8C are their circuit layout views. In these preferred embodiments, a processing circuit 180ij serves different number of 3D-M arrays 170ij.

In FIG. 7A, the processing circuit 180ij serves one 3D-M array 170ij, i.e. it processes the data stored in the 3D-M array 170ij. In FIG. 7B, the processing circuit 180ij serves four 3D-M arrays 170ijA-170ijD, i.e. it processes the data stored in the 3D-M arrays 170ijA-170ijD. In FIG. 7C, the processing circuit 180ij serves eight 3D-M array 170ijA-170ijD, 170ijW-170ijZ, i.e. it processes the data stored in the 3D-M array 170ijA-170ijD, 170ijW-170ijZ. As will become apparent in FIGS. 8A-8C, the more 3D-M arrays it serves, a larger area and more functionalities the processing circuit 180ij will have. In FIGS. 7A-7C, because they are located on a different die 100a than the processing circuit 180ij (referring to FIG. 2C and FIGS. 6A-6BB), the 3D-M arrays 170ij-170ijZ are drawn by dashed lines.

FIGS. 8A-8C disclose the circuit layouts of the second die 100b, as well as the projections of the 3D-M arrays 170ij and their in-die peripheral-circuit components 140ij (physically located in the first die 100a) on the second substrate 0b. For reason of simplicity, the off-die peripheral-circuit components 190ij (referring to FIGS. 6BA-6BB) are not shown in these figures. For reason of clarity, the processing circuit 190ij is drawn larger than the projections of the 3D-M arrays 170ij (170ijA-170ijD, 170ijW-170ijZ) and their in-die peripheral-circuit components 140ij (140ijA-140ijD, 140ijW-140ijZ) on the second substrate 0b. In some cases, the processing circuit 190ij could be smaller than the projections.

The embodiment of FIG. 8A corresponds to that of FIG. 7A. This figure shows the projections of the 3D-M array 170ij, its in-die peripheral-circuit component 140ij, and the processing circuit 180ij on the second substrate 0b. The processing circuit 180 is disposed in the second die 100b and is drawn by solid line. The processing circuit 180 and the 3D-M array 170ij at least partially overlap. The 3D-M array 170ij and its in-die peripheral-circuit component 140ij are disposed in the first die 100a (referring to FIGS. 4A-4D). Because they are disposed at different physical levels, the 3D-M array 170ij and its in-die peripheral-circuit component 140ij are drawn by dashed and dotted lines, respectively. In this preferred embodiment, the pitches $P_{xb}$, $P_{yb}$ of the processing circuit 180ij are equal to the pitches $P_{xa}$, $P_{ya}$ of the 3D-M array 170ij.

The embodiment of FIG. 8B corresponds to that of FIG. 7B. Similar to FIG. 8A, to show they are located at different physical levels, the processing circuit 180ij, the 3D-M array 170ij and its in-die peripheral-circuit component 140ij are drawn by solid, dashed and dotted lines, respectively. In this preferred embodiment, the processing circuit 180ij overlaps four 3D-M arrays 170ijA-170ijD. Because the in-die peripheral-circuit components 140ijA-140ijD won't interfere with the layout of the processing circuit 180ij, the processing circuit 180ij can be laid out freely. Because it is four times larger than the 3D-M arrays 170ijA-170ijD, the processing circuit 180ij has more complex functionalities than that of FIG. 8A.

The embodiment of FIG. 8C corresponds to that of FIG. 7C. In this preferred embodiment, the processing circuit 180ij overlaps eight 3D-M arrays 170ijA-170ijD, 170ijW-170ijZ. Because the in-die peripheral-circuit components 140ijA-140ijD, 140ijW-140ijZ won't interfere with the layout of the processing circuit 180ij, the processing circuit 180ij can be laid out freely. Because it is eight times larger than the 3D-M arrays 170ijA-170ijD, 170ijW-170ijZ, the processing circuit 180ij has even more complex functionalities than that of FIG. 8A. It should be apparent to those skilled in the art that each SPU may comprise more than eight 3D-M arrays Designed and manufactured separately, the first and second dice 100a, 100b have substantially different BEOL structures. Because the BEOL structures of the second die 100b could be independently optimized, the off-die peripheral-circuit components 190 and the processing circuits 180 could have a lower cost and a better performance than their counterparts in the integrated 3-D processor 80. In the following paragraphs, the discrete 3-D processor 100 is compared with the integrated 3-D processor 80 in several aspects.

First of all, because it does not include the off-die peripheral-circuit component 190 and the processing circuit 180, the first die 100a has a better array efficiency. In addition, as a 2-D circuit, the second die 100b comprises substantially fewer BEOL layers than the integrated 3-D processor, and can be made with the conventional manufacturing process. Because the wafer cost is roughly proportional to the number of BEOL layers, the second die 100b would have a much lower wafer cost than the integrated 3-D processor 80. Hence, the total die cost of the discrete 3-D processor 100 (which includes first and second dice 100a, 100b) is lower than that of the integrated 3-D processor 80 (which includes a single die). Even though the extra bonding cost is counted, the discrete 3-D processor 100 still has a lower overall cost than the integrated 3-D processor 80 for a given storage capacity.

Secondly, because they can be independently optimized, the off-die peripheral-circuit components 190 and the processing circuits 180 of the preferred discrete 3-D processor 100 have a better performance than their counterparts in the integrated 3-D processor 80. In one preferred embodiment, the number of the interconnect layers (e.g. four, eight, or even more, FIG. 5) in the second die 100b is more than that of the substrate circuits 0K (e.g. two, FIG. 1EB) of the integrated 3-D processor 80 (or, the first die 100a). In another preferred embodiment, the second die 100b comprises high-speed interconnect materials (e.g. copper), not the high-temperature interconnect materials (e.g. tungsten) used in the integrated 3-D processor 80 (or, the first die 100a), which are generally slower. In other words, the interconnect materials used in the second die 100b have a lower resistivity than the interconnect materials used in the first die 100a. As a result, the discrete 3-D processor 100 has a better overall performance than the integrated 3-D processor 80.

Lastly, in the integrated 3-D processor 80, the processing circuit 78 is smaller and has less processing power. The size of the processing circuit 78 is generally limited within the footprint of a single 3D-M array 77 (i.e. the projection of the 3D-M array 77 on the substrate 0, FIG. 1EA). Although the processing circuit 78 could be made larger by extending to the areas underneath adjacent 3D-M arrays, the existence of the local peripheral-circuit components 75 of these 3D-M arrays 77 makes the substrate too segmented for the layout of the processing circuit 78 (FIG. 1EA). In comparison, in the discrete 3-D processor 100, the processing circuit 180 could be larger and have more processing power (referring to FIGS. 8B-8C), because it is disposed in a different die than the in-die local peripheral-circuit components 140. In fact, the discrete 3-D processor 100 offers significant routing advantages for the processing circuit 180 than the integrated 3-D processor 80. Even in the case of FIG. 6BB where the processing die 100b comprises off-die local peripheral-circuit components 190aa-190bb, because the in-die peripheral-circuit components 140 takes over a significant amount of peripheral-circuit components, the off-die local peripheral-circuit components 190aa-190bb will be distributed more sparsely than in the integrated 3-D processor 80. As a result, routing for the processing circuit 180ij of the preferred discrete 3-D processor 100 (FIGS. 8B-8C) would be much easier than the processing circuit 78 of the integrated 3-D processor 80 (FIG. 1EA). In addition, designed and manufactured separately, the second die 100b enjoys more flexibility in design and manufacturing. By combining the same first die 100a with different second dice 100b, different functionalities can be realized for different applications. Better yet, these different functionalities can be implemented in a relatively short time and under a relatively small budget. As a result, the discrete 3-D processor 100 has more processing power and more flexible functionalities than the integrated 3-D processor 80.

In the following paragraphs, the applications of the preferred discrete 3-D processors 100 will be overviewed.

[A] Mathematical Computing

When applied to the mathematical computing, the preferred discrete 3-D processor computes non-arithmetic functions. It uses memory-based computation (MBC), which carries out computation primarily with the LUT stored in the 3D-M arrays (i.e. 3DM-LUT). In this field of application, the SPU 100ij of FIG. 2A is referred to as a computing element, where the 3D-M array 170 stores at least a portion of a look-up table (LUT) of a non-arithmetic function while the processing circuit 180 is an arithmetic logic circuit (ALC).

Figure 9:
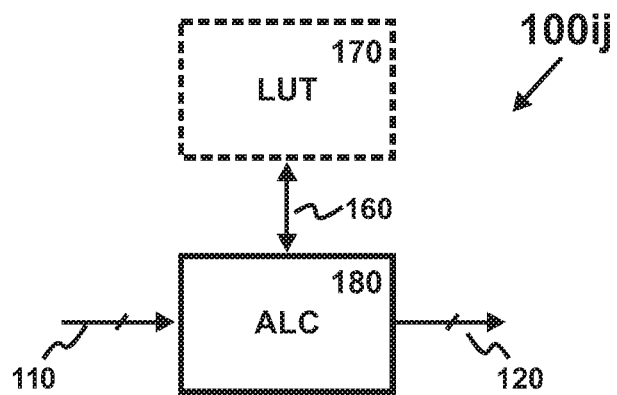
FIG. 9 is a circuit block diagram of a computing element in a preferred discrete 3-D processor for computing non-arithmetic functions or models.

Referring now to FIG. 9, a computing element 100$ij$ is disclosed. It includes an input 110, an output 120, a 3D-M array 170 and an ALC 180. The 3D-M array 170 stores at least a portion of the LUT for a non-arithmetic function (or, a non-arithmetic model). The ALC 180 performs arithmetic operations on selected data from the LUT 170. The 3D-M array 170 and the ALC 180 are communicatively coupled by the inter-die connections 160. As mentioned before, a non-arithmetic function (or, non-arithmetic model) includes more operations than the arithmetic operations (i.e. addition, subtraction and multiplication) provided by the ALC 180. As it cannot be represented by a combination of the basic arithmetic operations, a non-arithmetic function (or, non-arithmetic model) cannot be implemented by the ALC 180 alone. It has to be implemented by a combination of the ALC 180 and the LUT 170.

Figure 10A:
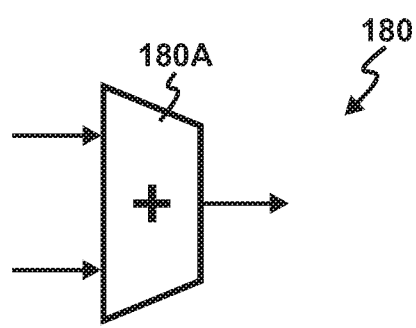
FIGS. 10A-10C are the circuit block diagrams of three preferred ALC's.
Figure 10B:
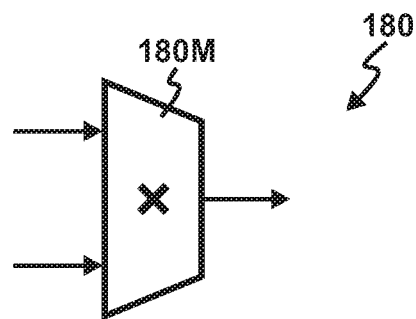
Figure 10C:
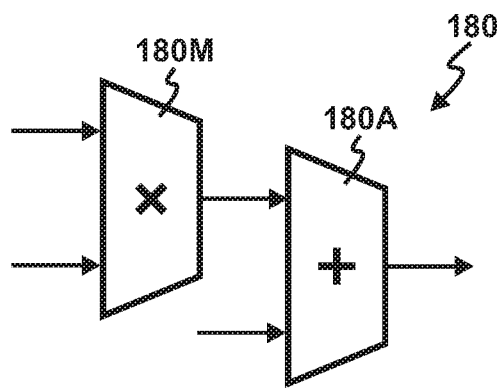

Referring now to FIGS. 10A-10C, three preferred ALC 180 are disclosed. The first preferred ALC 180 comprises an adder 180A, the second preferred ALC 180 comprises a multiplier 180M, with the third preferred ALC 180 comprising a multiply-accumulator (MAC), which includes an adder 180A and a multiplier 180M. The preferred ALC 180 could perform integer arithmetic operations, fixed-point arithmetic operations, or floating-point arithmetic operations.

Figure 11A:
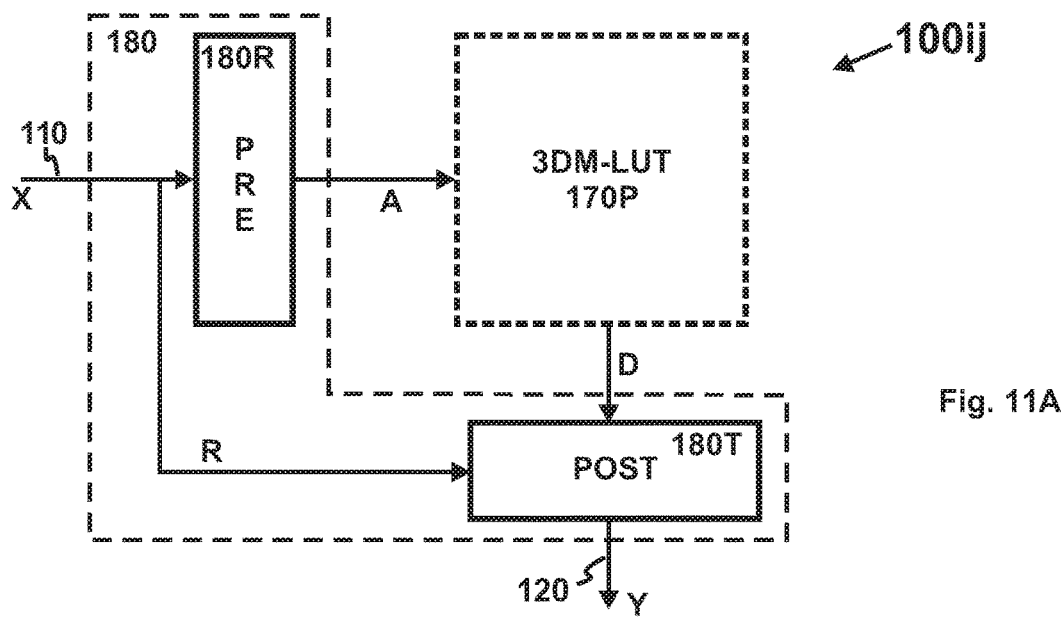
FIG. 11A is a circuit block diagram of a first preferred computing element.
Figure 11B:
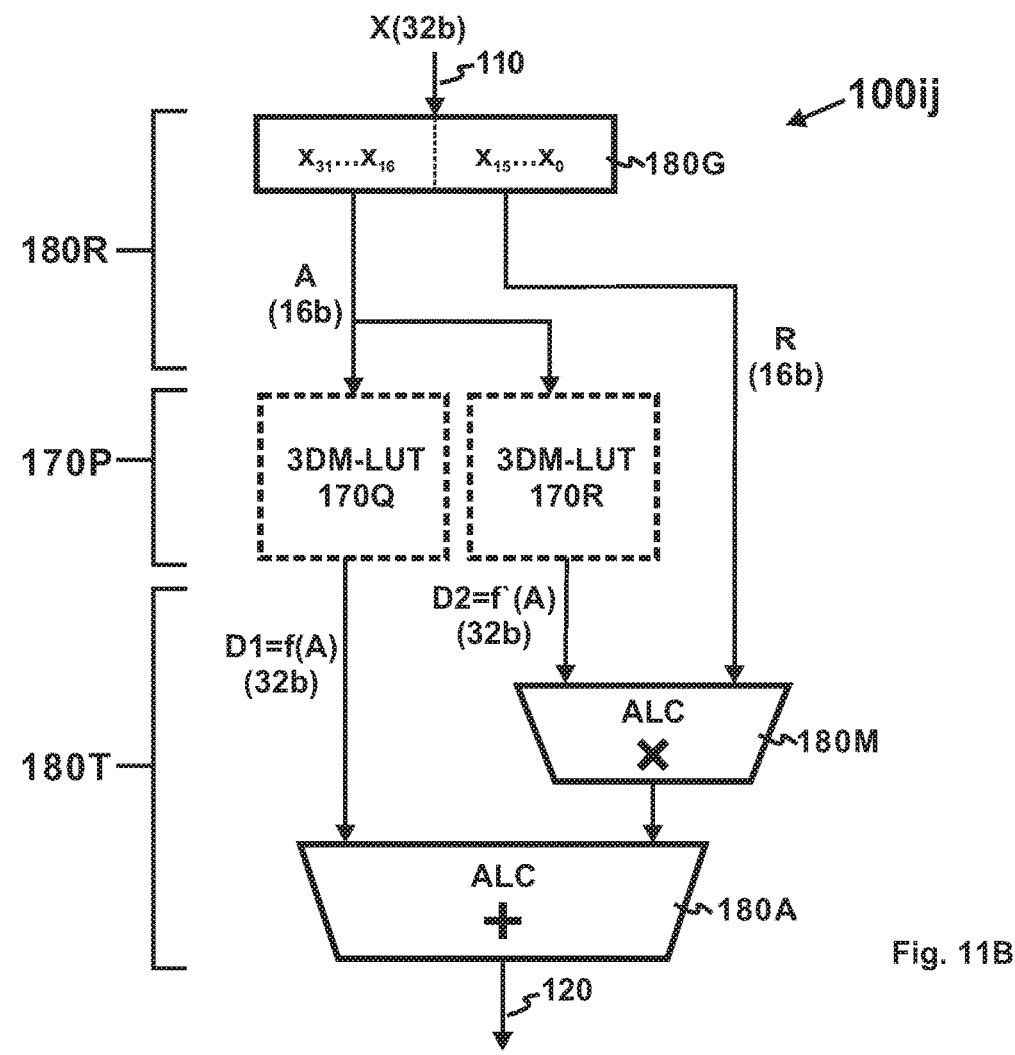
FIG. 11B is a detailed circuit diagram of the first preferred computing element.

Referring now to FIGS. 11A-11B, a first preferred computing element 100$ij$ for implementing a non-arithmetic function Y=f(X) is disclosed. It uses the function-by-LUT method. FIG. 11A is its circuit block diagram. The ALC 180 comprises a pre-processing circuit 180R, a 3DM-LUT 170P, and a post-processing circuit 180T. The pre-processing circuit 180R converts the input variable (X) 110 into an address (A) of the 3DM-LUT 170P. After the data (D) at the address (A) is read out from the 3DM-LUT 170P, the post-processing circuit 180T converts it into the function value (Y) 120. A residue (R) of the input variable (X) is fed into the post-processing circuit 180T to improve the calculation precision.

FIG. 11B discloses the first preferred computing element 100$ij$ which realizes a single-precision non-arithmetic function Y=f(X). The input variable X 110 has 32 bits ($x_{31}$ ... $x_0$). The pre-processing circuit 180R extracts the higher 16 bits ($x_{31}$ ... $x_{16}$) thereof and sends it as a 16-bit address A to the 3DM-LUT 170P. The pre-processing circuit 180R further extracts the lower 16 bits ($x_{15}$ ... $x_0$) and sends it as a 16-bit residue R to the post-processing circuit 180T. The 3DM-LUT 170P comprises two 3DM-LUT's 170Q, 170R. Both 3DM-LUT's 170Q, 170R have 2 Mb capacities (16-bit input and 32-bit output): the 3DM-LUT 170Q stores the functional value D1=f(A), while the 3DM-LUT 170R stores the first-order derivative value D2=f'(A). The post-processing circuit 180T comprises a multiplier 180M and an adder 180A. The output value (Y) 190 has 32 bits and is calculated from polynomial interpolation. In this case, the polynomial interpolation is a first-order Taylor series: Y(X)=D1+D2*R=f(A)+f'(A)*R. To those skilled in the art, higher-order polynomial interpolation (e.g. higher-order Taylor series) can be used to improve the calculation precision.

When calculating a non-arithmetic function, combining the LUT with polynomial interpolation can achieve a high precision without using an excessively large LUT. For example, if only LUT (without any polynomial interpolation) is used to realize a single-precision function (32-bit input and 32-bit output), it would have a capacity of $2^{32}*32$=128 Gb, which is impractical. By including polynomial interpolation, significantly smaller LUT's can be used. In the above embodiment, a single-precision function can be realized using a total of 4 Mb LUT (2 Mb for function values, and 2 Mb for first-derivative values) in conjunction with a first-order Taylor series calculation. This is significantly less than the LUT-only approach (4 Mb vs. 128 Gb).

Besides elementary functions (including algebraic functions and transcendental functions), the preferred 3-D processor 100 can be used to implement non-elementary functions such as special functions. Special functions can be defined by means of power series, generating functions, infinite products, repeated differentiation, integral representation, differential difference, integral, and functional equations, trigonometric series, or other series in orthogonal functions. Important examples of special functions are gamma function, beta function, hyper-geometric functions, confluent hyper-geometric functions, Bessel functions, Legendre functions, parabolic cylinder functions, integral sine, integral cosine, incomplete gamma function, incomplete beta function, probability integrals, various classes of orthogonal polynomials, elliptic functions, elliptic integrals, Lame functions, Mathieu functions, Riemann zeta function, automorphic functions, and others. The 3D-processor will simplify the calculation of special functions and promote their applications in scientific computation.

Figure 12:
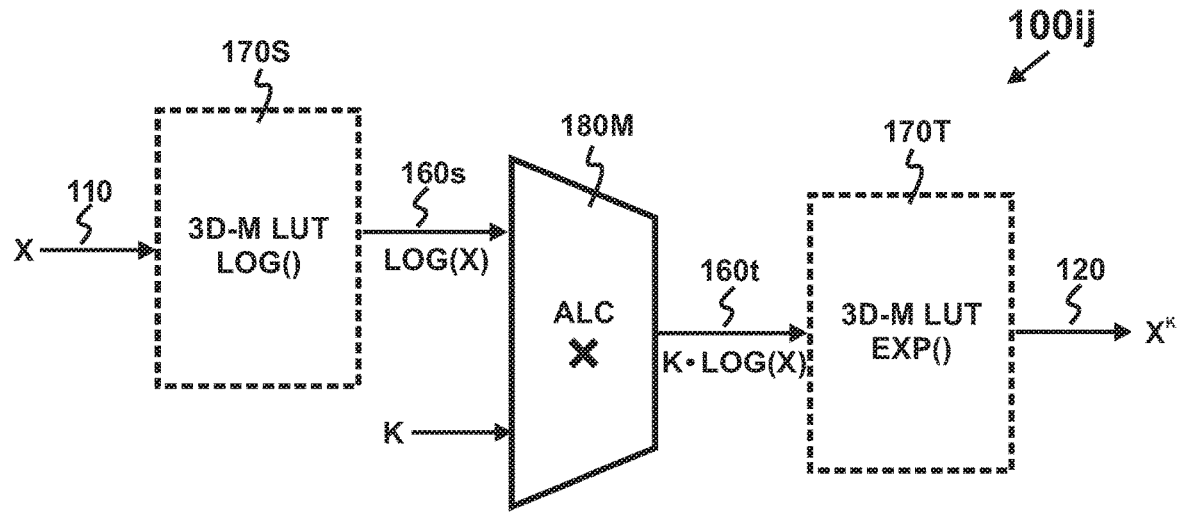
FIG. 12 is a circuit block diagram of a second preferred computing element.

Referring now to FIG. 12, a second preferred computing element 100$ij$ for implementing a composite function Y=EXP[K*log(X)]=$X^K$ is disclosed. It uses the function-by-LUT method. The preferred computing element 100$ij$ comprises two 3DM-LUT's 170S, 170T and a multiplier 180M. The 3DM-LUT 170S stores the LOG( ) values, while the 3DM-LUT 170T stores the EXP( ) values. The input variable X is used as an address 110 for the 3DM-LUT 170S. The output Log(X) 160$s$ from the 3DM-LUT 170S is multiplied by an exponent parameter K at the multiplier 180M. The multiplication result K*LOG(X) is used as an address 160$t$ for the 3DM-LUT 170T, whose output 120 is Y=$X^K$.

The functions computed by the computing elements in FIGS. 11A-11B and FIG. 12 are combinational functions. As used hereinafter, a combinational function is a combination of at least two non-arithmetic functions. For example, a single-precision function is a combination of functional values and derivative values; a composite function is a combination of two functions. Accordingly, the present invention discloses a discrete 3-D processor for computing at least a combinational function, comprising: first and second 3D-M arrays, and an arithmetic logic circuit (ALC), wherein said first 3D-M array stores at least a first portion of a first look-up table (LUT) of a first non-arithmetic function, said second 3D-M array stores at least a second portion of a second LUT of a second non-arithmetic function, said ALC performs arithmetic operations on selected data from said first or second LUT's; first and second dice, wherein said first die comprises said first and second 3D-M arrays, said second die comprises at least a portion of said ALC and an off-die peripheral-circuit component of said first or second 3D-M array, said first die does not comprise said off-die peripheral-circuit component, said first and second dice are separate dice communicatively coupled by a plurality of inter-die connections; wherein said combinational function is a combination of said first and second non-arithmetic functions, said first and second non-arithmetic functions include more operations than the arithmetic operations provided by said ALC.

[B] Computer Simulation

When applied to the computer simulation, the preferred discrete 3-D processor computes non-arithmetic models. It still uses the MBC. The MBC brings about significant performance improvement for computer simulation. In this field of application, the SPU 100$ij$ of FIG. 2A is referred to as a computing element, where the 3D-M array 170 stores the LUT of a non-arithmetic model while the processing circuit is an ALC.

Figure 1E:
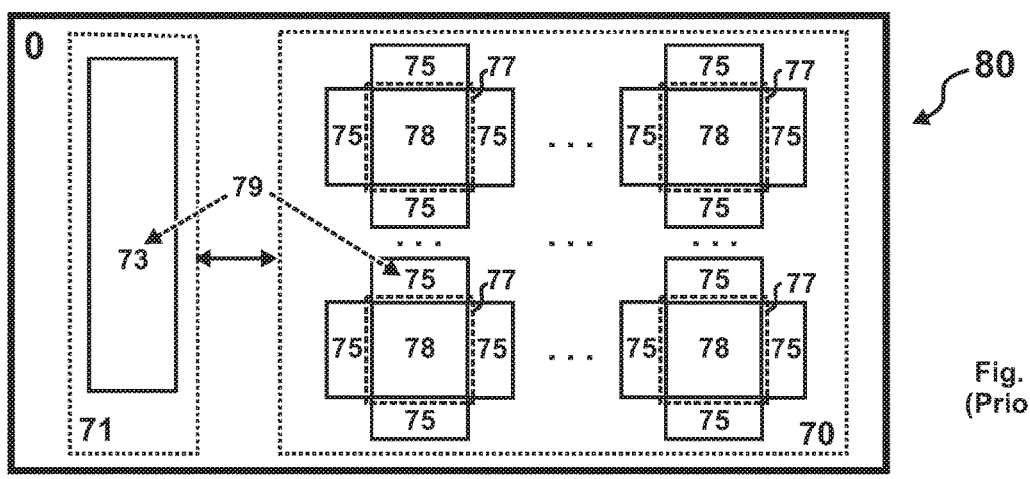
FIG. 1EA is a plan view of an integrated 3-D processor (prior art)
Figure 1E:
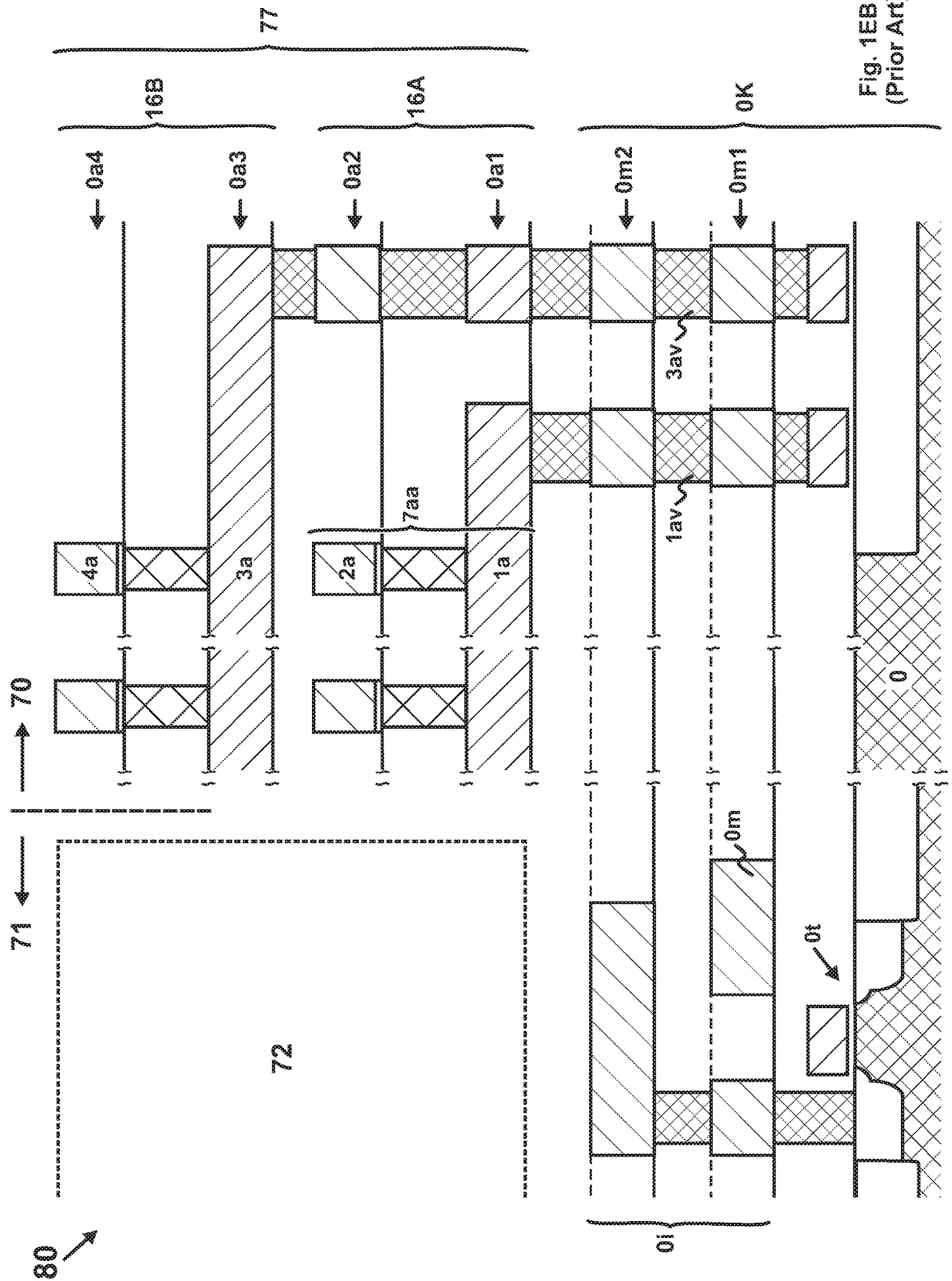
Figure 13:
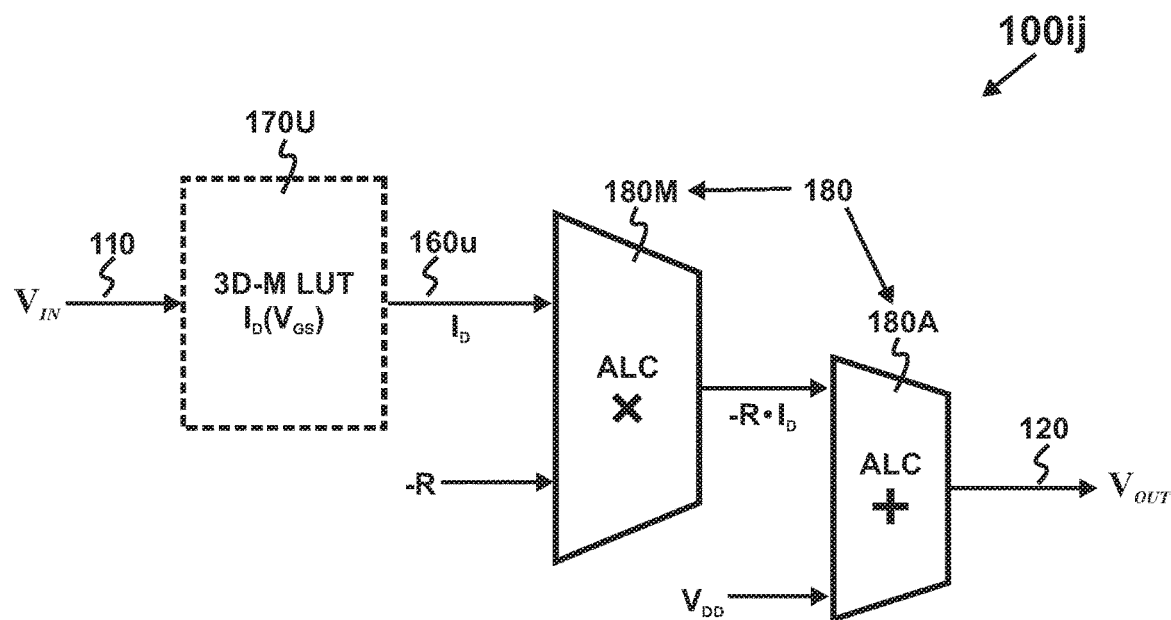
FIG. 13 is a circuit block diagram of a third preferred computing element.

Referring now to FIG. 13, a third preferred computing element 100$ij$ to simulate the amplifier circuit 0Y of FIG. 1BA is disclosed. It uses the model-by-LUT method. The preferred computing element 100$ij$ comprises a 3DM-LUT 170U, an adder 180A and a multiplier 180M. The 3DM-LUT 170U stores the data associated with the behaviors (e.g. input-output characteristics) of the transistor 0T. By using the input voltage value ($V_{IN}$) as an address 110 for the 3DM-LUT 170U, the readout 160$u$ of the 3DM-LUT 170U is the drain-current value ($I_D$). After the $I_D$ value is multiplied with the negative resistance value (−R) of the resistor 0R by the multiplier 180M, the multiplication result (−R*$I_D$) is added to the $V_{DD}$ value by the adder 180A to generate the output voltage value ($V_{OUT}$) 120.

The 3DM-LUT 170U stores different forms of mathematical models. In one case, the mathematical model stored in the 3DM-LUT 170U is raw measurement data, i.e. the measured input-output characteristics of the transistor 0T. One example is the measured drain current vs. the applied gate-source voltage ($I_D$-$V_{GS}$) characteristics. In another case, the mathematical model stored in the 3DM-LUT 170U is the smoothed measurement data. The raw measurement data could be smoothed using a purely mathematical method (e.g. a best-fit model). Or, this smoothing process can be aided by a physical transistor model (e.g. a BSIM4 V3.0 transistor model). In a third case, the mathematical data stored in the 3DM-LUT include not only the measured data, but also its derivative values. For example, the 3DM-LUT 170U stores not only the drain-current values of the transistor 0T (e.g. the $I_D$-$V_{GS}$ characteristics), but also its transconductance values (e.g. the $G_m$-$V_{GS}$ characteristics). With derivative values, polynomial interpolation can be used to improve the modeling precision using a reasonable-size 3DM-LUT 170.

Model-by-LUT offers many advantages. By skipping two software-decomposition steps (from mathematical models to mathematical functions, and from mathematical functions to built-in functions), it saves substantial modeling time and energy. Model-by-LUT may need less LUT than function-by-LUT. Because a transistor model (e.g. BSIM4 V3.0) has hundreds of model parameters, calculating the intermediate functions of the transistor model requires extremely large LUT's. However, if function-by-LUT is skipped (namely, skipping the transistor models and the associated intermediate functions), the transistor behaviors can be described using only three parameters (including the gate-source voltage $V_{GS}$, the drain-source voltage $V_{DS}$, and the body-source voltage $V_{BS}$). Hence, describing the mathematical models of the transistor 0T requires relatively small LUT's.

[C] Configurable Computing Array

When applied to configurable gate array, the preferred discrete 3-D processor is a discrete 3-D configurable computing array. It can not only customize logic functions and arithmetic functions, but also customize non-arithmetic functions. In the preferred 3-D configurable computing array, the SPU 100$ij$ of FIG. 2A is also referred to as a configurable block Referring now to FIGS. 14A-14B, a preferred configurable block 100$ij$ used in a preferred 3-D configurable computing array is disclosed. The preferred configurable block 100$ij$ comprises a 3D-M array 170 and a processing circuit 180 (FIG. 14A). The 3D-M array 170 stores at least a portion of the LUT of a non-arithmetic function. The processing circuit 180 could be an arithmetic logic circuit (ALC), a configurable logic element (CLE), or a configurable interconnect (CIT). Accordingly, the preferred configurable block 100$ij$ includes the following functional blocks (FIG. 14B): a configurable computing element (CCE) 400 (referring to FIGS. 15A-15B), a CLE 200 (referring to FIG. 17B) and a CIT 300 (referring to FIG. 17A). The CCE 400 can realize a non-arithmetic function defined by the LUT; the CLE 200 can realize a selected one of the logic functions from a logic library; and, the CIT 300 can realize a selected one of the interconnects from an interconnect library.

For the CCE 400, its input port IN includes input data 410, the output port OUT includes output data 420, and the configuration port CFG includes at least a configuration signal 430. When the configuration signal 430 is "write", the LUT of a non-arithmetic function is loaded into the CCE 400; when the configuration signal 430 is "read", the values of the non-arithmetic function are read out from the CCE 400. FIGS. 15A-15B disclose two preferred CCE's 400. In FIG. 15A, the CCE 400 is simply a 3D-M array 170, which stores the functional values of the non-arithmetic function. In FIG. 15B, the CCE 400 is a combination of a 3D-M array 170 and an ALC 180. The 3D-M array 170 stores the functional values and the derivative values of the non-arithmetic function, while the ALC 180 performs polynomial interpolation with these values.

Figure 16:
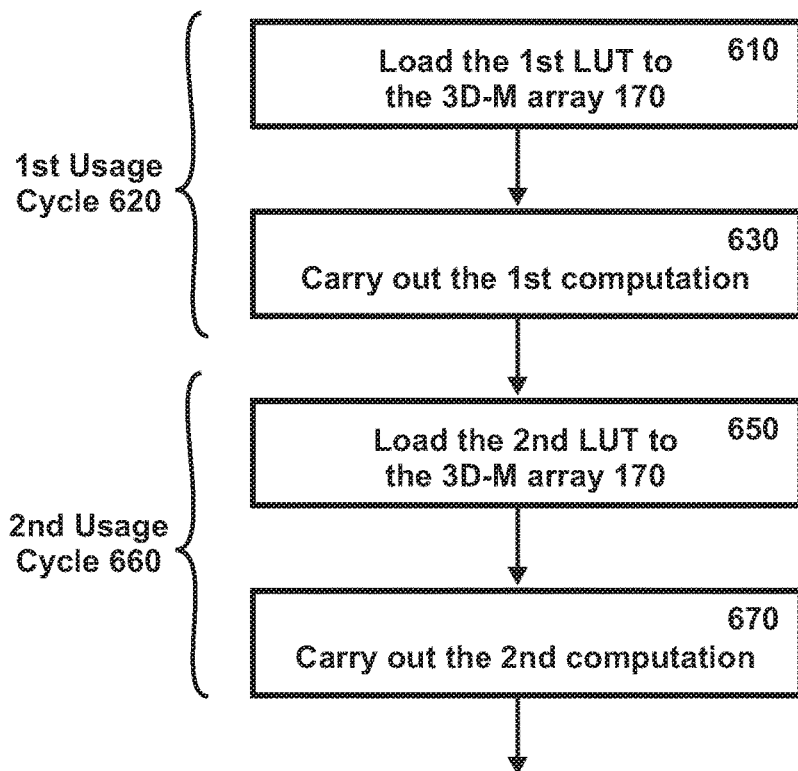
FIG. 16 discloses two usage cycles of a preferred re-configurable computing element.

Referring now to FIG. 16, two usage cycles 620, 660 of a CCE are shown. Because its 3D-M arrays 170 are re-programmable, this configurable computing array can realize re-configurable computing. The first usage cycle 620 comprises two stages: a configuration stage 610 and a computation stage 630. At the configuration stage 610, the LUT of a first function is loaded into the 3D-M array 170. At the computation stage 630, the values of the first function are read out from the 3D-M array 170. Similarly, the second usage cycle 660 also comprises a configuration stage 650 and a computation stage 670. This preferred embodiment is particularly suitable for single-instruction-multiple-data (SIMD)-type of data processing. Once the LUTs are loaded into the 3D-M array 170 in the configuration stage, a large amount of data can be fed into the CCE 400 and processed in high speed. SIMD has many applications, e.g. vector processing in image processing, massively parallel processing in scientific computing.

Figure 17A:
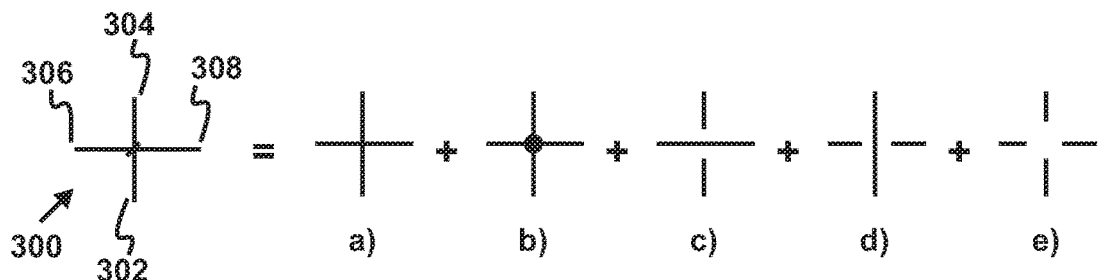
FIG. 17A shows an interconnect library supported by a preferred configurable interconnect (CIT)
Figure 17B:
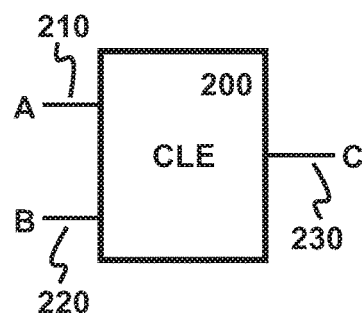
FIG. 17B shows a logic library supported by a preferred configurable logic element (CLE)

Referring now to FIGS. 17A-17B, an interconnect library and a logic library are shown. FIG. 17A shows the interconnect library supported by a CIT 300. An interconnect library is a collection of all interconnects supported by the CIT 300. This interconnect library includes the followings: a) the interconnects 302/304 are coupled, the interconnects 306/308 are coupled, but 302/304 are not connected with 306/308; b) the interconnects 302/304/306/308 are all coupled; c) the interconnects 306/308 are coupled, but the interconnects 302, 304 are not coupled, neither are 302, 304 connected with 306/308; d) the interconnects 302/304 are coupled, but the interconnects 306, 308 are not coupled, neither are 306, 308 connected with 302/304; e) interconnects 302, 304, 306, 308 are not coupled at all. As used hereinafter, the symbol "/" between two interconnects means that these two interconnects are coupled, while the symbol "," between two interconnects means that these two interconnects are not coupled. More details on the CIT's are disclosed in Freeman.

FIG. 17B shows the logic library supported by a CLE 200. A logic library is a collection of all logic functions supported by the CLE 200. In this preferred embodiment, the inputs A and B are input data 210, 220, and the output C is the output data 230, the logic library includes the followings: C=A, NOT A, A shift by n bits, AND(A,B), OR(A,B), NAND(A, B), NOR(A,B), XOR(A,B), A+B, A−B. To facilitate pipelining, the CLE 200 may comprise sequential logic such as flip-flops and registers. More details on the CLE's are disclosed in Freeman.

Figure 18:
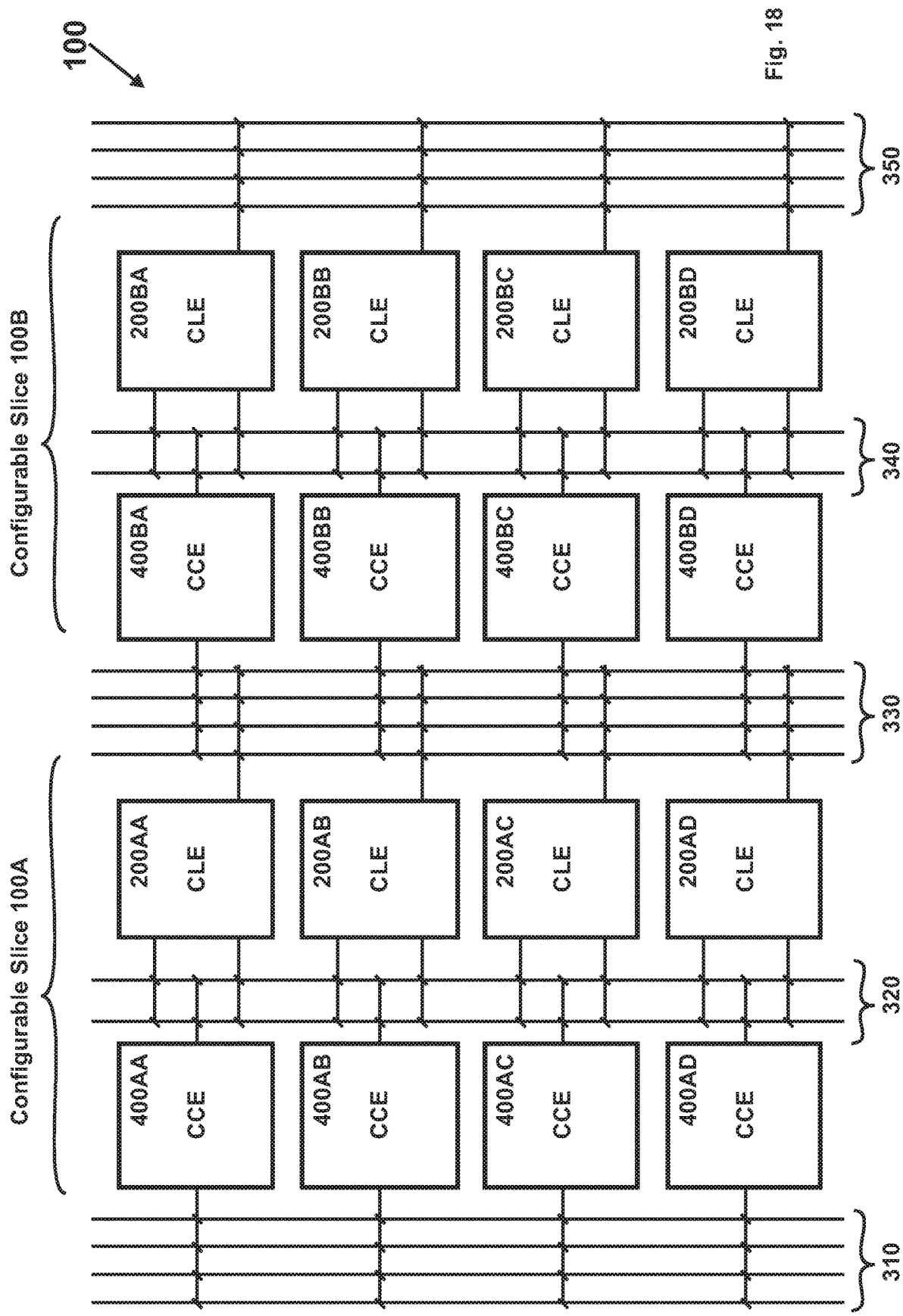
FIG. 18 is a circuit block diagram of a first preferred 3-D configurable computing array.

Referring now to FIG. 18, a first preferred 3-D configurable computing array 100 is disclosed. It comprises first and second configurable slices 100A, 100B. Each configurable slice (e.g. 100A) comprises a first array of CCE's (e.g. 400AA-400AD) and a second array of CLE's (e.g. 200AA-200AD). A configurable channel 320 is placed between the first array of CCE's (e.g. 400AA-400AD) and the second array of CLE's (e.g. 200AA-200AD). The configurable channels 310, 330, 350 are also placed between different configurable slices 100A, 100B. The configurable channels 310-350 comprise an array of CIT's 300. For those skilled in the art, besides configurable channels, sea-of-gates may also be used.

Complex functions are common in computing. As used hereinafter, a complex function is a non-arithmetic function with multiple input independent variables (or, arguments); whereas, a basic function is a non-arithmetic function with a single input independent variable. In generally, a complex function can be expressed as a combination of basic functions. The preferred 3-D configurable computing array can customize complex functions, which is unimaginable for prior art. To customize a complex function, the complex function is first decomposed into a number of basic functions. Each basic function is then realized by loading its LUT's into the associated CCE's. Finally, the complex function is realized by programming the corresponding CLE's and CIT's.

Figure 19:
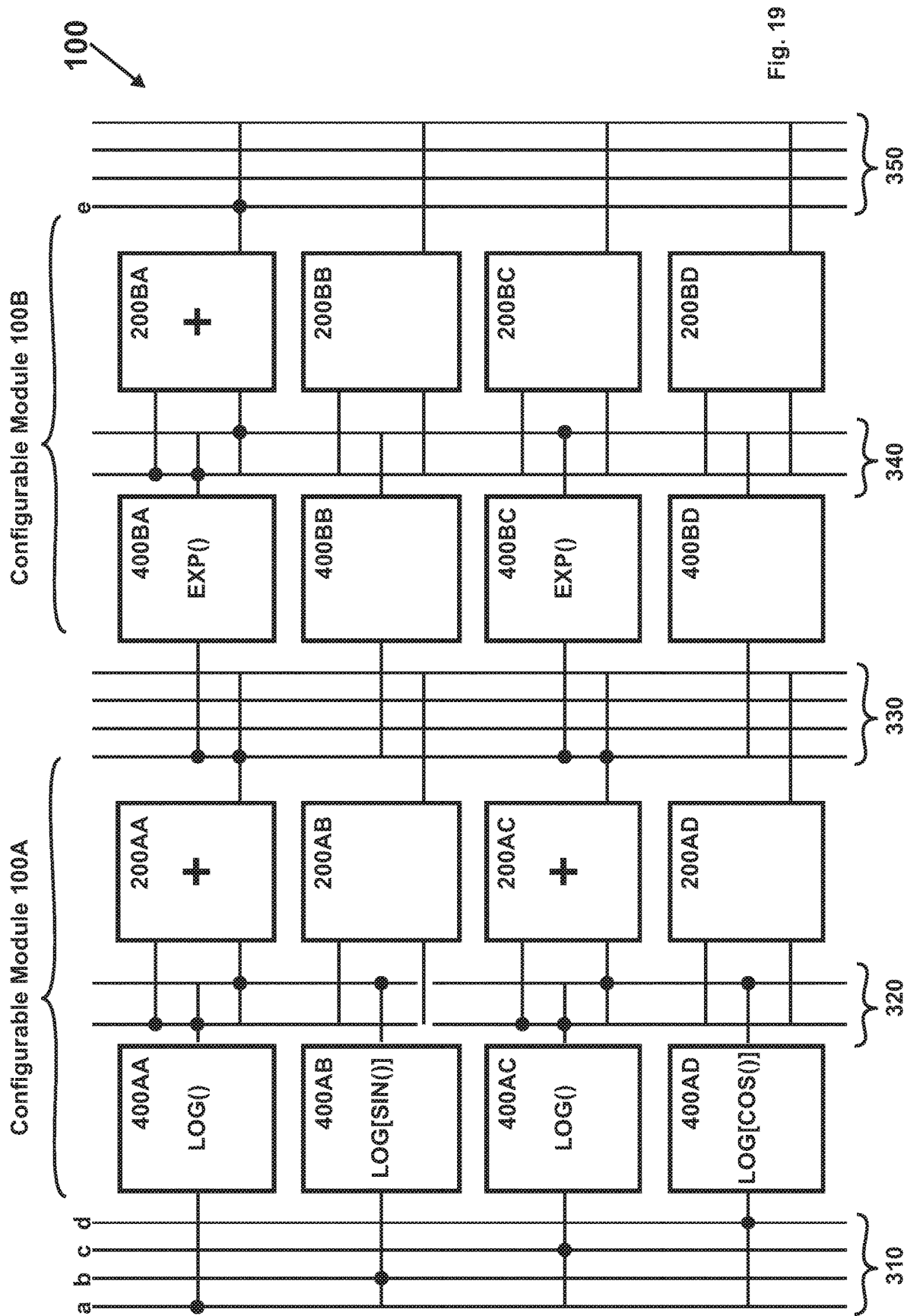
FIG. 19 shows an instantiation of the first preferred 3-D configurable computing array.

FIG. 19 shows an instantiation of the first preferred 3-D configurable computing array 100 for customizing a complex function e=a·SIN(b)+c·COS(d). The CIT's 300 in the configurable channel 310-350 use the same convention as FIG. 17A: the interconnects with dots at the intersection mean that the interconnects are connected; the interconnects without dots at the intersection mean that the interconnects are not connected; a broken interconnect means that two broken sections are two un-coupled interconnect lines. In this instantiation, the CCE 400AA is configured to realize the function LOG( ), whose result LOG(a) is sent to a first input of the CLE 200AA. The CCE 400AB is configured to realize the function LOG[SIN( )], whose result LOG[SIN(b)] is sent to a second input of the CLE 200AA. The CLE 200AA is configured to realize arithmetic addition, whose result LOG(a)+LOG[SIN(b)] is sent the CCE 400BA. The CCE 400BA is configured to realize the function EXP( ), whose result EXP{LOG(a)+LOG[SIN(b)]}=a·SIN(b) is sent to a first input of the CLE 200BA. Similarly, through proper configurations, the results of the CCE's 400AC, 400AD, the CLE 200AC, and the CCE 400BC can be sent to a second input of the CLE 200BA. The CLE 200BA is configured to realize arithmetic addition, whose result a·SIN(b)+c·COS(d) is sent to the output e. Apparently, by changing its configuration, the preferred 3-D configurable computing array 100 can realize other complex functions.

Accordingly, the present invention discloses a discrete 3-D configurable computing array for customizing a complex function, comprising: a plurality of configurable logic elements (CLE's) and/or configurable interconnects (CIT's); first and second CCE's, wherein said first CCE comprises at least a first three-dimensional memory (3D-M) array for storing at least a first portion of a first look-up table (LUT) of a first non-arithmetic function, said second CCE comprises at least a second 3D-M array for storing at least a second portion of a second LUT of a second non-arithmetic function; first and second dice, wherein said first die comprises said 3D-M array, said second die comprises at least a portion of said array of CCE's/CIT's and an off-die peripheral-circuit component of said first or second 3D-M array, said first die does not comprise said off-die peripheral-circuit component, said first and second dice are separate dice communicatively coupled by a plurality of inter-die connections; whereby said complex function is realized by programming said CLE's/CIT's and said first and second CCE's, wherein said complex function is a combination of said first and second non-arithmetic functions, said first and second non-arithmetic functions include more operations than the arithmetic operations provided by said CLE's.

Figure 20:
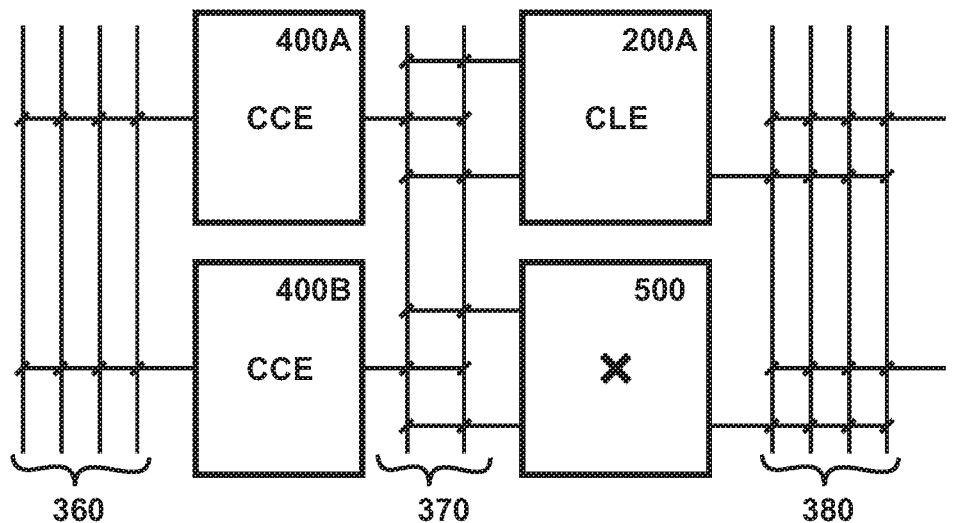
FIG. 20 is a circuit block diagram of a second preferred 3-D configurable computing array.

Referring now to FIG. 20, a second preferred 3-D configurable computing array 100 is shown. Besides CCE's 400A, 400B and CLE 200A, this preferred embodiment further comprises a multiplier 500. With the addition of the multiplier 500, the preferred 3-D configurable computing array 100 can realize more mathematical functions and its computational power is more powerful.

Figure 21A:
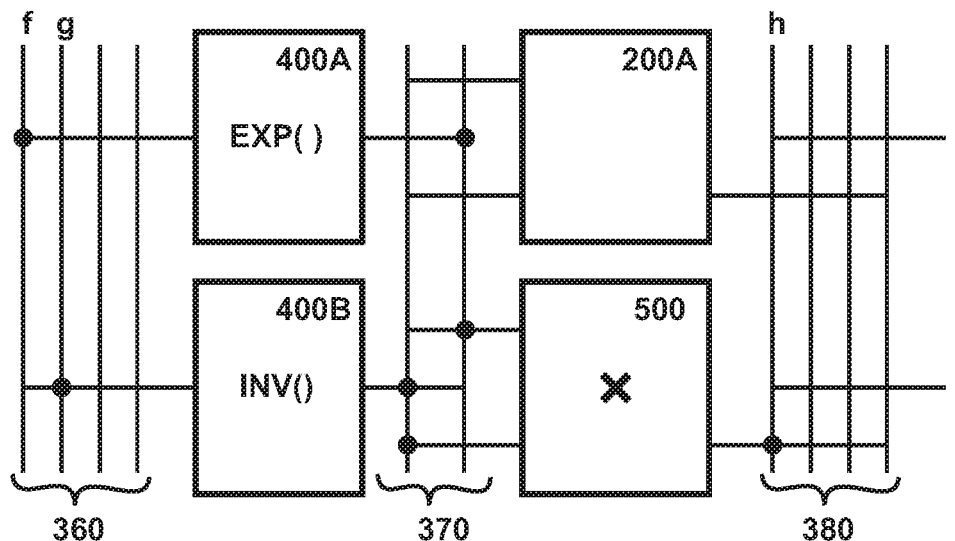
FIGS. 21A-21B show two instantiations of the second preferred 3-D configurable computing array.
Figure 21B:
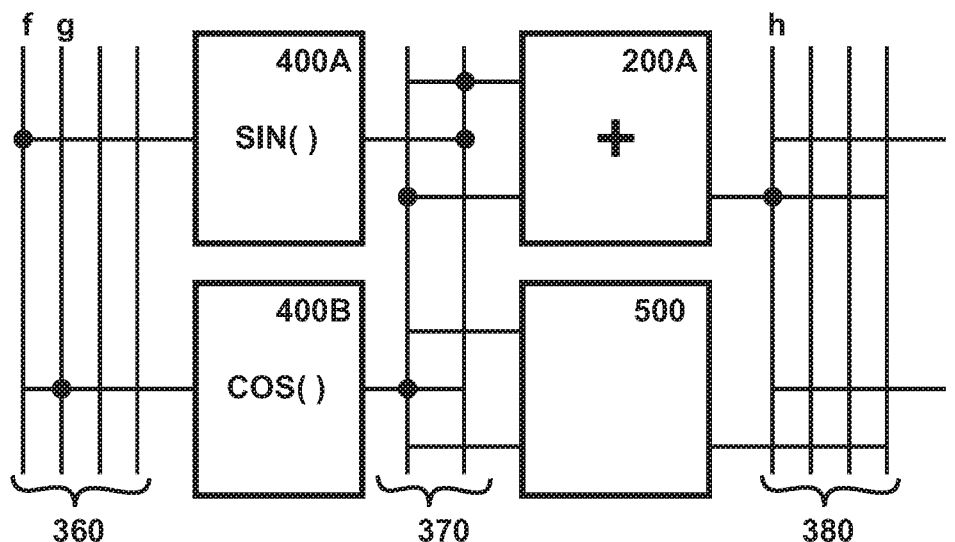

FIGS. 21A-21B disclose two instantiations of the second preferred 3-D configurable computing array 100. In the instantiation of FIG. 21A, the CCE 400A is configured to realize the function EXP(f), while the CCE 400B is configured to realize the function INV(g). The configurable channel 370 is configured in such a way that the outputs of CCE's 400A, 400B are fed into the multiplier 500. The final output is then h=EXP(f)*INV(g). On the other hand, in the instantiation of FIG. 21B, the CCE 100A is configured to realize the function SIN(f), while the CCE 400B is configured to realize the function COS(g). The configurable channel 370 is configured in such a way that the outputs of CCE's 400A, 400B are fed into the CLE 200A, which is configured to realize arithmetic addition. The final output is then h=SIN(f)+COS(g).

[D] Pattern Processing

When applied to pattern processing, the preferred discrete 3-D processor is a discrete 3-D pattern processor. Its basic functionality is pattern processing. More importantly, the patterns it processes are stored locally.

FIG. 22 shows the architecture of a preferred discrete 3-D parallel processor 100. It comprises an array with m rows and n columns (m×n) of storage-processing units (SPU's) 100aa-100mn. Each SPU (e.g. 100ij) is commutatively coupled with a common input 110 and a common output 120. The input data are sent through the common input 110 to the SPU's 100aa-100mn, where they are processed simultaneously. Because it comprises thousands to tens of thousands of SPU's 100aa-100mn, the preferred discrete 3-D parallel processor 100 supports massive parallelism. The preferred discrete 3-D parallel processor 100 may be used for pattern processing, neural processing, and other fields of applications.

When used for pattern processing, the preferred 3-D parallel processor 100 is a discrete 3-D pattern processor. FIG. 23 shows a SPU 100ij used in the preferred 3-D pattern processor 100. It comprises a pattern-storage circuit 170 and a pattern-processing circuit 180 communicatively coupled by a plurality of inter-die connections 160 (referring to FIGS. 3A-3D). The pattern-storage circuit 170 comprises at least a 3D-M array for storing at least a portion of a pattern, whereas the pattern-processing circuit 180 performs pattern processing for the pattern The preferred discrete 3-D pattern processor 100 can be either processor-like or storage-like. The processor-like 3-D pattern processor 100 acts like a discrete 3-D processor with an embedded search-pattern library. It searches a target pattern from the input 110 against the search-pattern library. To be more specific, the 3D-M array 170 stores at least a portion of the search-pattern library (e.g. a virus library, a keyword library, an acoustic/language model library, an image model library); the input 110 includes a target pattern (e.g. a network packet, a computer file, audio data, or image data); the pattern-processing circuit 180 performs pattern processing on the target pattern with the search pattern. Because a large number of the SPU's 100ij (thousands to tens of thousands, referring to FIG. 22) support massive parallelism and the inter-die connections 160 has a large bandwidth (referring to FIGS. 3B-3D), the preferred 3-D processor with an embedded search-pattern library can achieve fast and efficient search.

Accordingly, the present invention discloses a discrete 3-D processor with an embedded search-pattern library, comprising: an input for transferring at least a portion of a target pattern; a plurality of storage-processing units (SPU's) communicatively coupled with said input, each of said SPU's comprising at least a three-dimensional memory (3D-M) array and a pattern-processing circuit, wherein said 3D-M array stores at least a portion of a search pattern, said pattern-processing circuit performs pattern processing on said target pattern with said search pattern; first and second dice, wherein said first die comprises said 3D-M array, said second die comprises at least a portion of said pattern-processing circuit and an off-die peripheral-circuit component of said 3D-M array, said first die does not comprise said off-die peripheral-circuit component, said first and second dice are separate dice communicatively coupled by a plurality of inter-die connections.

The storage-like discrete 3-D pattern processor 100 acts like a 3-D storage with in-situ pattern-processing capabilities. Its primary purpose is to store a target-pattern database, with a secondary purpose of searching the stored target-pattern database for a search pattern from the input 110. To be more specific, a target-pattern database (e.g. computer files on a whole disk drive, a big-data database, an audio archive, an image archive) is stored and distributed in the 3D-M arrays 170; the input 110 include at least a search pattern (e.g. a virus signature, a keyword, a model); the pattern-processing circuit 180 performs pattern processing on the target pattern with the search pattern. Because a large number of the SPU's 100ij (thousands to tens of thousands, referring to FIG. 22) support massive parallelism and the inter-die connections 160 has a large bandwidth (referring to FIGS. 3B-3D), the preferred 3-D storage can achieve a fast speed and a good efficiency.

Like the flash memory, a large number of the preferred discrete 3-D storages 100 can be packaged into a storage card (e.g. an SD card, a TF card) or a solid-state drive (i.e. SSD). These storage cards or SSD can be used to store massive data in the target-pattern database. More importantly, they have in-situ pattern-processing (e.g. searching) capabilities. Because each SPU 100ij has its own pattern-processing circuit 180, it only needs to search the data stored in the local 3D-M array 170 (i.e. in the same SPU 100ij). As a result, no matter how large is the capacity of the storage card or the SSD, the processing time for the whole storage card or the whole SSD is similar to that for a single SPU 100ij. In other words, the search time for a database is irrelevant to its size, mostly within seconds.

In comparison, for the conventional von Neumann architecture, the processor (e.g. CPU) and the storage (e.g. HDD) are physically separated. During search, data need to be read out from the storage first. Because of the limited bandwidth between the CPU and the HDD, the search time for a database is limited by the read-out time of the database. As a result, the search time for the database is proportional to its size. In general, the search time ranges from minutes to hours, even longer, depending on the size of the database. Apparently, the preferred 3-D storage with in-situ pattern-processing capabilities 100 has great advantages in database search.

When a preferred 3-D storage with in-situ pattern-processing capabilities 100 performs pattern processing for a large database (i.e. target-pattern database), the pattern-processing circuit 180 could just perform partial pattern processing. For example, the pattern-processing circuit 180 only performs a preliminary pattern processing (e.g. code matching, or string matching) on the database. After being filtered by this preliminary pattern-processing step, the remaining data from the database are sent through the output 120 to an external processor (e.g. CPU, GPU) to complete the full pattern processing. Because most data are filtered out by this preliminary pattern-processing step, the data output from the preferred 3-D storage 100 are a small fraction of the whole database. This can substantially alleviate the bandwidth requirement on the output 120.

Accordingly, the present invention discloses a discrete 3-D storage with in-situ pattern-processing capabilities, comprising: an input for transferring at least a portion of a search pattern; a plurality of storage-processing units (SPU's) communicatively coupled with said input, each of said SPU's comprising at least a three-dimensional memory (3D-M) array and a pattern-processing circuit, wherein said 3D-M array stores at least a portion of a target pattern, said pattern-processing circuit performs pattern processing on said target pattern with said search pattern; first and second dice, wherein said first die comprises said 3D-M array, said second die comprises at least a portion of said pattern-processing circuit and an off-die peripheral-circuit component of said 3D-M array, said first die does not comprise said off-die peripheral-circuit component, said first and second dice are separate dice communicatively coupled by a plurality of inter-die connections In the following paragraphs, applications of the preferred discrete 3-D pattern processor 100 are described. The fields of applications include: A) information security; B) big-data analytics; C) speech recognition; and D) image recognition. Examples of the applications include: a) information-security processor; b) anti-virus storage; c) data-analysis processor; d) searchable storage; e) speech-recognition processor; f) searchable audio storage; g) image-recognition processor; h) searchable image storage.

A) Information Security

Information security includes network security and computer security. To enhance network security, virus in the network packets needs to be scanned. Similarly, to enhance computer security, virus in the computer files (including computer software) needs to be scanned. Generally speaking, virus (also known as malware) includes network viruses, computer viruses, software that violates network rules, document that violates document rules and others.

During virus scan, a network packet or a computer file is compared against the virus patterns (also known as virus signatures) in a virus library. Once a match is found, the portion of the network packet or the computer file which contains the virus is quarantined or removed.

Nowadays, the virus library has become large. It has reached hundreds of MB. On the other hand, the computer data that require virus scan are even larger, typically on the order of GB or TB, even bigger. On the other hand, each processor core in the conventional processor can typically check a single virus pattern once. With a limited number of cores (e.g. a CPU contains tens of cores; a GPU contains hundreds of cores), the conventional processor can achieve limited parallelism for virus scan. Furthermore, because the processor is physically separated from the storage in the von Neumann architecture, it takes a long time to fetch new virus patterns. As a result, the conventional processor and its associated architecture have a poor performance for information security.

To enhance information security, the present invention discloses several discrete 3-D pattern processors 100. It could be processor-like or storage-like. For processor-like, the preferred discrete 3-D pattern processor 100 is an information-security processor, i.e. a processor for enhancing information security; for storage-like, the preferred discrete 3-D pattern processor 100 is an anti-virus storage, i.e. a storage with in-situ anti-virus capabilities.

a) Information-Security Processor

To enhance information security, the present invention discloses an information-security processor 100. It searches a network packet or a computer file for various virus patterns in a virus library. If there is a match with a virus pattern, the network packet or the computer file contains the virus. The preferred information-security processor 100 can be installed as a standalone processor in a network or a computer; or, integrated into a network processor, a computer processor, or a computer storage.

In the preferred information-security processor 100, the 3D-M arrays 170 in different SPU 100ij stores different virus patterns. In other words, the virus library is stored and distributed in the SPU's 100ij of the preferred information-security processor 100. Once a network packet or a computer file is received at the input 110, at least a portion thereof is sent to all SPU's 100ij. In each SPU 100ij, the pattern-processing circuit 180 compares said portion of data against the virus patterns stored in the local 3D-M array 170. If there is a match with a virus pattern, the network packet or the computer file contains the virus.

The above virus-scan operations are carried out by all SPU's 100ij at the same time. Because it comprises a large number of SPU's 100ij (thousands to tens of thousands), the preferred information-security processor 100 achieves massive parallelism for virus scan. Furthermore, because the inter-die connections 160 are numerous and the pattern-processing circuit 180 is physically close to the 3D-M arrays 170 (compared with the conventional von Neumann architecture), the pattern-processing circuit 180 can easily fetch new virus patterns from the local 3D-M array 170. As a result, the preferred information-security processor 100 can perform fast and efficient virus scan. In this preferred embodiment, the 3D-M arrays 170 storing the virus library could be 3D-P, 3D-OTP or 3D-MTP; and, the pattern-processing circuit 180 is a code-matching circuit.

Accordingly, the present invention discloses a discrete information-security processor, comprising: an input for transferring at least a portion of data from a network packet or a computer file; a plurality of storage-processing units (SPU's) communicatively coupled with said input, each of said SPU's comprising at least a three-dimensional memory (3D-M) array and a code-matching circuit, wherein said 3D-M array stores at least a portion of a virus pattern, said code-matching circuit searches said virus pattern in said portion of data; first and second dice, wherein said first die comprises said 3D-M array, said second die comprises at least a portion of said code-matching circuit and an off-die peripheral-circuit component of said 3D-M array, said first die does not comprise said off-die peripheral-circuit component, said first and second dice are separate dice communicatively coupled by a plurality of inter-die connections.

b) Anti-Virus Storage

Whenever a new virus is discovered, the whole disk drive (e.g. hard-disk drive, solid-state drive) of the computer needs to be scanned against the new virus. This full-disk scan process is challenging to the conventional von Neumann architecture. Because a disk drive could store massive data, it takes a long time to even read out all data, let alone scan virus for them. For the conventional von Neumann architecture, the full-disk scan time is proportional to the capacity of the disk drive.

To shorten the full-disk scan time, the present invention discloses an anti-virus storage. Its primary function is a computer storage, with in-situ virus-scanning capabilities as its secondary function. Like the flash memory, a large number of the preferred anti-virus storage 100 can be packaged into a storage card or a solid-state drive for storing massive data and with in-situ virus-scanning capabilities.

In the preferred anti-virus storage 100, the 3D-M arrays 170 in different SPU 100ij stores different data. In other words, massive computer files are stored and distributed in the SPU's 100ij of the storage card or the solid-state drive. Once a new virus is discovered and a full-disk scan is required, the pattern of the new virus is sent as input 110 to all SPU's 100ij, where the pattern-processing circuit 180 compares the data stored in the local 3D-M array 170 against the new virus pattern.

The above virus-scan operations are carried out by all SPU's 100ij at the same time and the virus-scan time for each SPU 100ij is similar. Because of the massive parallelism, no matter how large is the capacity of the storage card or the solid-state drive, the virus-scan time for the whole storage card or the whole solid-state drive is more or less a constant, which is close to the virus-scan time for a single SPU 100ij and generally within seconds. On the other hand, the conventional full-disk scan takes minutes to hours, or even longer. In this preferred embodiment, the 3D-M arrays 170 storing massive computer data are preferably 3D-MTP; and, the pattern-processing circuit 180 is a code-matching circuit.

Accordingly, the present invention discloses a discrete anti-virus storage, comprising: an input for transferring at least a portion of a virus pattern; a plurality of storage-processing units (SPU's) communicatively coupled with said input, each of said SPU's comprising at least a three-dimensional memory (3D-M) array and a code-matching circuit, wherein said 3D-M array stores at least a portion of data, said code-matching circuit searches said virus pattern in said portion of data; first and second dice, wherein said first die comprises said 3D-M array, said second die comprises at least a portion of said code-matching circuit and an off-die peripheral-circuit component of said 3D-M array, said first die does not comprise said off-die peripheral-circuit component, said first and second dice are separate dice communicatively coupled by a plurality of inter-die connections.

B) Big-Data Analytics

Big data is a term for a large collection of data, with main focus on unstructured and semi-structure data. An important aspect of big-data analytics is keyword search (including string matching, e.g. regular-expression matching). At present, the keyword library becomes large, while the big-data database is even larger. For such large keyword library and big-data database, the conventional processor and its associated architecture can hardly perform fast and efficient keyword search on unstructured or semi-structured data.

To improve the speed and efficiency of big-data analytics, the present invention discloses several discrete 3-D pattern processors 100. It could be processor-like or storage-like. For processor-like, the preferred discrete 3-D pattern processor 100 is a data-analysis processor, i.e. a processor for performing analysis on big data; for storage-like, the preferred discrete 3-D pattern processor 100 is a searchable storage, i.e. a storage with in-situ searching capabilities.

c) Data-Analysis Processor

To perform fast and efficient search on the input data, the present invention discloses a data-analysis processor 100. It searches the input data for the keywords in a keyword library. In the preferred data-analysis processor 100, the 3D-M arrays 170 in different SPU 100*ij* stores different keywords. In other words, the keyword library is stored and distributed in the SPU's 100*ij* of the preferred data-analysis processor 100. Once data are received at the input 110, at least a portion thereof is sent to all SPU's 100*ij*. In each SPU 100*ij*, the pattern-processing circuit 180 compares said portion of data against various keywords stored in the local 3D-M array 170.

The above searching operations are carried out by all SPU's 100*ij* at the same time. Because it comprises a large number of SPU's 100*ij* (thousands to tens of thousands), the preferred data-analysis processor 100 achieves massive parallelism for keyword search. Furthermore, because the inter-die connections 160 are numerous and the pattern-processing circuit 180 is physically close to the 3D-M arrays 170 (compared with the conventional von Neumann architecture), the pattern-processing circuit 180 can easily fetch keywords from the local 3D-M array 170. As a result, the preferred data-analysis processor 100 can perform fast and efficient search on unstructured data or semi-structured data.

In this preferred embodiment, the 3D-M arrays 170 storing the keyword library could be 3D-P, 3D-OTP or 3D-MTP; and, the pattern-processing circuit 180 is a string-matching circuit. The string-matching circuit could be implemented by a content-addressable memory (CAM) or a comparator including XOR circuits. Alternatively, keyword can be represented by a regular expression. In this case, the sting-matching circuit 180 can be implemented by a finite-state automata (FSA) circuit.

Accordingly, the present invention discloses a discrete data-analysis processor, comprising: an input for transferring at least a portion of data; a plurality of storage-processing units (SPU's) communicatively coupled with said input, each of said SPU's comprising at least a three-dimensional memory (3D-M) array and a string-matching circuit, wherein said 3D-M array stores at least a portion of a keyword, said string-matching circuit searches said keyword in said portion of data; first and second dice, wherein said first die comprises said 3D-M array, said second die comprises at least a portion of said string-matching circuit and an off-die peripheral-circuit component of said 3D-M array, said first die does not comprise said off-die peripheral-circuit component, said first and second dice are separate dice communicatively coupled by a plurality of inter-die connections.

d) Searchable Storage

Big-data analytics often requires full-database search, i.e. to search a whole big-data database for a keyword. The full-database search is challenging to the conventional von Neumann architecture. Because the big-data database is large, with a capacity of GB to TB, or even larger, it takes a long time to even read out all data, let alone analyze them. For the conventional von Neumann architecture, the full-database search time is proportional to the database size.

To improve the speed and efficiency of full-database search, the present invention discloses a searchable storage. Its primary function is database storage, with in-situ searching capabilities as its secondary function. Like the flash memory, a large number of the preferred searchable storage 100 can be packaged into a storage card or a solid-state drive for storing a big-data database and with in-situ searching capabilities.

In the preferred searchable storage 100, the 3D-M arrays 170 in different SPU 100*ij* stores different portions of the big-data database. In other words, the big-data database is stored and distributed in the SPU's 100*ij* of the storage card or the solid-state drive. During search, a keyword is sent as input 110 to all SPU's 100*ij*. In each SPU 100*ij*, the pattern-processing circuit 180 searches the portion of the big-data database stored in the local 3D-M array 170 for the keyword.

The above searching operations are carried out by all SPU's 100*ij* at the same time and the keyword-search time for each SPU 100*ij* is similar. Because of massive parallelism, no matter how large is the capacity of the storage card or the solid-state drive, the keyword-search time for the whole storage card or the whole solid-state drive is more or less a constant, which is close to the keyword-search time for a single SPU 100*ij* and generally within seconds. On the other hand, the conventional full-database search takes minutes to hours, or even longer. In this preferred embodiment, the 3D-M arrays 170 storing the big-data database are preferably 3D-MTP; and, the pattern-processing circuit 100 is a string-matching circuit.

Because it has the largest storage density among all semiconductor memories, the 3D-$M_V$ is particularly suitable for storing a big-data database. Among all 3D-$M_V$, the 3D-OTP$_V$ has a long data retention time and therefore, is particularly suitable for archiving. Fast searchability is important for archiving. A searchable 3D-OTP$_V$ will provide a large, inexpensive archive with fast searching capabilities.

Accordingly, the present invention discloses a discrete searchable storage, comprising: an input for transferring at least a portion of a keyword; a plurality of storage-processing units (SPU's) communicatively coupled with said input, each of said SPU's comprising at least a three-dimensional memory (3D-M) array and a string-matching circuit, wherein said 3D-M array stores at least a portion of data, said string-matching circuit searches said keyword in said portion of data; first and second dice, wherein said first die comprises said 3D-M array, said second die comprises at least a portion of said string-matching circuit and an off-die peripheral-circuit component of said 3D-M array, said first die does not comprise said off-die peripheral-circuit component, said first and second dice are separate dice communicatively coupled by a plurality of inter-die connections.

C) Speech Recognition

Speech recognition enables the recognition and translation of spoken language. It is primarily implemented through pattern recognition between audio data and an acoustic model/language library, which contains a plurality of acoustic models or language models. During speech recognition, the pattern processing circuit 180 performs speech recognition to the user's audio data by finding the nearest acoustic/language model in the acoustic/language model library. Because the conventional processor (e.g. CPU, GPU) has a limited number of cores and the acoustic/language model database is stored externally, the conventional processor and the associated architecture have a poor performance in speech recognition.

e) Speech-Recognition Processor

To improve the performance of speech recognition, the present invention discloses a speech-recognition processor 100. In the preferred speech-recognition processor 100, the user's audio data is sent as input 110 to all SPU 100$ij$. The 3D-M arrays 170 store at least a portion of the acoustic/language model. In other words, an acoustic/language model library is stored and distributed in the SPUs 100$ij$. The pattern-processing circuit 180 performs speech recognition on the audio data from the input 110 with the acoustic/language models stored in the 3D-M arrays 170. In this preferred embodiment, the 3D-M arrays 170 storing the models could be 3D-P, 3D-OTP, or 3D-MTP; and, the pattern-processing circuit 180 is a speech-recognition circuit.

Accordingly, the present invention discloses a discrete speech-recognition processor, comprising: an input for transferring at least a portion of audio data; a plurality of storage-processing units (SPU's) communicatively coupled with said input, each of said SPU's comprising at least a three-dimensional memory (3D-M) array and a speech-recognition circuit, wherein said 3D-M array stores at least a portion of an acoustic/language model, said speech-recognition circuit performs pattern recognition on said portion of audio data with said acoustic/language model; first and second dice, wherein said first die comprises said 3D-M array, said second die comprises at least a portion of said speech-recognition circuit and an off-die peripheral-circuit component of said 3D-M array, said first die does not comprise said off-die peripheral-circuit component, said first and second dice are separate dice communicatively coupled by a plurality of inter-die connections.

f) Searchable Audio Storage

To enable audio search in an audio database (e.g. an audio archive), the present invention discloses a searchable audio storage. In the preferred searchable audio storage 100, an acoustic/language model derived from the audio data to be searched for is sent as input 110 to all SPU 100$ij$. The 3D-M arrays 170 store at least a portion of the user's audio database. In other words, the audio database is stored and distributed in the SPUs 100$ij$ of the preferred searching audio storage 100. The pattern-processing circuit 180 performs speech recognition on the audio data stored in the 3D-M arrays 170 with the acoustic/language model from the input 110. In this preferred embodiment, the 3D-M arrays 170 storing the audio database are preferably 3D-MTP; and, the pattern-processing circuit 180 is a speech-recognition circuit.

Accordingly, the present invention discloses a discrete searchable audio storage, comprising: an input for transferring at least a portion of an acoustic/language model; a plurality of storage-processing units (SPU's) communicatively coupled with said input, each of said SPU's comprising at least a three-dimensional memory (3D-M) array and a speech-recognition circuit, wherein said 3D-M array stores at least a portion of audio data, said speech-recognition circuit performs pattern recognition on said portion of audio data with said acoustic/language model; first and second dice, wherein said first die comprises said 3D-M array, said second die comprises at least a portion of said speech-recognition circuit and an off-die peripheral-circuit component of said 3D-M array, said first die does not comprise said off-die peripheral-circuit component, said first and second dice are separate dice communicatively coupled by a plurality of inter-die connections.

D) Image Recognition or Search

Image recognition enables the recognition of images. It is primarily implemented through pattern recognition on image data with an image model, which is a part of an image model library. During image recognition, the pattern processing circuit 180 performs image recognition to the user's image data by finding the nearest image model in the image model library. Because the conventional processor (e.g. CPU, GPU) has a limited number of cores and the image model database is stored externally, the conventional processor and the associated architecture have a poor performance in image recognition.

g) Image-Recognition Processor

To improve the performance of image recognition, the present invention discloses an image-recognition processor 100. In the preferred image-recognition processor 100, the user's image data is sent as input 110 to all SPU 100$ij$. The 3D-M arrays 170 store at least a portion of the image model. In other words, an image model library is stored and distributed in the SPUs 100$ij$. The pattern-processing circuit 180 performs image recognition on the image data from the input 110 with the image models stored in the 3D-M arrays 170. In this preferred embodiment, the 3D-M arrays 170 storing the models could be 3D-P, 3D-OTP, or 3D-MTP; and, the pattern-processing circuit 180 is an image-recognition circuit.

Accordingly, the present invention discloses a discrete image-recognition processor, comprising: an input for transferring at least a portion of image data; a plurality of storage-processing units (SPU's) communicatively coupled with said input, each of said SPU's comprising at least a three-dimensional memory (3D-M) array and an image-recognition circuit, wherein said 3D-M array stores at least a portion of an image model, said image-recognition circuit performs pattern recognition on said portion of image data with said image model; first and second dice, wherein said first die comprises said 3D-M array, said second die comprises at least a portion of said image-recognition circuit and an off-die peripheral-circuit component of said 3D-M array, said first die does not comprise said off-die peripheral-circuit component, said first and second dice are separate dice communicatively coupled by a plurality of inter-die connections.

h) Searchable Image Storage

To enable image search in an image database (e.g. an image archive), the present invention discloses a searchable image storage. In the preferred searchable image storage 100, an image model derived from the image data to be searched for is sent as input 110 to all SPU 100$ij$. The 3D-M arrays 170 store at least a portion of the user's image database. In other words, the image database is stored and distributed in the SPUs 100$ij$ of the preferred searchable image storage 100. The pattern-processing circuit 180 performs image recognition on the image data stored in the 3D-M arrays 170 with the image model from the input 110. In this preferred embodiment, the 3D-M arrays 170 storing the image database are preferably 3D-MTP; and, the pattern-processing circuit 180 is an image-recognition circuit.

Accordingly, the present invention discloses a discrete searchable image storage, comprising: an input for transferring at least a portion of an image model; a plurality of storage-processing units (SPU's) communicatively coupled with said input, each of said SPU's comprising at least a three-dimensional memory (3D-M) array and an image-recognition circuit, wherein said 3D-M array stores at least a portion of image data, said image-recognition circuit performs pattern recognition on said portion of image data with said image model; first and second dice, wherein said first die comprises said 3D-M array, said second die comprises at least a portion of said image-recognition circuit and an off-die peripheral-circuit component of said 3D-M array, said first die does not comprise said off-die peripheral-circuit component, said first and second dice are separate dice communicatively coupled by a plurality of inter-die connections.

[E] Neural Network

When applied to neural network, the preferred discrete 3-D processor is a discrete 3-D neuro-processor. Its basic functionality is neural processing. More importantly, the synaptic weights required for neural processing are stored locally.

The preferred discrete 3-D neuro-processor uses the architecture of the preferred discrete 3-D parallel processor 100 (FIG. 22). FIG. 24 shows a SPU 100*ij* used in a preferred 3-D neuro-processor 100. It comprises a neuro-storage circuit 170 and a neuro-processing circuit 180 communicatively coupled by a plurality inter-die connections 160 (referring to FIGS. 3A-3D). The neuro-storage circuit 170 comprises at least a 3D-M array for storing at least a portion of a synaptic weight, whereas the neuro-processing circuit 180 performs neural processing with the synaptic weight.

Figure 25:
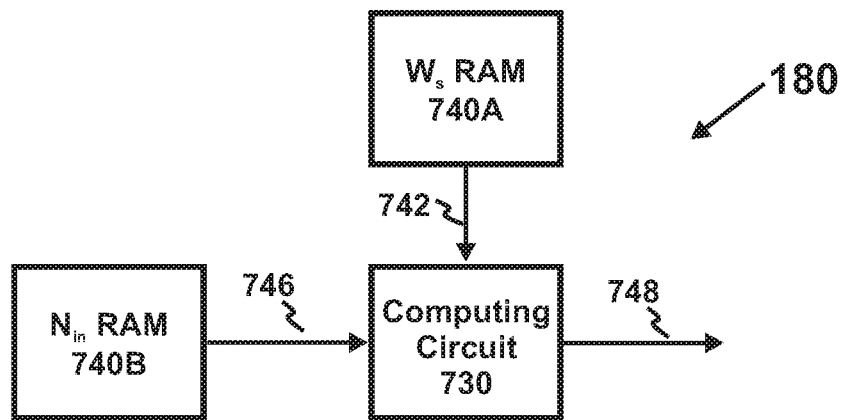
FIG. 25 is a circuit block diagram of a preferred neuro-processing circuit.
Figure 26A:
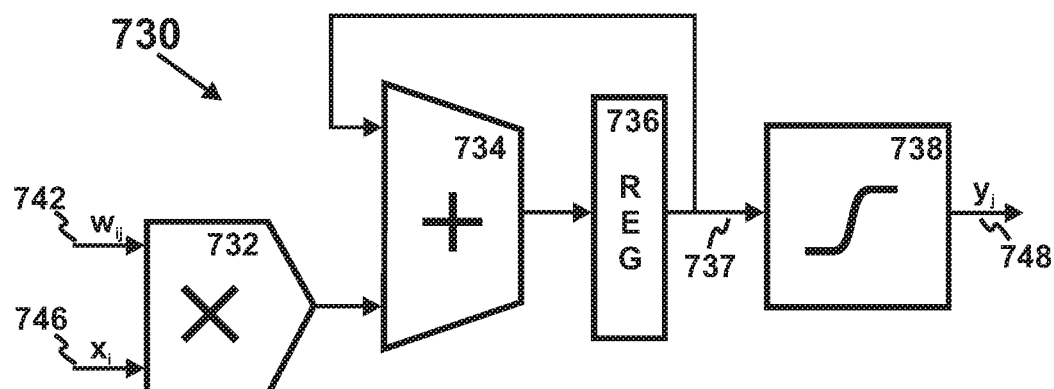
FIGS. 26A-26B are circuit block diagrams of two preferred computing circuits.
Figure 26B:
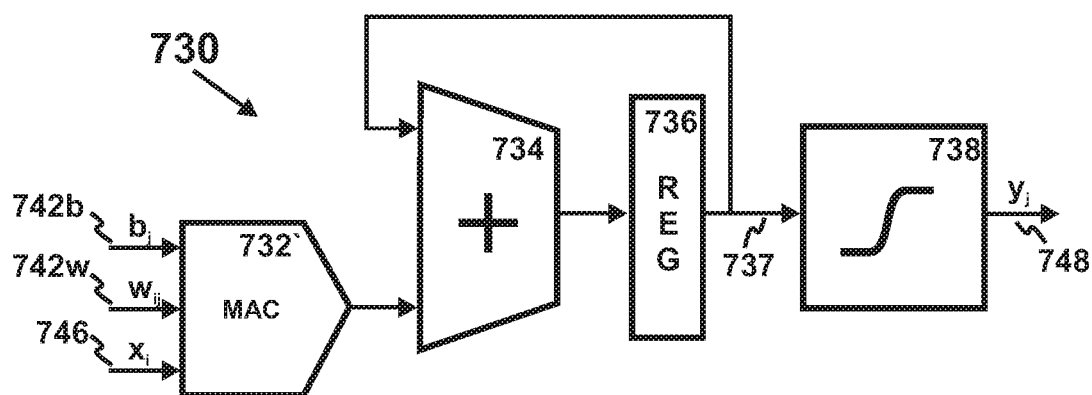

Referring now to FIGS. 25-26B, a preferred neuro-processing circuit 180 and its computing circuit 730 are disclosed. In the preferred embodiment of FIG. 25, the preferred neuro-processing circuit 180 comprises a synaptic-weight ($W_s$) RAM 740A, an input-neuron ($N_{in}$) RAM 740B, and a computing circuit 730. The $W_s$ RAM 740A is a buffer RAM which temporarily stores the synaptic weights 742 read from the 3D-M array(s) 170. The $N_{in}$ RAM 740B is another buffer RAM which temporarily stores the input data 746 from the input 110. The computing circuit 730 performs neural processing before generating output data 748.

In the preferred embodiment of FIG. 26A, a first preferred computing circuit 730 comprises a multiplier 732, an adder 734, a register 736 and an activation-function circuit 738. The multiplier 732 multiplies the input data $x_i$ with the synaptic weight $w_{ij}$. Then the adder 734 and the register 736 together perform accumulative addition for the multiplication results (i.e. $w_{ij}*x_i$). The resulting accumulative sum 737 is passed through the activation-function circuit 738 to generate the output data $y_j$.

In the preferred embodiment of FIG. 26B, a second preferred computing circuit 730 comprises a multiply-accumulate circuit (MAC) 732' in place of the multiplier 732 of FIG. 26A. Of course, the MAC 732' comprises a multiplier too. The $W_s$ RAM 740A outputs not only a synaptic weight $w_{ij}$ (through port 742*w*), but also a bias $b_j$ (through port 742*b*). The MAC 732' performs a biased-multiplication (i.e. $w_{ij}*x_i+b_j$) for the input data $x_i$, the synaptic weight $w_{ij}$ and the bias $b_j$.

The activation function (e.g. a sigmoid function, a signum function, a threshold function, a piecewise-linear function, a step function, a tanh function, etc.) controls the amplitude of its output to be between certain values (e.g. between 0 and 1 or between −1 and 1). It is difficult to realize the activation function in the past. Following the same inventive spirit of the present invention, more particularly that in the section of "mathematical computing", the processing circuit 180 in the second die 100*b* may comprise a non-volatile memory (NVM) for storing the LUT of the activation function. The NVM is generally a read-only memory (ROM), more particularly a 3-D read-only memory (3D-ROM). The 3D-ROM array can be further stacked above the multiplier/MAC 732 and the adder 734 and overlap them. As a result, the computing circuit 730 becomes quite simple—it only needs to realize multiplication and addition, but not activation function. The computing circuit 730 using the 3D-ROM array to realize the activation functions is small and therefore, has a large computational density.

While illustrative embodiments have been shown and described, it would be apparent to those skilled in the art that many more modifications than that have been mentioned above are possible without departing from the inventive concepts set forth therein. For example, the preferred 3-D processor could be a micro-controller, a controller, a central processing unit (CPU), a digital signal processor (DSP), a graphic processing unit (GPU), a network-security processor, an encryption/decryption processor, an encoding/decoding processor, a neural-network processor, or an artificial intelligence (AI) processor. These processors can be found in consumer electronic devices (e.g. personal computers, video game machines, smart phones) as well as engineering and scientific workstations and server machines. The invention, therefore, is not to be limited except in the spirit of the appended claims.

What is claimed is:

1. A discrete three-dimensional (3-D) processor, comprising:

a plurality of storage-processing units (SPU's), each of said SPU's comprising a non-memory circuit and more than one 3-D memory (3D-M) array;

a first die on a first semiconductor substrate, wherein said 3D-M array comprises memory cells stacked above said first semiconductor substrate, and an in-die peripheral-circuit component of said 3D-M array is disposed on said first semiconductor substrate;

a second die on a second semiconductor substrate, wherein at least a portion of said non-memory circuit and an off-die peripheral-circuit component of said 3D-M array are disposed on said second semiconductor substrate;

wherein, said non-memory circuit is not a part of a memory; said first die does not comprise said off-die peripheral-circuit component; said first and second dice are communicatively coupled by a plurality of inter-die connections; said first and second semiconductor substrates are separate semiconductor substrates.

2. The 3-D processor according to claim 1, wherein:

each of said SPU's comprises at least four 3D-M arrays including said 3D-M arrays;

or, each of said SPU's comprises at least eight 3D-M arrays including said 3D-M arrays;

or, said 3D-M array comprises a plurality of vertically stacked memory cells without any semiconductor substrate therebetween; or, said 3D-M array is a 3-D random-access memory (3D-RAM) array; or, said 3D-M array is a 3-D read-only memory (3D-ROM) array; or, said 3D-M array is a non-volatile memory (NVM) array; or, said 3D-M array is a 3-D writable memory (3D-W) array; or, said 3D-M array is a 3-D printed memory (3D-P) array; or said 3D-M array is a horizontal 3D-M (3D-MH) array; or, said 3D-M array is a vertical 3D-M (3D-Mv) array; or said 3D-M array is a 3D-static random access memory (3D-SRAM), 3D-dynamic random access memory (3D-DRAM), 3D-resistive random access memory (3D-RRAM), 3D-magnetoresistive random access memory (3D-MRAM), or 3D-ferroelectric random access memory (3D-FeRAM) array; or, said 3D-M array is a 3D-mask programmable read-only memory (3D-MPROM), 3D-one-time-programmable (3D-OTP), 3D-multi-time-programmable (3D-MTP), 3D-erasable programmable read-only memory (3D-EPROM), 3D-electrically erasable programmable read-only memory (3D-EEPROM), 3D-flash, 3D-NOR, 3D-NAND, or 3D-XPoint array.

3. The 3-D processor according to claim 2, wherein:

a first number of the back-end-of-line (BEOL) layers of said first die is larger than a second number of the BEOL layers of said second die; or, a third number of the address-line layers of said first die is at least twice as much as a fourth number of the interconnect layers of said second die; or, a fifth number of the memory cells on each memory string in said first die is at least twice as much as a sixth number of the interconnect layers of said second die; or, a seventh number of the interconnect layers in the substrate circuit of said first die is smaller than an eighth number of the interconnect layers of said second die; or, the interconnect material used in said second die has a lower resistivity than the interconnect material used the substrate circuit of said first die.

4. The 3-D processor according to claim 3, wherein:

said non-memory circuit is a logic circuit; or, said non-memory circuit is a processing circuit; or, said 3D-M array stores at least a portion of a look-up table (LUT) of a non-arithmetic function/model; said non-memory circuit comprises an arithmetic logic circuit (ALC) for performing arithmetic operations on selected data from said LUT; whereby said 3-D processor computes said non-arithmetic function/model, wherein said non-arithmetic function/model includes more operations than the arithmetic operations provided by said ALC; or, said 3D-M array is a portion of a configurable computing element (CCE) and stores at least a portion of a look-up table (LUT) of a non-arithmetic function; said non-memory circuit comprises at least a configurable logic element (CLE) and/or a configurable interconnect (CIT); whereby said 3-D processor customizes said non-arithmetic function by programming said CCE and said CLE/CIT, wherein said non-arithmetic function includes more operations than the arithmetic operations provided by said CLE; or, said 3-D processor further comprises an input for transferring at least a first portion of a first pattern; said 3D-M array stores at least a second portion of a second pattern; said non-memory circuit comprises a pattern-processing circuit for performing pattern processing for said first and second patterns; or, said 3-D processor is a discrete 3-D processor with embedded search-pattern library, further comprising an input for transferring at least a target pattern; said 3D-M array stores at least a search pattern; said non-memory circuit comprises a pattern-processing circuit for searching said target pattern for said search pattern; or, said 3-D processor is a discrete 3-D storage with in-situ pattern-processing capabilities, further comprising an input for transferring at least a search pattern; said 3D-M array stores at least a target pattern; said non-memory circuit comprises a pattern-processing circuit for searching said target pattern for said search pattern; or, said 3D-M array stores at least a portion of a synaptic weight; said non-memory circuit comprises a neuro-processing circuit for performing neural processing with said synaptic weight.

5. The 3-D processor according to claim 3, wherein:

said off-die peripheral-circuit component comprises at least a portion of an address decoder; or, said off-die peripheral-circuit component comprises at least a portion of a sense amplifier; or, said off-die peripheral-circuit component comprises at least a portion of a programming circuit; or, said off-die peripheral-circuit component comprises at least a portion of a read-voltage generator; or, said off-die peripheral-circuit component comprises at least a portion of a write-voltage generator; or, said off-die peripheral-circuit component comprises at least a portion of a data buffer.

6. The 3-D processor according to claim 4, wherein:

said off-die peripheral-circuit component comprises at least a portion of an address decoder; or, said off-die peripheral-circuit component comprises at least a portion of a sense amplifier; or, said off-die peripheral-circuit component comprises at least a portion of a programming circuit; or, said off-die peripheral-circuit component comprises at least a portion of a read-voltage generator; or, said off-die peripheral-circuit component comprises at least a portion of a write-voltage generator; or, said off-die peripheral-circuit component comprises at least a portion of a data buffer.

7. The 3-D processor according to claim 3, wherein:

said first and second dice are vertically stacked; or, said first and second dice are face-to-face bonded; or, said first and second dice have a same die size; or, a first edge of said first die is aligned with a second edge of said second die; or, the projection of said 3D-M array on said second die at least partially overlaps said non-memory circuit; or, each 3D-M array is vertically aligned and communicatively coupled with a non-memory circuit; or, each non-memory circuit is vertically aligned and communicatively coupled with at least a 3D-M array; or, the pitch of said non-memory circuit is an integer multiple of the pitch of said 3D-M array; or, said inter-die connections include bond wires, micro-bumps, through-silicon-vias (TSV's), and/or vertical interconnect access (VIA's).

8. The 3-D processor according to claim 7, wherein:

said non-memory circuit is a logic circuit; or, said non-memory circuit is a processing circuit; or, said 3D-M array stores at least a portion of a look-up table (LUT) of a non-arithmetic function/model; said non-memory circuit comprises an arithmetic logic circuit (ALC) for performing arithmetic operations on selected data from said LUT; whereby said 3-D processor computes said non-arithmetic function/model, wherein said non-arithmetic function/model includes more operations than the arithmetic operations provided by said ALC; or, said 3D-M array is a portion of a configurable computing element (CCE) and stores at least a portion of a look-up table (LUT) of a non-arithmetic function; said non-memory circuit comprises at least a configurable logic element (CLE) and/or a configurable interconnect (CIT); whereby said 3-D processor customizes said non-arithmetic function by programming said CCE and said CLE/CIT, wherein said non-arithmetic function includes more operations than the arithmetic operations provided by said CLE; or, said 3-D processor further comprises an input for transferring at least a first portion of a first pattern; said 3D-M array stores at least a second portion of a second pattern; said non-memory circuit comprises a pattern-processing circuit for performing pattern processing for said first and second patterns; or, said 3-D processor is a discrete 3-D processor with embedded search-pattern library, further comprising an input for transferring at least a target pattern; said 3D-M array stores at least a search pattern; said non-memory circuit comprises a pattern-processing circuit for searching said target pattern for said search pattern; or, said 3-D processor is a discrete 3-D storage with in-situ pattern-processing capabilities, further comprising an input for transferring at least a search pattern; said 3D-M array stores at least a target pattern; said non-memory circuit comprises a pattern-processing circuit for searching said target pattern for said search pattern; or, said 3D-M array stores at least a portion of a synaptic weight; said non-memory circuit comprises a neuro-processing circuit for performing neural processing with said synaptic weight.

9. The 3-D processor according to claim 7, wherein:
said off-die peripheral-circuit component comprises at least a portion of an address decoder; or,
said off-die peripheral-circuit component comprises at least a portion of a sense amplifier; or,
said off-die peripheral-circuit component comprises at least a portion of a programming circuit; or,
said off-die peripheral-circuit component comprises at least a portion of a read-voltage generator; or,
said off-die peripheral-circuit component comprises at least a portion of a write-voltage generator; or,
said off-die peripheral-circuit component comprises at least a portion of a data buffer.

10. The 3-D processor according to claim 8, wherein:
said off-die peripheral-circuit component comprises at least a portion of an address decoder; or,
said off-die peripheral-circuit component comprises at least a portion of a sense amplifier; or,
said off-die peripheral-circuit component comprises at least a portion of a programming circuit; or,
said off-die peripheral-circuit component comprises at least a portion of a read-voltage generator; or,
said off-die peripheral-circuit component comprises at least a portion of a write-voltage generator; or,
said off-die peripheral-circuit component comprises at least a portion of a data buffer.

11. The 3-D processor according to claim 1, wherein:
each of said SPU's comprises at least four 3D-M arrays including said 3D-M arrays;
or, each of said SPU's comprises at least eight 3D-M arrays including said 3D-M arrays;
or, said 3D-M array comprises a plurality of vertically stacked memory cells without any semiconductor substrate therebetween; or,
said 3D-M array is a 3-D random-access memory (3D-RAM) array; or,
said 3D-M array is a 3-D read-only memory (3D-ROM) array; or,
said 3D-M array is a non-volatile memory (NVM) array; or,
said 3D-M array is a 3-D writable memory (3D-W) array; or,
said 3D-M array is a 3-D printed memory (3D-P) array; or
said 3D-M array is a horizontal 3D-M (3D-MH) array; or,
said 3D-M array is a vertical 3D-M (3D-Mv) array; or
said 3D-M array is a 3D-static random access memory (3D-SRAM), 3D-dynamic random access memory (3D-DRAM), 3D-resistive random access memory (3D-RRAM), 3D-magnetoresistive random access memory (3D-MRAM), or 3D-ferroelectric random access memory (3D-FeRAM) array; or,
said 3D-M array is a 3D-mask programmable read-only memory (3D-MPROM), 3D-one-time-programmable (3D-OTP), 3D-multi-time-programmable (3D-MTP), 3D-erasable programmable read-only memory (3D-EPROM), 3D-electrically erasable programmable read-only memory (3D-EEPROM), 3Dflash, 3D-NOR, 3D-NAND, or 3D-XPoint array; or,
a third number of the address-line layers of said first die is at least twice as much as a fourth number of the interconnect layers of said second die; or,
a fifth number of the memory cells on each memory string in said first die is at least twice as much as a sixth number of the interconnect layers of said second die; or,
a seventh number of the interconnect layers in the substrate circuit of said first die is smaller than an eighth number of the interconnect layers of said second die; or,
the interconnect material used in said second die has a lower resistivity than the interconnect material used the substrate circuit of said first die.

12. The 3-D processor according to claim 11, wherein:
said non-memory circuit is a logic circuit; or,
said non-memory circuit is a processing circuit; or,
said 3D-M array stores at least a portion of a look-up table (LUT) of a non-arithmetic function/model; said non-memory circuit comprises an arithmetic logic circuit (ALC) for performing arithmetic operations on selected data from said LUT; whereby said 3-D processor computes said non-arithmetic function/model, wherein said non-arithmetic function/model includes more operations than the arithmetic operations provided by said ALC; or,
said 3D-M array is a portion of a configurable computing element (CCE) and stores at least a portion of a look-up table (LUT) of a non-arithmetic function; said non-memory circuit comprises at least a configurable logic element (CLE) and/or a configurable interconnect (CIT); whereby said 3-D processor customizes said non-arithmetic function by programming said CCE and said CLE/CIT, wherein said non-arithmetic function includes more operations than the arithmetic operations provided by said CLE; or,
said 3-D processor further comprises an input for transferring at least a first portion of a first pattern; said 3D-M array stores at least a second portion of a second pattern; said non-memory circuit comprises a pattern-processing circuit for performing pattern processing for said first and second patterns; or, said 3-D processor is a discrete 3-D processor with embedded search-pattern library, further comprising an input for transferring at least a target pattern; said 3D-M array stores at least a search pattern; said non-memory circuit comprises a pattern-processing circuit for searching said target pattern for said search pattern; or, said 3-D processor is a discrete 3-D storage with in-situ pattern-processing capabilities, further comprising an input for transferring at least a search pattern; said 3D-M array stores at least a target pattern; said non-memory circuit comprises a pattern-processing circuit for searching said target pattern for said search pattern; or, said 3D-M array stores at least a portion of a synaptic weight; said non-memory circuit comprises a neuro-processing circuit for performing neural processing with said synaptic weight.

13. The 3-D processor according to claim 11, wherein:
said off-die peripheral-circuit component comprises at least a portion of an address decoder; or,
said off-die peripheral-circuit component comprises at least a portion of a sense amplifier; or,
said off-die peripheral-circuit component comprises at least a portion of a programming circuit; or,
said off-die peripheral-circuit component comprises at least a portion of a read-voltage generator; or,
said off-die peripheral-circuit component comprises at least a portion of a write-voltage generator; or,
said off-die peripheral-circuit component comprises at least a portion of a data buffer.

14. The 3-D processor according to claim 12, wherein:
said off-die peripheral-circuit component comprises at least a portion of an address decoder; or,
said off-die peripheral-circuit component comprises at least a portion of a sense amplifier; or,
said off-die peripheral-circuit component comprises at least a portion of a programming circuit; or,
said off-die peripheral-circuit component comprises at least a portion of a read-voltage generator; or,
said off-die peripheral-circuit component comprises at least a portion of a write-voltage generator; or,
said off-die peripheral-circuit component comprises at least a portion of a data buffer.

15. The 3-D processor according to claim 11, wherein:
said first and second dice are vertically stacked; or,
said first and second dice are face-to-face bonded; or,
said first and second dice have a same die size; or,
a first edge of said first die is aligned with a second edge of said second die; or,
the projection of said 3D-M array on said second die at least partially overlaps said non-memory circuit; or,
each 3D-M array is vertically aligned and communicatively coupled with a non-memory circuit; or,
each non-memory circuit is vertically aligned and communicatively coupled with at least a 3D-M array; or,
the pitch of said non-memory circuit is an integer multiple of the pitch of said 3D-M array; or,
said inter-die connections include bond wires, micro-bumps, through-silicon-vias (TSV's), and/or vertical interconnect access (VIA's).

16. The 3-D processor according to claim 15, wherein:
said non-memory circuit is a logic circuit; or,
said non-memory circuit is a processing circuit; or,
said 3D-M array stores at least a portion of a look-up table (LUT) of a non-arithmetic function/model; said non-memory circuit comprises an arithmetic logic circuit (ALC) for performing arithmetic operations on selected data from said LUT; whereby said 3-D processor computes said non-arithmetic function/model, wherein said non-arithmetic function/model includes more operations than the arithmetic operations provided by said ALC; or, said 3D-M array is a portion of a configurable computing element (CCE) and stores at least a portion of a look-up table (LUT) of a non-arithmetic function; said non-memory circuit comprises at least a configurable logic element (CLE) and/or a configurable interconnect (CIT); whereby said 3-D processor customizes said non-arithmetic function by programming said CCE and said CLE/CIT, wherein said non-arithmetic function includes more operations than the arithmetic operations provided by said CLE; or, said 3-D processor further comprises an input for transferring at least a first portion of a first pattern; said 3D-M array stores at least a second portion of a second pattern; said non-memory circuit comprises a pattern-processing circuit for performing pattern processing for said first and second patterns; or, said 3-D processor is a discrete 3-D processor with embedded search-pattern library, further comprising an input for transferring at least a target pattern; wherein said 3D-M array stores at least a search pattern; said non-memory circuit comprises a pattern-processing circuit for searching said target pattern for said search pattern; or, said 3-D processor is a discrete 3-D storage with in-situ pattern-processing capabilities, further comprising an input for transferring at least a search pattern; wherein said 3D-M array stores at least a target pattern; said non-memory circuit comprises a pattern-processing circuit for searching said target pattern for said search pattern; or, said 3D-M array stores at least a portion of a synaptic weight; said non-memory circuit comprises a neuro-processing circuit for performing neural processing with said synaptic weight.

17. The 3-D processor according to claim 15, wherein:
said off-die peripheral-circuit component comprises at least a portion of an address decoder; or,
said off-die peripheral-circuit component comprises at least a portion of a sense amplifier; or,
said off-die peripheral-circuit component comprises at least a portion of a programming circuit; or,
said off-die peripheral-circuit component comprises at least a portion of a read-voltage generator; or,
said off-die peripheral-circuit component comprises at least a portion of a write-voltage generator; or,
said off-die peripheral-circuit component comprises at least a portion of a data buffer.

18. The 3-D processor according to claim 16, wherein:
said off-die peripheral-circuit component comprises at least a portion of an address decoder; or,
said off-die peripheral-circuit component comprises at least a portion of a sense amplifier; or,
said off-die peripheral-circuit component comprises at least a portion of a programming circuit; or, said off-die peripheral-circuit component comprises at least a portion of a read-voltage generator; or,
said off-die peripheral-circuit component comprises at least a portion of a write-voltage generator; or,
said off-die peripheral-circuit component comprises at least a portion of a data buffer.

\* \* \* \* \*